(12) United States Patent
Glovinsky et al.

(10) Patent No.: US 10,700,618 B2
(45) Date of Patent: Jun. 30, 2020

(54) BALANCER CIRCUIT THAT PROVIDES POWER FROM DC-TO-DC CONVERTER AND FROM DC-TO-AC CONVERTER TO AT LEAST ONE LOAD

(71) Applicant: Solaredge Technologies Ltd., Herzeliya (IL)

(72) Inventors: Tzachi Glovinsky, Petah Tikva (IL); Ilan Yoscovich, Ramat-Gan (IL); Guy Sella, Bitan Aharon (IL); Milan Ilic, San Jose, CA (US); Jaya Deepti Dasika, San Jose, CA (US)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 15/925,882

(22) Filed: Mar. 20, 2018

(65) Prior Publication Data
US 2018/0278177 A1    Sep. 27, 2018

Related U.S. Application Data

(60) Provisional application No. 62/475,452, filed on Mar. 23, 2017.

(51) Int. Cl.
*H02M 7/538* (2007.01)
*H02J 4/00* (2006.01)
*H02M 3/158* (2006.01)
*H02J 1/08* (2006.01)

(52) U.S. Cl.
CPC .......... *H02M 7/53803* (2013.01); *H02J 4/00* (2013.01); *H02M 3/1584* (2013.01); *H02J 1/08* (2013.01)

(58) Field of Classification Search
CPC .... H02M 7/53803; H02M 3/1584; H02J 4/00; H02J 1/08
See application file for complete search history.

(56) References Cited

U.S. PATENT DOCUMENTS

| 2013/0301314 A1 | 11/2013 | Fu et al. |
| 2016/0241039 A1 | 8/2016 | Cheng et al. |

(Continued)

FOREIGN PATENT DOCUMENTS

EP    2075891 A1    7/2009

OTHER PUBLICATIONS

O. Keiser, P. K. Steimer and J. W. Kolar, "High power resonant Switched-Capacitor step-down converter," 2008 IEEE Power Electronics Specialists Conference, Rhodes, 2008, pp. 2772-2777.*

(Continued)

*Primary Examiner* — Gary L Laxton
*Assistant Examiner* — Jye-June Lee
(74) *Attorney, Agent, or Firm* — Banner & Witcoff, Ltd.

(57) ABSTRACT

An apparatus includes a DC-to-AC converter comprising a first output terminal and a second output terminal. The apparatus also includes a DC-to-DC converter comprising a third output. The DC-to-AC converter is configured to receive a DC input voltage from a DC power source, and to produce a first alternating output voltage at the first output terminal, and a second alternating output voltage at the second output terminal. The DC-to-DC converter is configured receive a DC input voltage from the DC power source, and to step down the DC input voltage at the third output.

20 Claims, 39 Drawing Sheets

(56) References Cited

U.S. PATENT DOCUMENTS

2017/0077704 A1* 3/2017 Faley .................. H02J 3/14
2018/0226797 A1* 8/2018 Galin .................. H02J 3/383

OTHER PUBLICATIONS

Jenni Rekola, "DC distribution and power electronics applications in smart grid" 2012.*
Q. Zhong, J. Liang, G. Weiss, C. M. Feng and T. C. Green, "H infinity Control of the Neutral Point in Four-Wire Three-Phase DC-AC Converters," in IEEE Transactions on Industrial Electronics, vol. 53, No. 5, pp. 1594-1602, Oct. 2006 (Year: 2006).*
L. Zhang, B. Gu, J. Dominic, B. Chen and J. Lai, "A capacitor voltage balancing method with zero-voltage switching for split phase inverter," 2014 IEEE Applied Power Electronics Conference and Exposition—APEC 2014, Fort Worth, TX, 2014, pp. 2394-2400. (Year: 2014).*
Jul. 19, 2018—European Search Report for EP 18161966.9.

* cited by examiner

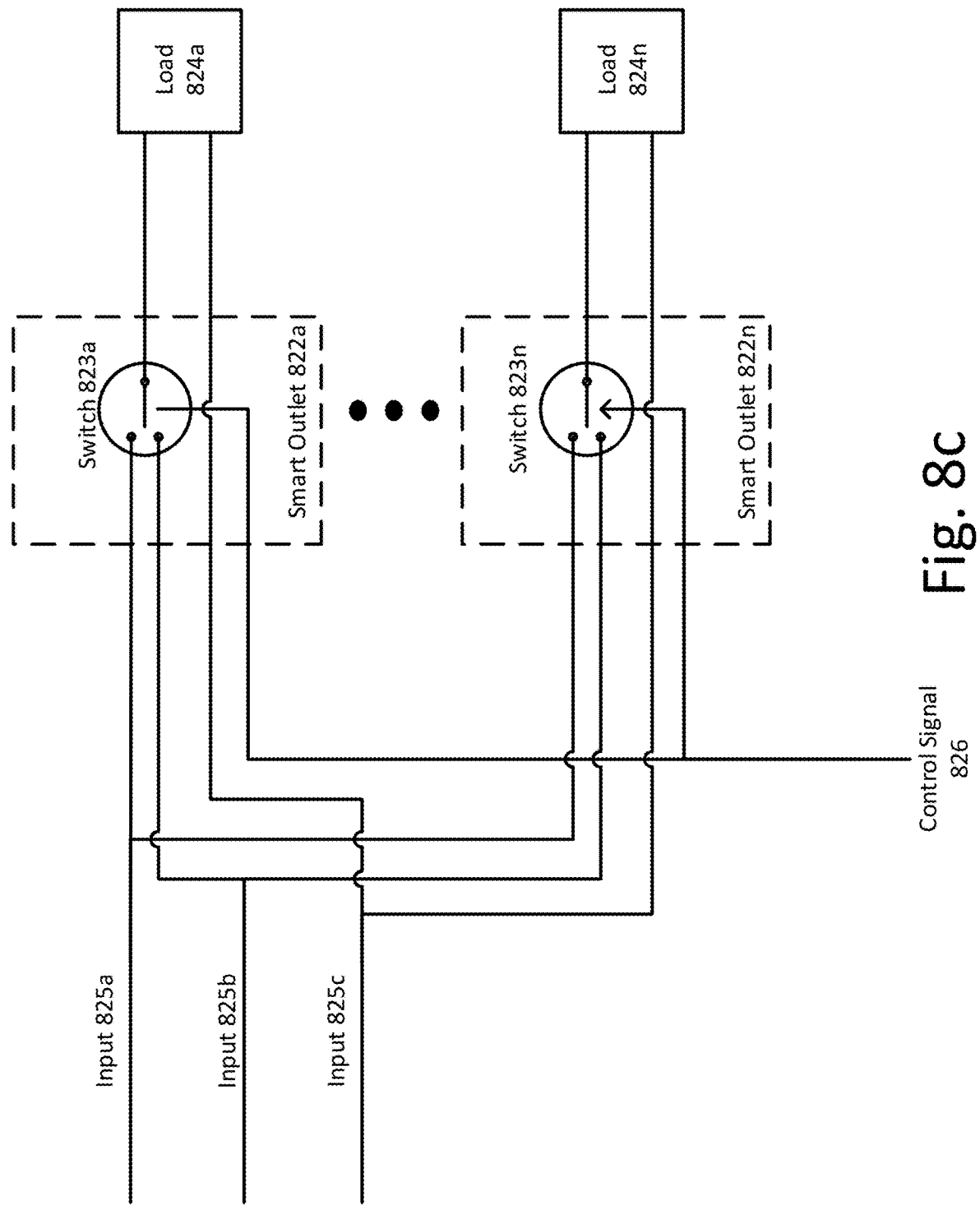

BALANCER CIRCUIT THAT PROVIDES POWER FROM DC-TO-DC CONVERTER AND FROM DC-TO-AC CONVERTER TO AT LEAST ONE LOAD

RELATED APPLICATIONS

This application claims priority to U.S. provisional application Ser. No. 62/475,452, filed Mar. 23, 2017, entitled "Balancer Circuit", the entire contents of which are incorporated herein by reference.

BACKGROUND

Some electric power systems in various households and industry may be split-phase electric power systems. A split-phase power system is a type of single-phase power system that may comprise two alternating current (AC) voltage lines. The AC voltage lines may have a common neutral line. The AC voltage amplitude and/or root mean square (RMS) value with respect to the neutral line may be about half of the AC voltage amplitude and/or RMS value between the AC voltage lines, i.e., line-to-neutral voltage amplitude and/or RMS value may be about half of the line-to-line voltage amplitude and/or RMS value. In a split-phase system providing power to balanced loads, (i.e., where the loads coupled between each AC voltage line and the neutral line are about the same), the sum of the instantaneous currents of the two lines may be about zero, i.e., the current flowing through the neutral line may be significantly smaller than the current flowing through the AC voltage lines.

Other electric power systems may be three-phase electric power systems. A three-phase power system has three power lines, each having an alternating current of the same frequency and voltage amplitude and/or RMS value with respect to a neutral line. Each power line has a phase shift of one third of the period with respect to the other two lines. In a three-phase system feeding balanced loads, the sum of the instantaneous currents of the three lines may be about zero.

SUMMARY

The following summary is for illustrative purposes only, and is not intended to limit or constrain the detailed description.

Illustrative embodiments disclosed herein may present systems and/or methods for a split-phase electrical power system that may power electrical loads in the split-phase system.

Illustrative embodiments disclosed herein may present efficient systems and/or methods for generating from a DC power source the voltage lines and the neutral line for a split-phase electrical power system and a three-phase electrical power system that may power electrical loads. Some embodiments may include a resonant switched capacitor circuit that may reduce switching losses and may reduce electromagnetic interference (EMI).

Illustrative embodiments disclosed herein may present systems and/or methods for reducing the imbalance between groups of loads in split-phase electrical power system and a three-phase electrical power system.

In some embodiments disclosed herein, systems and/or methods presented may make the use of an autotransformer superfluous.

Embodiments disclosed herein may include but are not limited to methods for dividing an AC signal into two AC signals with half the amplitude and/or RMS value.

DC-to-AC converters referred to within one or more embodiments may include but are not limited to 2-level or multi-level inverter(s) (e.g., Neutral point Clamp or flying capacitor inverter) and/or microinverter(s).

DC power sources and/or DC sources referred to within one or more embodiments may include but are not limited to PV generator(s) (e.g. PV cell(s), PV string(s), PV sub-string(s), PV panel(s), PV array(s) of panels and/or PV shingles), fuel cell(s), and/or storage device(s) (e.g., battery(ies), flywheel(s), capacitor(s), supercapacitor(s)).

PV modules referred to within one or more embodiments may include but are not limited to PV generator(s) (e.g. PV cell(s), PV string(s), PV substring(s), PV panel(s), PV array(s) of panels and/or PV shingles) and/or PV power module(s) (e.g. PV optimizer(s), PV string optimizer(s), PV combiner box(es), PV converter(s), and/or PV master control unit(s).

DC-to-DC converters referred to within one or more embodiments may include but are not limited to buck converter(s), buck/boost converter(s), buck+boost converter(s), Cuk converter(s), Flyback converter(s), forward converter(s), charge-pump converter(s), switched capacitor converter(s), and/or resonant switched capacitor converter(s).

Switches referred to within one or more embodiments may include but are not limited to MOSFET(s), IGBT(s), BJT(s), other transistor(s), and/or relay(s).

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIG. 8c illustrates a block diagram of a switching system according to illustrative embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
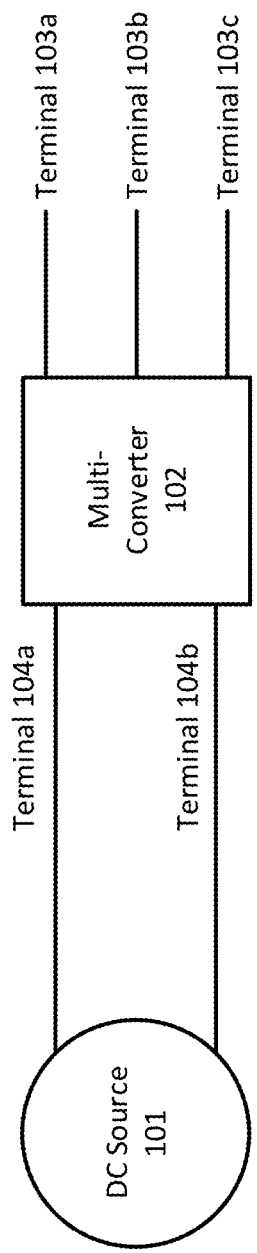
FIG. 1 is a block diagram of a multi-converter according to illustrative embodiments.

Reference is now made to FIG. 1, which illustrates a block diagram of a multi-converter according to illustrative embodiments. Multi-converter 102 may comprise terminals 104a and 104b and terminals 103a, 103b and 103c. Terminals 104a and 104b may be coupled to direct-current (DC) source 101. Terminal 103a and terminal 103b may provide AC voltages, and terminal 103c may provide a DC voltage that may correspond to about half of the voltage at terminal 104a with regard to terminal 104b. For example, DC source 101 may provide about 400 VDC and terminal 103c may provide about 200 VDC.

In some embodiments, terminals 103a and 103b may provide AC voltages that may have opposite phases with respect to terminal 103c. For example, terminal 103a may provide about $\sin(\omega t)$ VAC and terminal 103b may provide about $\sin(\omega t+\pi)$ VAC with respect to terminal 103c.

Figure 2A:
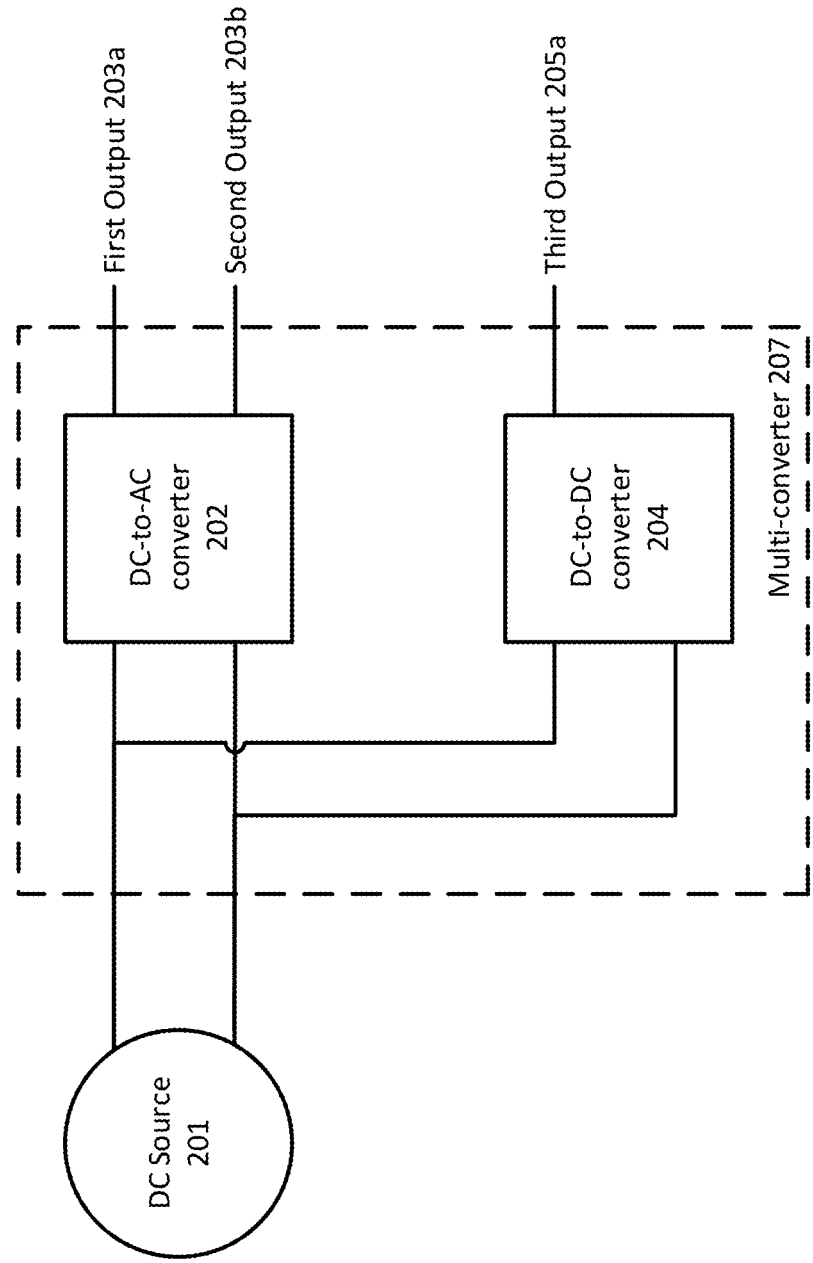
FIG. 2a is a block diagram of a multi-converter according to illustrative embodiments.

Reference is now made to FIG. 2a, which illustrates a block diagram of a multi-converter according to illustrative embodiments. Multi-converter 207 may comprise direct-current to alternating current (DC-to-AC) converter 202 and DC-to-DC converter 204. DC-to-AC converter 202 and DC-to-DC converter 204 may be configured to receive input power from DC power source 201. DC-to-AC converter 202 may be configured to output an AC voltage. DC-to-DC converter 204 may be configured to step down the DC voltage received from DC source 201 by about half (e.g., receive an input DC voltage of about 340V and output a DC voltage of about 170V). A DC-to-DC converter may comprise two output terminals. In some cases, only one output of DC-to-DC converter may be provided as a reference point for the other output terminals. In some embodiments, a second output, not shown in this figure, may provide the same voltage as one of the inputs of DC-to-DC converter 204, or a different voltage.

Still referring to FIG. 2a, the voltage provided at first output 203a may be an AC voltage, and the voltage provided at second output 203b may be an AC voltage with a phase shift of about 180 degrees with regard to the voltage at first output 203a. The voltage provided at third output 205a may be a middle voltage about equal to the midpoint voltage value between the voltage provided at first output 203a and the voltage provided at second output 203b. As a numerical example, the second terminal of DC source 201 may provide a voltage of about 340V with respect to the first terminal of DC source 201, the voltage provided at first output 203a may be about $170+\sin(2\pi ft)$V with respect to the first terminal of DC source 201, the voltage provided at second output 203b may be about $170+\sin(2\pi ft+\pi)$V with respect to the first terminal of DC source 201, and the voltage provided at third output 205a may be about 120V with respect to the second terminal of DC source 201, which may be about the middle voltage between the voltage at the first output 203a and the voltage at the second output 203b, and may be also about half the voltage provided by DC source 201.

In some embodiments, multi-converter 207 may perform estimation and/or determination of an electrical parameter (e.g., voltage, current, and/or power) at one or more of outputs 203a, 203b and 205a. Estimation and/or determination may be performed, for example, by a direct calculation, probabilistic calculation, measuring, sensing, lookup and/or reception (e.g., via wired or wireless communication) of an estimated or determined value. One or more sensors may be used to measure and/or sense the electrical parameters at first output 203a, second output 203b and/or third output 205a. In some embodiments, where measuring electrical parameters may include measuring current, it may be sufficient to measure and/or sense only two of the currents at two of the outputs. If there may be a need to determine and/or estimate the current at the third output that might not be measured, the current at the third output may be determined and/or estimated according to Kirchhoff's circuit laws. For example, the current flowing out of output 203a may be 10 A, the current flowing in output 205a may be 1 A, and according to Kirchhoff's current law the current flowing in 203b may be calculated to be 9 A. In some embodiments, it may be sufficient to determine and/or estimate only one electrical parameter. For example, a controller controlling DC-to-DC converter may measure and/or sense the current at output 205a and may reduce the current accordingly.

In some embodiments, electrical (e.g., voltage, power and/or current) measurements may be used as feedback parameters for control of DC-to-AC converter 202 and switching of DC-to-DC converter 204. In some embodiments, measurements may be used for logging data, updating a user interface and/or feedback for operating a load switching circuit (described below).

In some embodiments, DC-to-DC converter 204 may comprise multiple DC outputs for various applications (e.g., additional DC levels for a multi-level converter and/or power for one or more DC loads).

Figure 2B:
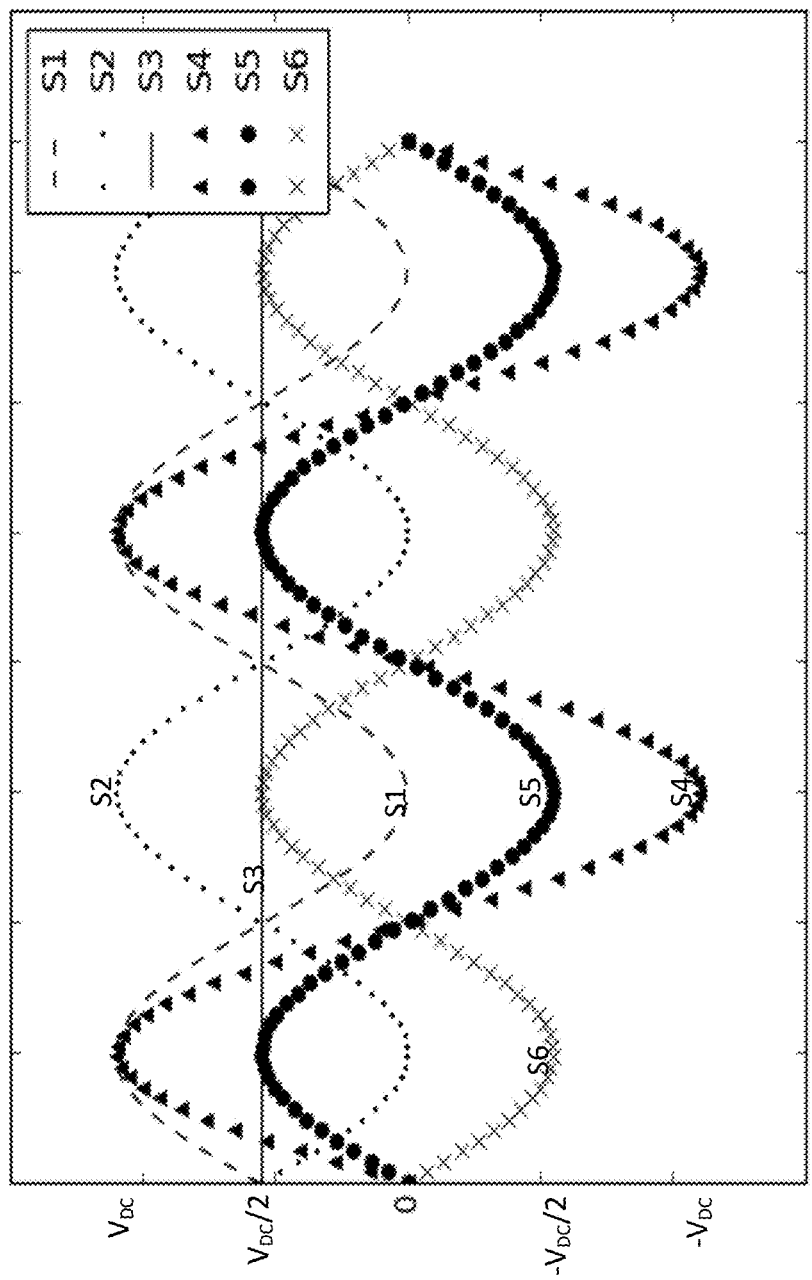
FIG. 2b illustrates voltage waveforms that may be provided by a multi-converter according to illustrative embodiments.

Reference is now made to FIG. 2b, which illustrates voltages that may be output by a multi-converter (e.g., multi-converter 207 of FIG. 2a) according to illustrative embodiments. For illustrative purposes, the voltage at the first terminal of DC source 201 may be denoted as zero voltage. The voltage at the second terminal of DC source 201 may be $V_{DC}$ with respect to the first terminal of DC source 201. Voltages S1 and S2 may represent the voltage at output 203a and at output 203b, respectively, with respect to the first terminal of DC source 201. Voltages S1 and S2 may represent AC voltages that may oscillate between zero and $V_{DC}$ with respect to the first terminal of DC source 201. Voltage S3 may represent the voltage at output 205a, which may be about half of $V_{DC}$ with respect to the first terminal of DC source 201. Voltage S4 may represent the voltage at output 203a with respect to output 203b. Voltage S4 may oscillate in a sinusoidal manner between $\pm V_{DC}$. Voltage S5 may be a voltage having an amplitude between the voltage amplitude of output 203a and the voltage amplitude of output 205a. Voltage S5 may oscillate in a sinusoidal manner or any other type of a periodic wave between $\pm \frac{1}{2}V_{DC}$. Voltage S6 may be a voltage having an amplitude between the voltage amplitude of output 203b and the voltage amplitude of output 205a. Voltage S6 may oscillate in a periodic (e.g., sinusoidal) manner between $\pm \frac{1}{2}V_{DC}$. Voltages S5 and S6 may be phase-shifted by about 180 degrees with respect to each other.

Figure 3:
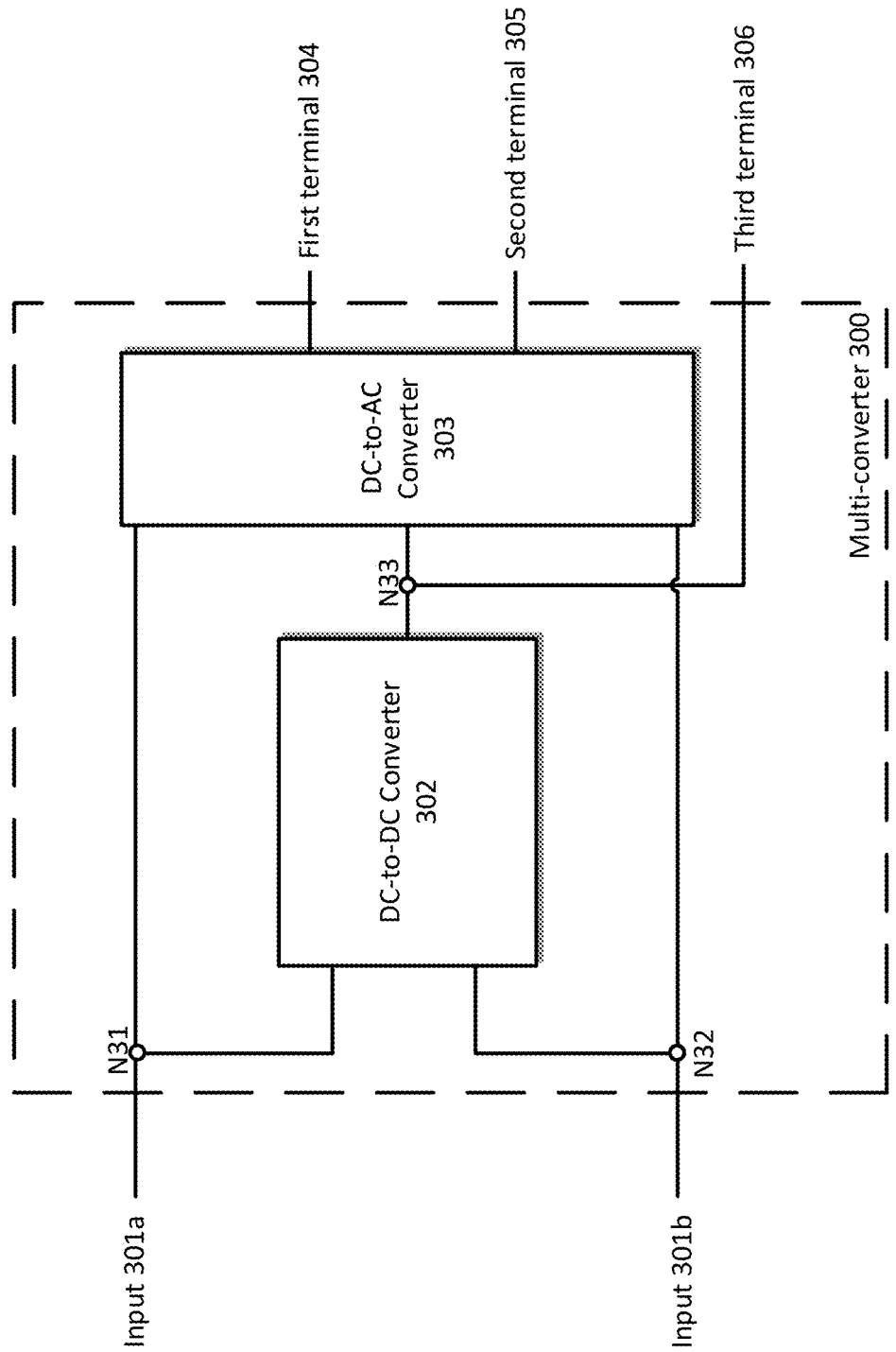
FIG. 3 is a block diagram of a multi-converter according to illustrative embodiments.

Reference is now made to FIG. 3, which illustrates a block diagram of a multi-converter according to illustrative embodiments. Multi-converter 300 may comprise DC-to-DC converter 302 and DC-to-AC converter 303. DC-to-DC converter 302 may be similar to DC-to-DC converter 204 of FIG. 2a. DC-to-AC converter 303 may be similar to DC-to-AC converter 202 of FIG. 2a. The input terminals of DC-to-DC converter 302 and of DC-to-AC converter 303 may be coupled to nodes N31 and N32, which may be coupled to input 301a and 301b, respectively. The output terminal of DC-to-DC converter 302 may be coupled to node N33, which may be coupled to one of the inputs of DC-to-AC converter 303 and may be coupled to third terminal 306. The outputs of DC-to-AC converter 303 may be coupled to first terminal 304 and to second terminal 305.

Still referring to FIG. 3, in some embodiments, DC-to-AC converter 303 may use the voltage that is outputted by DC-to-DC converter 302 depending on the converter topology. For example, a neutral point clamped (NPC) inverter or a different topology of multi-level inverter may use the mid-voltage for harmonic reduction by creating more voltage levels than a two-level inverter.

In some embodiments, multi-converter 300 may be configured to convert DC power from one or more PV modules to AC power for a residential or commercial split-phase electrical system. Multi-converter 300 may comprise a controller configured for increasing power and/or for maximum power point tracking (MPPT) and/or impedance matching.

Figure 4A:
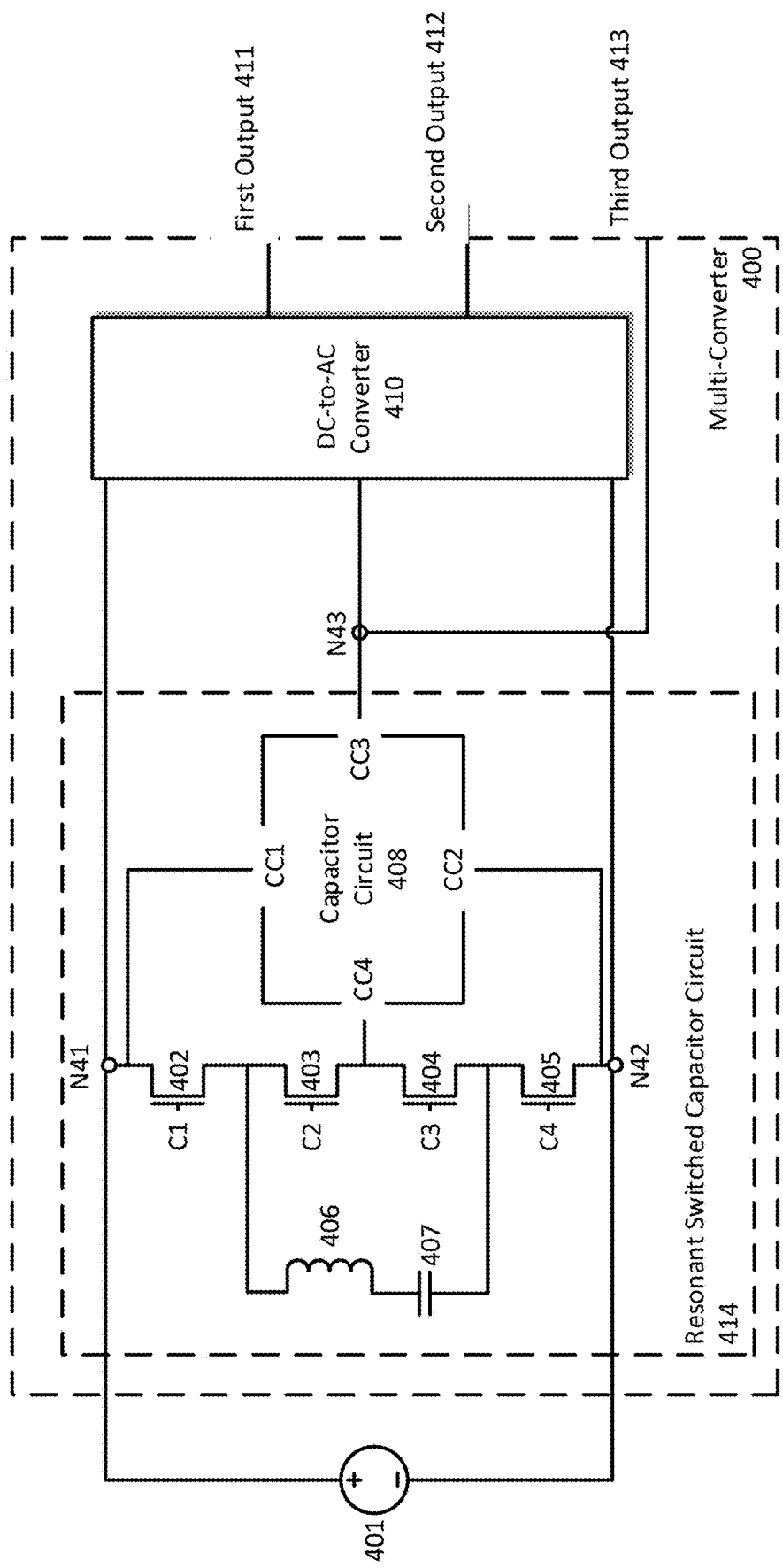
FIG. 4a is part schematic, part block diagram of a multi-converter according to illustrative embodiments.

Reference is now made to FIG. 4a, which is part schematic, part block diagram of a multi-converter according to illustrative embodiments. Power source 401 may be coupled to multi-converter 400. Multi-converter 400 may be an implementation of multi-converter 300 of FIG. 3. Multi-converter 400 may comprise resonant switched capacitor circuit (RSCC) 414 and DC-to-AC converter 410. RSCC 414 may be a part of a DC-to-DC converter similar to DC-to-DC converter 302 of FIG. 3. The input terminals of RSCC 414 may be coupled to nodes N41 and N42, which may be similar to nodes N31 and N32 of FIG. 3. Nodes N41 and N42 may be coupled to power source 401. The output of RSCC 414 may be coupled to node N43, which may be similar to node N33 of FIG. 3. RSCC 414 may, in some embodiments, be replaced by a different topology of a DC-to-DC converter, for example, a Buck, Boost, Buck/Boost, Buck+Boost, Flyback, Forward or Cuk converter, etc. Using the topology of RSCC 414 or a similar topology as a DC-to-DC converter may increase efficiency when the desired output of RSCC 414 is about half the input voltage. Signals C1, C2, C3 and C4 may be configured to control switches 402 ... 405 of RSCC 414 to provide at the output of RSCC 414 a voltage of about half the input voltage. Signals C1-C4 may be switched between two voltage levels, each level representing a state of a switch (e.g. "on" and "off"). In some embodiments, RSCC 414 may comprise but are not limited to four switching modes. During the first mode, switches 402 and 404 may be "on". During the second mode, switches 403 and 404 may be "on". During the third mode, switches 403 and 405 may be "on". During the fourth mode, switches 402 and 405 may be "on". A controller (not shown in FIG. 4a) providing signals C1-C4 may control the switching between modes and the time interval of one or more modes. In some embodiments, the timing of the switching and the values of inductor 406 and capacitor 407 may be designed to realize soft switching operation. The average voltage of capacitor 407 may be about half of the input voltage. Other embodiments may comprise different switching modes that may achieve similar results. RSCC 414 may comprise capacitor circuit 408. Capacitor circuit 408 may be designed to reduce the ripple at the output of RSCC 414. Some implementations of capacitor circuit 408 may comprise various topologies of capacitors and in some embodiments also switches. In some embodiments, each of switches 402, 403, 404, 405 may be implemented using a plurality of transistors, for example, MOSFETs, IGBTs, BJTs, or other suitable electronic devices.

An RSCC may reduce the power losses and electromagnetic interference (EMI) compared to other DC-to-DC converters. For example, compared to a buck converter, the RSCC may have a smaller inductor because capacitor circuit 408 may serve for energy storage similar to switched capacitor circuits. Compared to switched capacitor circuits (SCC), an RSCC may have an additional small inductor, such as inductor 406, which may contribute to soft switching that may reduce switching losses and also may contribute to reducing EMI. RSCC control may be based on various methods that may have different properties. For example, RSCC control may include fixed periodic gate signals, controlling blanking time, switching frequency, duty cycle, and/or phase-shift angle.

Still referring to FIG. 4a, some output voltages may correspond to voltages indicated in FIG. 2b. For example, the voltage at third output 413 may correspond to voltage S3 of FIG. 2b. The voltage at first output 411 with respect to third output 413 may correspond to voltage S5. The voltage at second output 412 with respect to third output 413 may correspond to voltage S6.

Figure 4B:
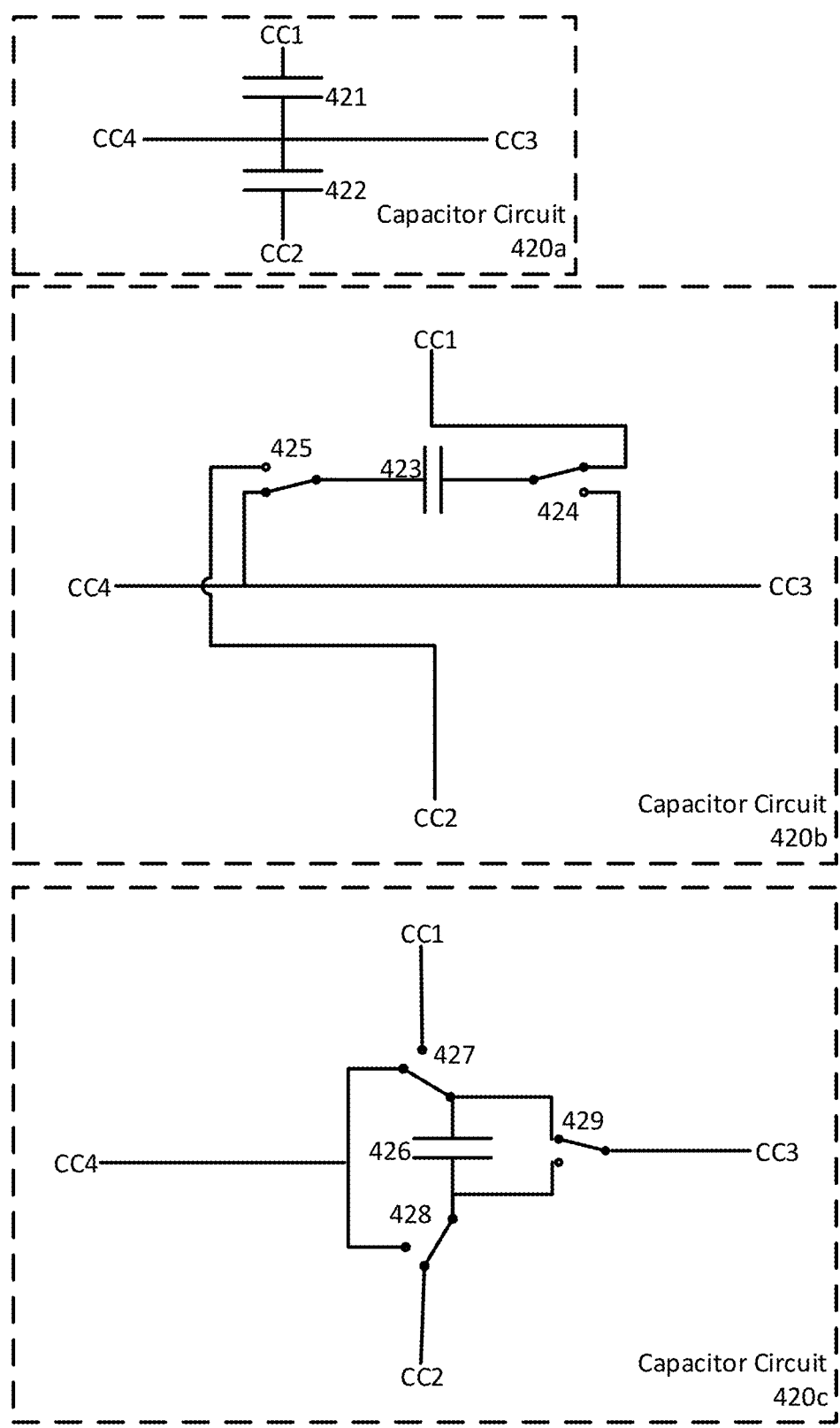
FIG. 4b illustrates schematic diagrams for a capacitor circuit according to illustrative embodiments.

Reference is now made to FIG. 4b, which comprises schematic diagrams for a capacitor circuit according to illustrative embodiments. Terminals CC1 and CC2 may be coupled to the outputs of a DC source, terminal CC4 may be coupled between switches 403 and 404 of FIG. 4a, and terminal CC3 may be coupled to the output of RSCC 414. Capacitor circuits 420a, 420b and 420c may be possible implementations of capacitor circuit 408 of FIG. 4a. Capacitor circuit 408 may comprise terminals CC1, CC2, CC3 and CC4. Capacitor circuit 420a may comprise capacitors 422 and 421, wherein the first terminal of capacitor 422 may be coupled to terminal CC2, wherein the second terminal of capacitor 421 may be coupled to terminal CC1, and wherein the first terminal of capacitor 421 and the second terminal of capacitor 422 may be coupled to each other and to terminals CC3 and CC4.

Still referring to FIG. 4b, capacitor circuit 420b may comprise capacitor 423, switch 424 and switch 425. Terminals CC4 and CC3 may be coupled to each other. Switches 424 and 425 may couple capacitor 423 to terminal CC3 and CC4 and to either terminal CC1 or CC2. Capacitor circuit 240b may be operated such that, for a first period of time, switch 425 is controlled to couple the first terminal of capacitor 423 to terminal CC4, and switch 424 may be controlled to couple the second terminal of capacitor 423 to terminal CC1. For a second period of time, switch 425 may be controlled to couple the first terminal of capacitor 423 to terminal CC2, and switch 424 may be controlled to couple the second terminal of capacitor 423 to terminal CC3. If the voltage at terminal CC4 and CC3 with respect to the voltage at terminal CC2 is about half of the voltage at terminal CC1 with respect to the voltage at terminal CC2, the voltage over capacitor 423 may be about half of the voltage at terminal CC1 with respect to the voltage at terminal CC2, with capacitor 423 alternately clamped to the voltage at terminal CC1 or the voltage at terminal CC2.

For example, switches 425 and 424 may be operated such that for a first period of time, a first terminal of capacitor 423 is coupled (e.g., connected) to terminal CC2 via switch 425 and a second terminal of capacitor 423 is coupled (e.g., connected) to terminal CC3 via switch 424, and for a second period of time, the first terminal of capacitor 423 is coupled (e.g., connected) to terminal CC4 via switch 425 and the second terminal of capacitor 423 is coupled (e.g., connected) to terminal CC1 via switch 424.

Still referring to FIG. 4b, capacitor circuit 420c may comprise capacitor 426, switch 427, switch 428 and switch 429. Switches 427, 428 and 429 may couple capacitor 426 to terminal CC3 and CC4 and to either terminal CC1 or CC2. Switches 427 and 428 may be switched in a complementary manner such that the terminals of capacitor 426 might not be coupled to terminals CC1 and CC2 at the same time, and switch 429 may selectively connect terminal CC3 to terminal CC4 via switches 427 and/or 428. For example, when switch 428 is operated to couple (e.g., connect) the first terminal of capacitor 426 to terminal CC2 and switch 427 is operated to couple the second terminal of capacitor 426 to terminal CC4, switch 429 may be operated to couple terminal CC3 to the second terminal of capacitor 426.

For example, switches 427, 428 and 429 may be operated such that for a first period of time, a first terminal of capacitor 426 is coupled (e.g., connected) to terminal CC2 via switch 428 and a second terminal of capacitor 423 is coupled (e.g., connected) to terminal CC4 via switch 427 and terminal CC3 is coupled to the second terminal of capacitor 426 via switch 429, and for a second period of time, the first terminal of capacitor 426 is coupled (e.g., connected) to terminal CC4 via switch 428 and the second terminal of capacitor 426 is coupled (e.g., connected) to terminal CC1 via switch 427 and terminal CC3 is coupled to the first terminal of capacitor 426 via switch 429.

In some embodiments, each of switches 424, 425, 427, 428 and 429 may be implemented using a plurality of transistors, for example, MOSFETs, IGBTs, BJTs, or other suitable electronic devices.

Figure 5:
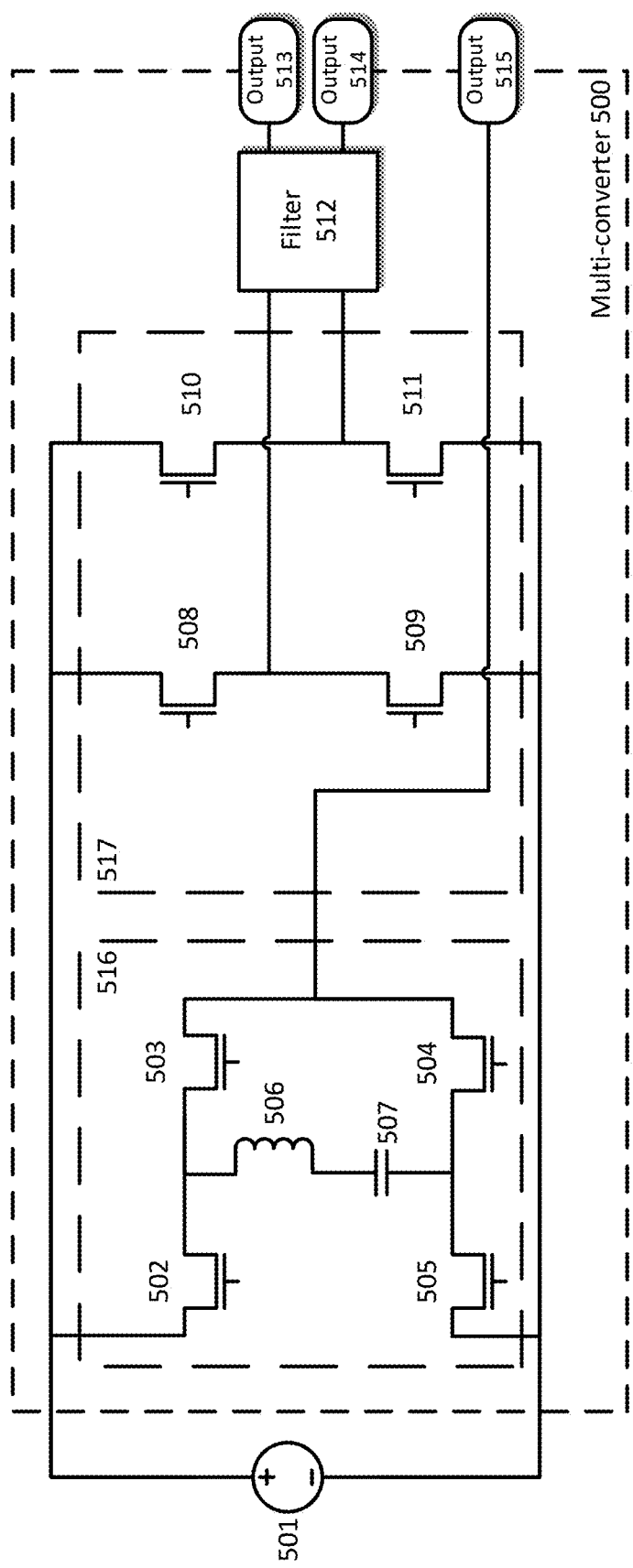
FIG. 5 is part schematic, part block diagram of a multi-converter according to illustrative embodiments.

Reference is now made to FIG. 5, which is part schematic, part block diagram of an electrical system having a multi-converter according to illustrative embodiments. DC source 501 may be coupled to multi-converter 500. Multi-converter 500 may comprise block 516 and block 517. Block 516 may be a resonant switched capacitor circuit that may be similar to RSCC 414 of FIG. 4a, and block 517 may be a DC-to-AC converter that may be similar to DC-to-AC converter 410 of FIG. 4a. With respect to block 516, the resonant portion may be provided by the series connection of inductor 506 and capacitor 507. The series connection of inductor 506 and capacitor 507 may be respectively connected across the point and/or node where switches 502 and 503 are connected in series and switches 505 and 504 are connected in series. The other ends of switches 502 and 505 connect respectively to the positive (+) and negative (−) terminals of DC source 501. The other end of switches 503 and 504 connect together to give output 515 of multi-converter 500.

With respect to block 517, signals controlling switches 508, 509, 510 and 511 may be configured to generate an AC voltage at the output of block 517. A series connection of switches 508 and 509 are connected across the positive (+) and negative (−) terminals of DC source 501. Similarly, a series connection of switches 510 and 511 are connected across the positive (+) and negative (−) terminals of DC source 501. The respective points and/or nodes of where switches 508 and 509 connected together and where switches 510 and 511 are connected together may be connected to the input of filter 512. Outputs 513 and 514 may be provided from the output of filter 512.

In some embodiments, the voltage generated at the output of block 517 may be smoothed by filter 512. For example, filter 512 may comprise a circuit (e.g., an LC circuit) designed to reduce the energy at high frequencies. Block 517 may be referred to as a two-level inverter because the outputs of block 517 may be coupled to two voltage levels, the voltage at the first terminal of DC source 501 and the voltage at the second terminal of DC source 501. Block 517 may be replaced with a DC-to-AC converter that may comprise more DC levels that may be referred to as a multi-level inverter (e.g., a Neutral Point Clamp inverter or a Flying Capacitor inverter). A multi-level converter may use the regulated output of block 516 as an additional DC level.

In some embodiments, the signals controlling switches 508-511 may switch between two voltage levels, each level representing a state of a switch (e.g., "on" and "off"). The signals may be generated by an external device and/or a controller, which may be a part that is not shown in the illustration of multi-converter 500. Different types of implementations of a controller may include a digital signal processor (DSP), micro-control unit (MCU), field-programmable gate array (FPGA), application-specific integrated circuit (ASIC), and/or an analog control circuit.

Figure 6A:
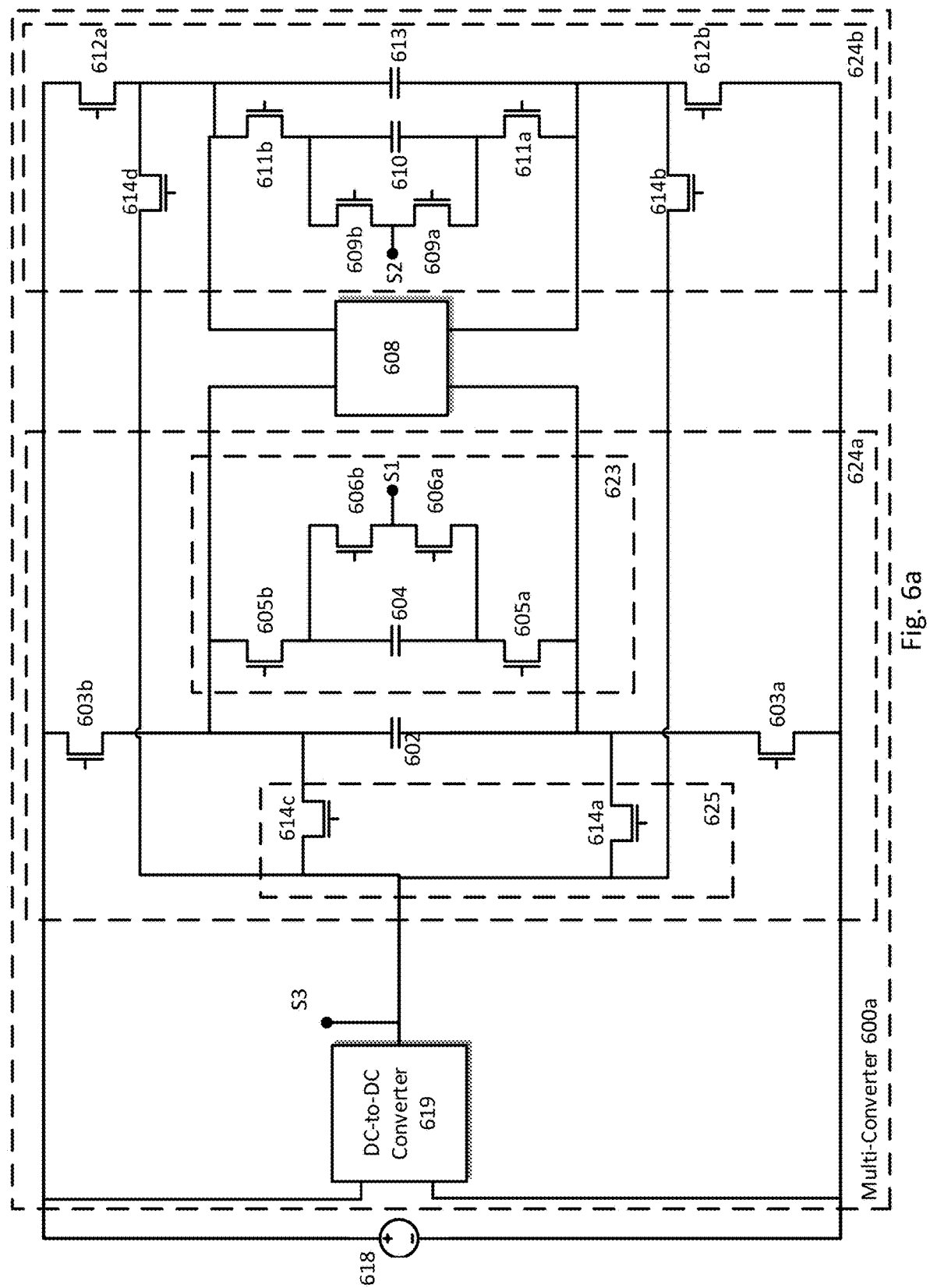
FIG. 6a is part schematic, part block diagram of an electrical system having a multi-converter according to illustrative embodiments.

Reference is now made to FIG. 6*a*, which illustrates a part schematic, part block diagram of a multi-converter according to illustrative embodiments. DC source 618 may be coupled to multi-converter 600*a*. Multi-converter 600*a* may be an implementation of multi-converter 300 of FIG. 3. Multi-converter 600*a* may comprise DC-to-DC converter 619 that may be similar to DC-to-DC converter 302 of FIG. 3. Terminal S3, which may be coupled to the output of DC-to-DC converter 619, may also be an output terminal of multi-converter 600*a*. Multi-converter 600*a* may be configured to output an AC voltage at terminal S1 with respect to terminal S3 and to output an AC voltage at terminal S2 with respect to terminal S3. The voltage at the second terminal of DC source 618 with respect to the first terminal of DC source 618 may be $V_{DC}$. DC-to-DC converter 619 may be configured to output a DC voltage of about $V_{DC}/2$ with respect to the first terminal of DC source 618. Multi-converter 600*a* may comprise block 624*a* and block 624*b*. Block 624*a* and block 624*b* may comprise similar components. Block 624*a* is described herein below in detail. Block 624*a* may comprise block 625, which may comprise switches 614*a* and/or 614*c*. In some embodiments, only switch 614*a* or switch 614*c* may be present.

In block 624*b*, switches 611*b* and 611*a* are connected in series with capacitor 610. The output of block 608 connects across the series connection of switches 611*b* and 611*a* and capacitor 610. The series connection of switches 609*a* and 609*b* connect across capacitor 610. Terminal S2 may be provided at the connection between switches 609*a* and 609*b*. Block 623 may provide similar circuit connections as block 624*b* with respect to switches 605*a* and 605*b* wired in series with capacitor 604 and switches 606*a* and 606*b* connected in series and across capacitor 604. Terminal S1 is provided at the point where switches 606*a* and 606*b* are connected in series and the series connection between 605*a* and 605*b* may be connected across the input of block 608.

Still further with respect to block 624*b*, capacitor 613 may be connected across the series connection of switches 611*a* and 611*b*. Capacitor 613 may be wired in series between switches 612*a* and 612*b* which are further connected across DC source 618. Switch 614*d* is connected at the point of connection between switch 612*a*/capacitor 613 and terminal S3. In a similar way, switch 614*b* is connected at the point of connection between switch 612*b*/capacitor 613 and terminal S3.

In some embodiments, switch 614*a* may couple the first terminal of capacitor 602 to the output of DC-to-DC converter 619, while the second terminal of capacitor 602 is coupled to DC source 618 through switch 603*b* and/or when switch 603*a* is off. Similarly, switch 614*c* may couple the second terminal of capacitor 602 to the output of DC-to-DC converter 619 when the first terminal of capacitor 602 is coupled to DC source 618 through switch 603*a* and/or when switch 603*b* is off. Coupling one of the terminals of capacitor 602 to the output of DC-to-DC converter 619 may clamp the voltage to the voltage at the output of DC-to-DC converter 619. Clamping and/or voltage clamping may comprise shifting the DC voltage at a first terminal and the voltage at a second terminal of an electrical part having two terminals by about the same value, in a way that the differential voltage between the first terminal and the second terminal does not substantially change. The average voltage at the second terminal of capacitor 602 with respect to the first terminal of capacitor 602 may be about half of the voltage of DC source 618.

Still referring to FIG. 6*a*, multi-converter 600*a* may comprise block 623. Block 623 may comprise two inputs. The first input may be coupled to the first terminal of capacitor 602, and the second input may be coupled to the second terminal of capacitor 602. The voltage at the second input of block 623 with respect to the first input of block 623 may be referred to as the input voltage of block 623. The input voltage of block 623 may be clamped to various voltages by switching switches 603*a*, 603*b*, 614*a* and/or 614*c*. The output of block 623 may be coupled to terminal S1 and may be switched between the two input voltages. Block 625 and/or switches 603*a* and 603*b* may change the clamping point of the input voltage of block 623. For example, the voltage at the second terminal of DC source 618 with respect to the first terminal of DC source 618 may be $V_{DC}$ and the voltage at the second terminal of capacitor 602 with respect to the first terminal of capacitor 602 may be $V_{DC}/2$.

When switch 603*a* is "off" and switch 614*a* is "on", the voltage at the second terminal of capacitor 602 with respect to the first terminal of DC source 618 may be $V_{DC}$ and the voltage at the first terminal of capacitor 602 with respect to the first terminal of DC source 618 may be $V_{DC}/2$. When switch 614*a* is "off" and switch 603*a* is "on", the voltage at the second terminal of capacitor 602 with respect to the first terminal of DC source 618 may be about $V_{DC}/2$ and the voltage at the first terminal of capacitor 602 with respect to the first terminal of DC source 618 may be about zero. Similarly, to capacitor 602, the average voltage at the second terminal of capacitor 604 with respect to the first terminal of capacitor 604 may be about half of the voltage at the second terminal of capacitor 602 with respect to the first terminal of capacitor 602.

Switches 606*a* and 606*b* may switch in a complementary manner. The switching of switches 606*a* and 606*b* may set the output voltage at terminal S1. For example, when switch 606*a* is "on" and switch 606*b* is "off", terminal S1 may be coupled to the second terminal of capacitor 604, and when switch 606*a* is "off" and switch 606*b* is "on", terminal S1 may be coupled to the first terminal of capacitor 604. The voltage at terminal S1 may be an AC voltage with respect to terminal S3.

Still referring to FIG. 6*a*, multi-converter 600*a* may comprise block 608. Block 608 may provide an electrical connection between capacitors 602, 604, 610 and 613, which may provide paths for current sharing between capacitors 602, 604, 610 and 613. Block 608 may reduce the switching ripple across capacitors 602, 604, 610 and 613, e.g., by allowing current sharing that may result in superposition of current ripples in a manner that reduces a magnitude of associated current ripples Reference is now made to FIG. 6*b*, which illustrates a schematic diagram of a multi-converter according to illustrative embodiments. DC source 618 may be coupled to multi-converter 600*b*. Multi-converter 600*b* may be similar to multi-converter 600*a* of FIG. 6*a*. Switches 620*a* . . . 620*d*, inductor 620 and capacitor 622 may be parts of resonant switched capacitor circuit (RSCC) 626. RSCC 626 may be a possible part of a DC-to-DC converter similar to DC-to-DC converter 619 of FIG. 6*a*. In RSCC 626, switch 620*a* is wired in series with inductor 621, capacitor 622 and switch 620*d*. The series connection of switch 620*a*, inductor 621, capacitor 622 and switch 620*d* may be connected across DC source 618. Switches 620*b* and 620*c* are wired in series and across the series connection of inductor 621 and capacitor 622. The point of connection between switches 620b and 620c may provide terminal S3 and connection to the remaining portion of multi-converter 600b at the series connection between switches 614a and 614c.

The series connection between switches 614a and 614c may be connected across capacitor 602. A series connection of switch 603b, capacitor 602 and switch 603a may be connected across DC source 618. A series connection of switch 605b capacitor 604 and switch 605a may be connected across capacitor 602. A series connection of switches 606a and 606b may be connected across capacitor 604. The connection between switches 606a and 606b may provide terminal S1.

A series connection of switches 612b, capacitor 613 and switch 612a may be connected across DC source 618. A series connection of switch 611b, capacitor 610 and switch 611a may be connected across capacitor 613. A series connection of switches 609a and 609b may be connected across capacitor 610. The point of connection between switches 609a and 609b may provide terminals S2.

Switch 608b connects between the point where switch 611a connects to capacitor 613 and the point where switch 605b connects to switch 614c/switch 603b. Switch 608a connects between the point where switch 611b connects to capacitor 613 and the point where switch 605a connects to switch 614a/switch 603a.

RSCC 626 may be configured to output a voltage that may be about half of the voltage of DC source 618. In some embodiments, instead of a part of blocks 624a and 624b of FIG. 6a, capacitors 602 and 613 and the switches used for voltage clamping may be part of a capacitor circuit that may be a part of RSCC 626, similar to capacitor circuit 408 of FIG. 4a.

Figure 6B:
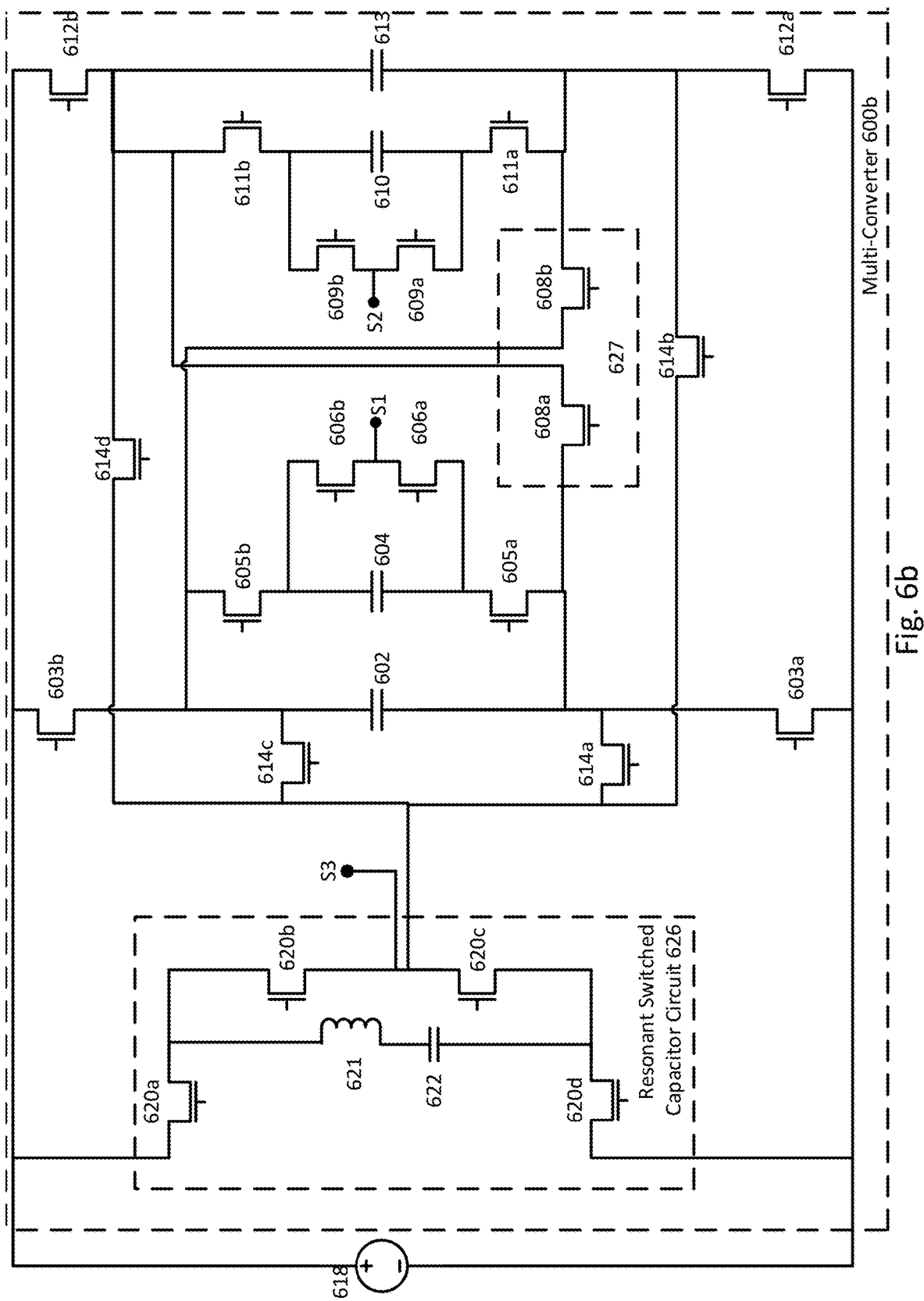
FIG. 6b is a schematic diagram of an electrical system having a multi-converter according to illustrative embodiments.

Still referring to FIG. 6b, switches 608a and 608b may be parts of block 627, which may be a possible part of block 608. When switch 608a is "on", it may provide an electrical connection between the first terminal of capacitor 602 and the second terminal of capacitor 613. When switches 605a and 608a are "on", there may be an electrical connection between the first terminal of capacitor 604, the first terminal of capacitor 602 and the second terminal of capacitor 613. When switches 611b and 608a are "on", there may be an electrical connection between the second terminal of capacitor 610, the first terminal of capacitor 602 and the second terminal of capacitor 613. When switch 608b is "on", it may provide an electrical connection between the first terminal of capacitor 613 and the second terminal of capacitor 602. When switches 611a and 608b are "on" there may be an electrical connection between the first terminal of capacitor 610, the first terminal of capacitor 613 and the second terminal of capacitor 602. When switches 605b and 608b are "on", there may be an electrical connection between the second terminal of capacitor 604, the first terminal of capacitor 613 and the second terminal of capacitor 602. The electrical connection described above may provide paths for current sharing between capacitors 602, 604, 610 and 613. Block 627 may reduce the switching ripple across capacitors 602, 604, 610 and 613, e.g., by allowing current sharing that may result in superposition of current ripples in a manner that reduces a magnitude of associated current ripples.

Figure 7:
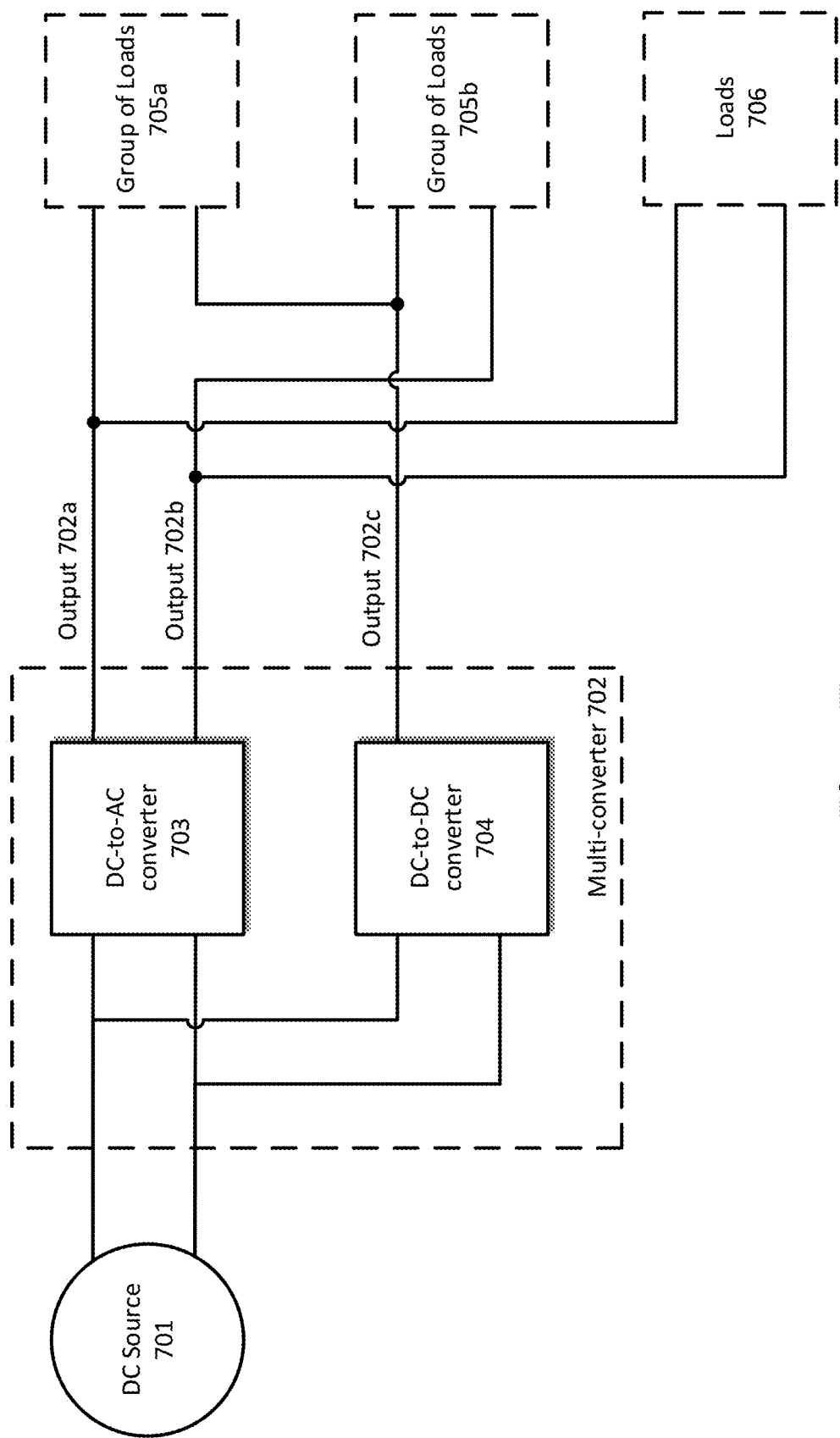
FIG. 7 illustrates a block diagram of an electrical system having a multi-converter according to illustrative embodiments.

Reference is now made to FIG. 7, which illustrates a block diagram of an electrical system having a multi-converter according to illustrative embodiments. Multi-converter 702 may comprise direct-current to alternating current (DC-to-AC) converter 703 and DC-to-DC converter 704. DC-to-AC converter 703 and DC-to-DC converter 704 may be configured to receive input power from DC source 701. DC-to-AC converter 703 may be configured to output a first AC voltage at output 702a and a second AC voltage at output 702b. DC-to-DC converter 704 may be configured to step down the DC voltage received from DC source 701 by about half (e.g., receive an input DC voltage of about 340V and output a voltage of about 170V) at output 702c. Group of loads 705a and group of loads 705b may be coupled to multi-converter 702 and may each comprise one or more loads. If groups of loads 705a and 705b are substantially balanced (i.e., group of loads 705a consumes substantially the same amount of power as group of loads 705b), currents flowing through outputs 702a and 702b may be substantially equal in magnitude and the voltage at output 702c may be about half of the voltage of DC source 701 even without active voltage control (e.g., by DC-to-DC converter 704). If group of loads 705a and group of loads 705b are not substantially balanced (e.g., group of loads 705a consumes more power than group of loads 705b), DC-to-DC converter 704 may regulate the voltage at output 702c to about half of the voltage of DC source 701 by supplementing and/or absorbing a current difference between group of loads 705a and group of loads 705b.

For example, a voltage source of 1V supplying voltage to two loads connected in series. If the two loads are substantially balanced (e.g., both require 1 Watt (W) of power) then the voltage between the two loads may be the same, in this example it would be 0.5 Volt (V), which is half of the voltage source. In this case, the same current may flow through both loads. If the first load requires 1 W and the second load requires 2 W of power, and a DC-to-DC converter is balancing the voltage between them (i.e., each load is supplied by 0.5V), then the currents flowing through each load may be different: the current flowing through the first load may be 2 Amps (A) and the current flowing through the second load may be 4 A. The DC-to-DC converter may supplement and/or absorb (depending on the polarity of the voltage source and the imbalance of the loads) the 2A difference in current. Therefore, reducing imbalance between the two loads may reduce the current and/or power flowing through the DC-to-DC converter. Similarly, a difference in power between group of loads 705a and group of loads 505b may result in a current flowing through output 702c. Reducing imbalance between group of loads 705a and group of loads 705b may reduce the current and/or power flowing through DC-to-DC converter 704, as was shown in the last example.

For example, keeping current and/or power flowing through DC-to-DC converter 704 to a low value may allow components having a low-power rating to be used for converter 704, which may result in cost savings when implementing converter 704. As an additional example, keeping current and/or power flowing through DC-to-DC converter 704 to a low value may increase the operational efficiency of converter 704. As another example, keeping current and/or power flowing through DC-to-DC converter 704 to a low value may reduce the amount of heat that may be dissipated from DC-to-DC converter 704.

Still referring to FIG. 7, some embodiments may include loads 706 that may be coupled to output 702a and to output 702b. Loads 706 may be configured to be coupled to an AC power source. For example, the voltage at output 702a with respect to output 702c and the voltage at output 702b with respect to output 702c may be about 120V RMS and with about a 180-degree phase difference with respect to each other. The voltage at output 702a with respect to output 702b may be about 240V RMS. Loads 706 may be configured to be coupled to a 240V RMS power source, which may be provided by coupling loads 706 between outputs 702a and 702b.

Figure 8A:
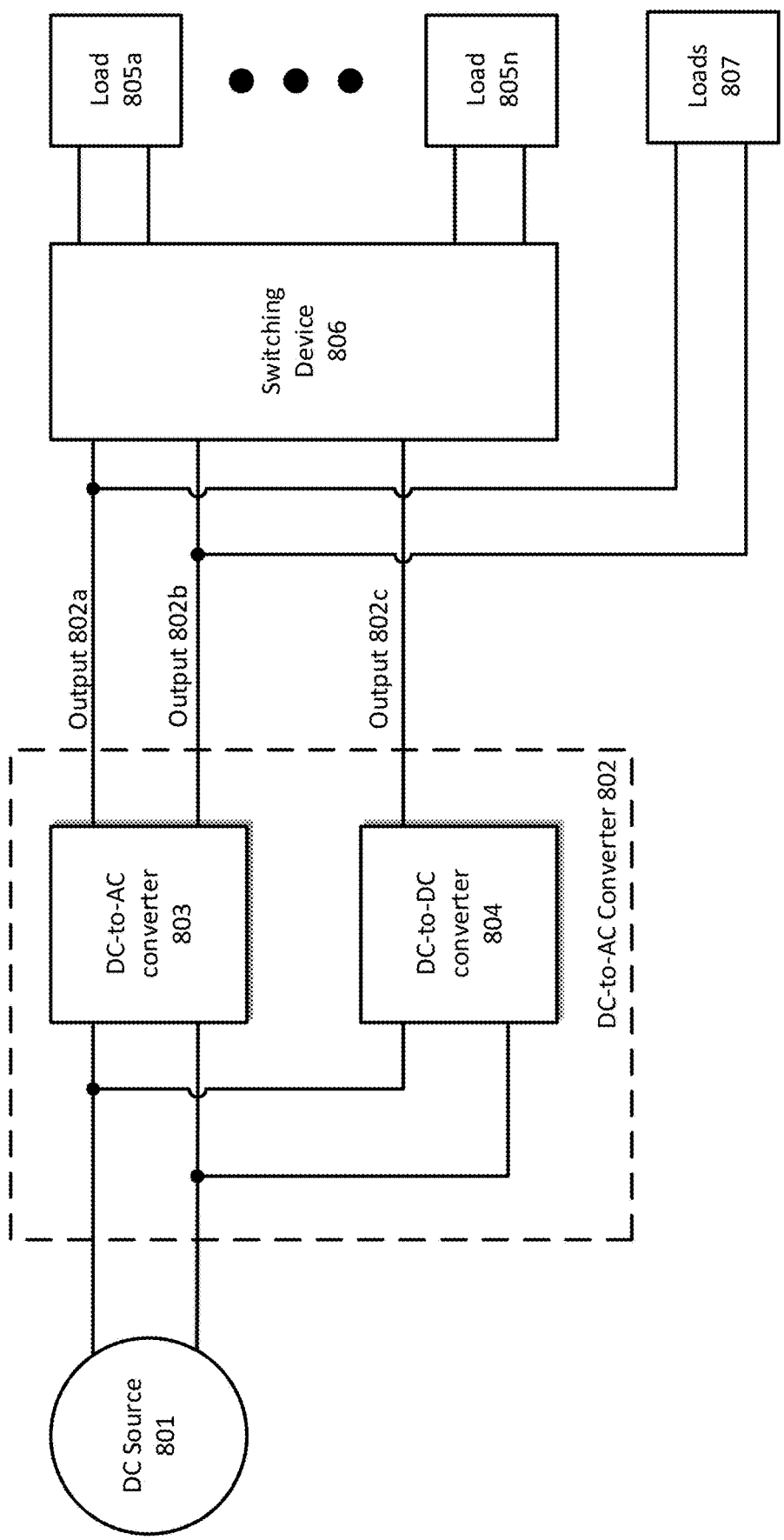
FIG. 8a illustrates a block diagram of an electrical system having a DC-to-AC converter according to illustrative embodiments.

Reference is now made to FIG. 8a, which illustrates a block diagram of an electrical system that includes a multi-converter according to illustrative embodiments. DC source 801 may be coupled to multi-converter 802. Multi-converter 802 may be similar to multi-converter 207 of FIG. 2a. Outputs 802a, 802b and 802c of multi-converter 802 may be coupled to switching device 806. Switching device 806 may be coupled to one or more loads of loads 805a . . . 805n. Multi-converter 802 may comprise DC-to-AC converter 803 and DC-to-DC converter 804. DC-to-AC converter 803 may be similar to DC-to-AC converter 202 and DC-to-DC converter 804 may be similar to DC-to-DC converter 204 of FIG. 2a. Switching device 806 may comprise switches that may couple loads of loads 805a . . . 805n to output 802c and to output 802a or output 802b. Switching device 806 may change the coupling of one or more loads of loads 805a . . . 805n from output 802a to output 802b of multi-converter 802 and/or from output 802b to output 802a by changing the state of one or more switches. Loads coupled to output 802a may be referred to as a first group of loads, and loads coupled to output 802b may be referred to as a second group of loads. Switching device 806 may comprise a controller and/or may be configured to receive a control signal that may be configured to decrease the difference between the power and/or current associated with the first group of loads and the power and/or current associated with the second group of loads by changing the state of the switches of switching device 806. Reducing the imbalance of the two groups may decrease the current and/or the power flowing through DC-to-DC converter 804 as described above.

In some embodiments, switching device 806 may have a user interface, e.g., a panel with a monitor and buttons or a GUI displayed on a monitor coupled to input devices such as a keyboard, a mouse and/or a touchscreen. The user interface may provide information regarding loads of loads 805a . . . 805n that may be coupled to switching device 806, information regarding the state of the switches (such as which loads may be coupled to which output terminals of DC-to-AC converter 803, how much power or current may be associated with a load and/or a group of loads) and/or information regarding the power and/or current flowing through DC-to-DC converter 804. The user interface may receive one or more constraints from a user such as forcing a load to couple to a certain output terminal of DC-to-AC convert 803.

In some embodiments, switching device 806 and/or a controller configured to control switching device 806 may comprise a communication device enabling communication with one or more devices such as an access point or a smartphone with a connection to the internet. In some embodiments, which may include a user interface, a connection to the internet may be used to display a GUI in a web browser or an application on a monitor. In some embodiments, switching device 806 may be configured to receive one or more signals from a remote control (e.g., a user controlling which loads are connected to which output via a smartphone or a remote control with an infra-red (IR) transmitter or transceiver).

Still referring to FIG. 8a, some embodiments may include loads 807 that may be similar to loads 706 of FIG. 7. Loads 807 may be coupled to output 802a and output 802b.

Figure 8B:
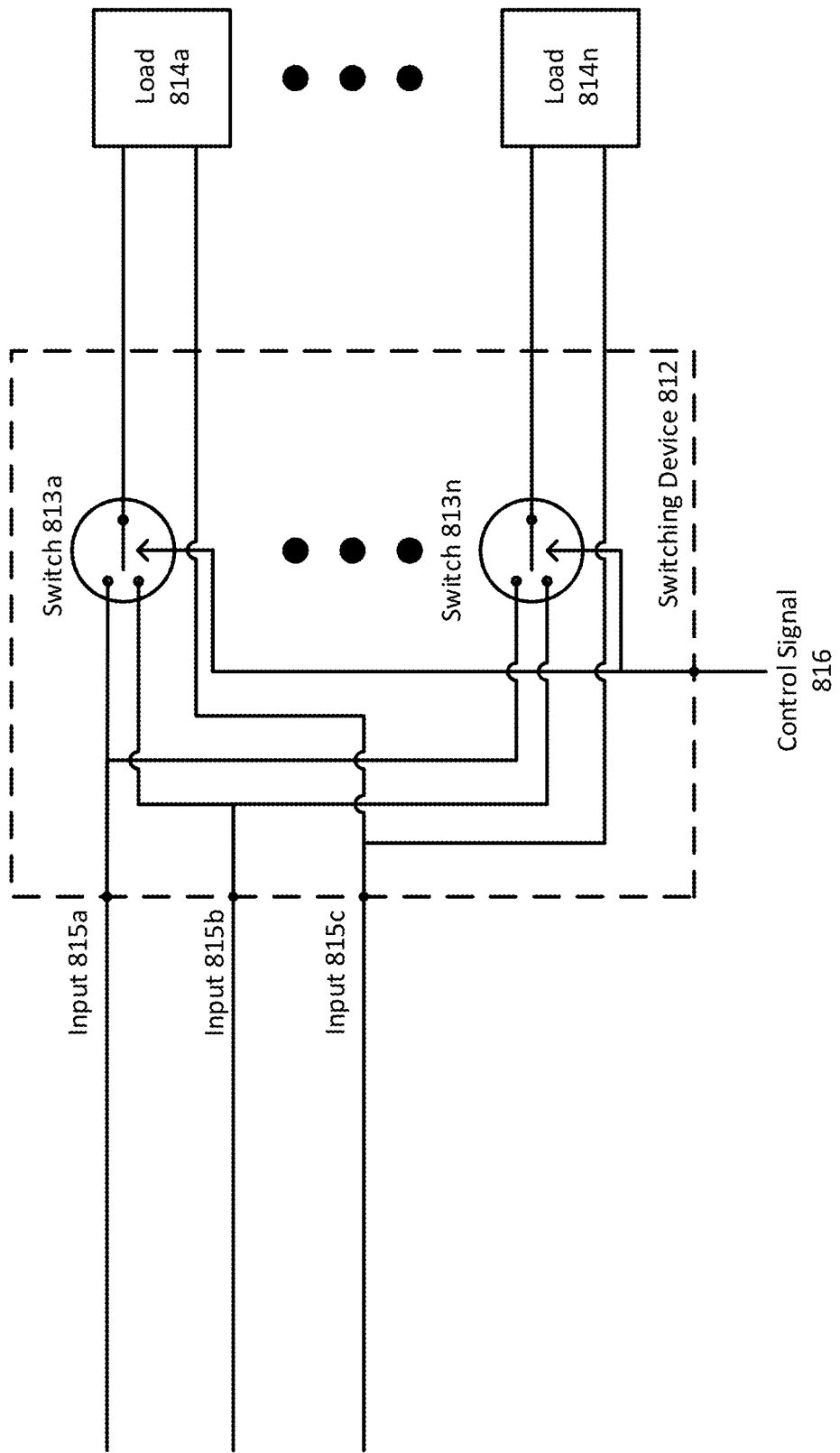
FIG. 8b illustrates a block diagram of a switching system according to illustrative embodiments.

Reference is now made to FIG. 8b, which illustrates a block diagram of a switching system according to illustrative embodiments. Switching device 812 may be an implementation of switching device 806 of FIG. 8a. Loads 814a . . . 814n may be similar to loads 805a . . . 805n of FIG. 8a. Switching device 812 may couple one or more loads of loads 814a . . . 814n to input 815c and to input 815a or input 815b. Switching device 812 may comprise switches 813a . . . 813n. Each switch of switches 813a . . . 813n may link a load of loads 814a . . . 814n to two of the inputs as described above. For example, each load may have a first terminal and a second terminal, each switch of switches 813a . . . 813n may comprise a third terminal, a fourth terminal and a common terminal. Each load may be coupled to a switch. The first terminal of a load may be coupled to a common terminal of a switch. The second terminal of a load may be coupled to input 815c. The third terminal of a switch may be coupled to input 815a and the fourth terminal may be coupled to input 815b. A switch of switches 813a . . . 813n may comprise a first state and a second state. The first state of a switch may couple the common terminal to the third terminal, and the second state of a switch may couple the common terminal to the fourth terminal. According to the above coupling of the illustrated elements, changing the state of a switch may allow to change the coupling of a load from input 815a to 815b and vice versa, i.e., switching a load from the first group of loads to the second group of loads.

Switch 813a and 813b of FIG. 8b are illustrated using single pole multiple throw switches. In some embodiments, a plurality of single-pole-single-throw switches may be used. For example, a pair of transistors (e.g. MOSFETs) may be used to implement switch 813a, a first transistor disposed between load 814a and input 815a and a second transistor disposed between load 814a and input 815b, with either the first transistor or the second transistor in the "on" position when power is provided to load 814a.

In some embodiments, where the input power is oscillating in a sinusoidal manner, the moment when a switch of switches 813a . . . 813n is switched may affect one or more loads of loads 814a . . . 814n. For example, for some loads (e.g., capacitive loads) it may be preferable to switch when the AC voltages are at zero (e.g., when S5 and S6 of FIG. 2b are at zero) and for some loads (e.g., inductive loads) it may be preferable to switch when the AC currents are at zero.

If a switch of switches 813a is switched when the voltage is at its peak value (e.g., when S4 of FIG. 2b is at $V_{DC}$), then there may be a fast change in the voltage, capacitive loads may be affected.

Still referring to FIG. 8b, control signal 816 may be configured to control the state of the switches. Control signal 816 may be provided by an external device (e.g., a controller configured to control multi-converter 802) and/or a controller that may be a part of switching device 812.

In some embodiments, switching device 812 may measure and/or sense one or more electrical parameters (e.g., the current and/or power) associated with each load or group of loads of loads 814a . . . 814n, and may send one or more of the measurements to a controller. Communication with a controller may be implemented in various methods such as power line communication (PLC), wired communication, wireless communication, acoustic communication, etc.

In some embodiments a controller configured to control the switches of switching device 812 may be configured to receive measurement of electrical parameters (e.g., voltage, current and/or power) associated with loads from a smart house system such as smart outlets or smart loads that may be able to communicate with the controller.

Reference is now made to FIG. 8c, which illustrates a block diagram of a switching system according to illustrative embodiments. Switches 823a . . . 823n may be similar to switches 813*a* . . . 813*n*. Switches 813*a* . . . 813*n* may be a part of a single switching device, whereas switches 823*a* . . . 823*n* may each be a part of a smart outlet of smart outlets 822*a* . . . 822*n*. Smart outlets 822*a* . . . 822*n* may switch loads from input 825*a* to input 825*b* and/or from input 825*b* to input 825*a*. A smart outlet of smart outlets 822*a* . . . 822*n* may measure and/or sense current and/or power associated with a load of loads 824*a* . . . 824*n* that may be coupled to the smart outlet. Smart outlets 822*a* . . . 822*n* may be configured to receive control signal 826. Smart outlets 822*a* . . . 822*n* may communicate with a controller and may send electrical (e.g., current power and/or voltage) measurements associated with loads 824*a* . . . 824*n*.

Communication with a controller may be implemented in various methods such as power line communication (PLC), wired communication, wireless communication, acoustic communication, etc. For example, each load of loads 824*a* . . . 824*n* may have a first terminal and a second terminal. Each smart outlet of smart outlets 822*a* . . . 822*n* may comprise a switch of switches 823*a* . . . 823*n*. Each switch of switches 823*a* . . . 823*n* may comprise a third terminal, a fourth terminal and a common terminal. Each load may be coupled to a switch of switches 823*a* . . . 823*n*. The first terminal of a load may be coupled to a common terminal of a switch. The second terminal of a load may be coupled to input 825*c*. The third terminal of a switch may be coupled to input 825*a* and the fourth terminal may be coupled to input 825*b*. A switch of switches 823*a* . . . 823*n* may comprise a first state and a second state. The first state of a switch may couple the common terminal to the third terminal, and the second state of a switch may couple the common terminal to the fourth terminal. According to the above coupling of the illustrated elements, changing the state of a switch may allow to change the coupling of a load from input 825*a* to 825*b* and vice versa. Smart outlets 822*a* . . . 822*n* may control the state of switches 823*a* . . . 823*n* according to control signal 826.

Figure 8D:
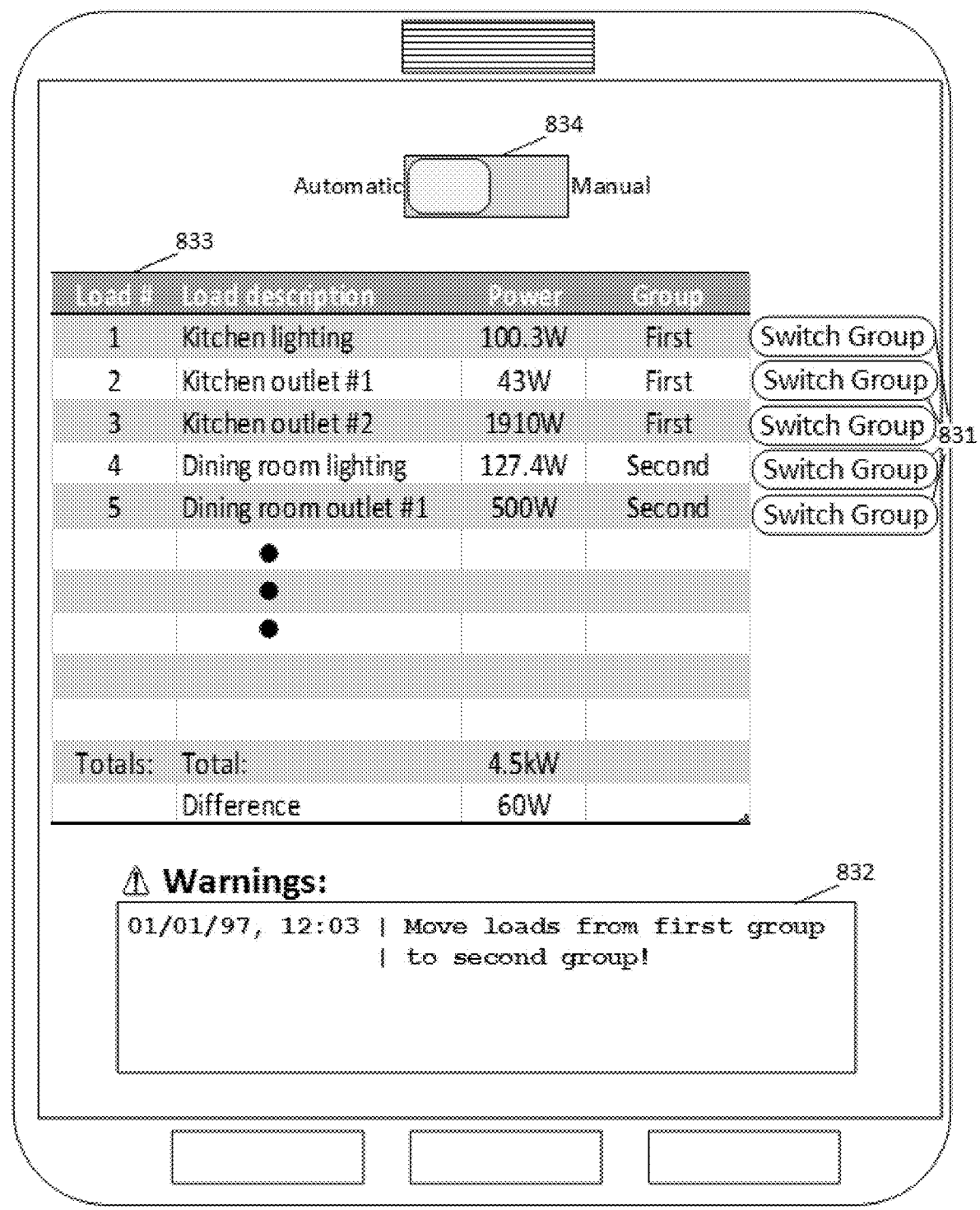
FIG. 8d illustrates a graphical user interface (GUI) application of a switching device according to illustrative embodiments.

Reference is now made to FIG. 8*d*, which illustrates a graphical user interface (GUI) application of a switching device. The application may be configured to control a switching device such as switching device 806 of FIG. 8*a*, switching device 812 of FIG. 8*b* and/or smart outlets 822*a* . . . 822*n* of FIG. 8*c*. The application may provide a control signal (such as control signal 816 of FIG. 8*b* and/or control signal 826 of FIG. 8*c*) to a switching device. The application may provide a list of loads 833 (e.g., loads 805*a* . . . 805*n* of FIG. 8*a*, loads 814*a* . . . 814*n* of FIG. 8*b*, and/or loads 824*a* . . . 824*n* of FIG. 8*c*). The application may provide a descriptive name of each load (e.g. "dining room outlet #1", "Master bedroom lights"). In some embodiments, where individual load values are available, the application may provide the current load value for each load. In some embodiments, the application may indicate the group of loads currently associated with each load on the list. The application may provide an option for manually changing the group of loads associated with a load. For example, a user may activate (e.g., using a touchscreen on a mobile phone, or a mouse on a computer) button 834 to change the mode from automatic to manual and vice versa. When in Automatic Mode, a program may be enabled, the program configured to set the association of one or more loads with a group of loads. For example, when in automatic mode, a controller is configured to operate switching device 806 to connect each load to a first group of loads or to a second group of loads. When in Manual Mode, the program may be disabled and/or may allow a user to set the association of one or more loads to a group of loads. In another example, a user may activate one or more of the "Switch Group" buttons 831, and be presented with the option of switching a load from a first group of loads to a second group of loads. Such an action may be desirable when a system maintainer (e.g., installer or electrical worker) would like to shut down a part of the electrical system (e.g., routine maintenance of the electrical system) and would like to first change the association of one or more loads with a group of loads connected to that part of the electrical system to a different group of loads that is connected to a different part of the electrical system. In some embodiments, automatic division of loads amongst different groups of loads may result in suboptimal division (e.g., with one group of loads consuming substantially more power than a second group of loads), and manual corrections may be beneficial.

Still referring to FIG. 8*d*, the application may be connected to wired communication networks, wireless communication networks, and/or data network(s), including an intranet or the Internet. The application may receive data from and send commands to system devices (e.g., multi-converter 802, loads 805*a* . . . 805*n* and/or switching device 806 of FIG. 8*a*) via a computing device on which the application is executing. In addition to providing information and control-related services to the end user, the application may receive notification of a potentially unsafe condition from one or more system-connected control and/or communication devices, and warn the user (e.g., a user and/or a system maintenance worker). These warnings may be audio and/or visual. They may, for example, be a pop-up window, text message, beep, tone, siren, LED, and/or high lumen LED. For example, when the current and/or power flowing through input 815*c* of FIG. 8*b* is above a predetermined threshold, the application may display in textbox 832 a warning message. The warning message may be triggered by the application or by a controller and/or communication device included in the switching device, such as switching device 806 of FIG. 8*a* and/or switching device 812 of FIG. 8*b*) and/or included in a multi-converter (such as multi-converter 802).

It is to be understood that the application as illustrated in FIG. 8*d* is merely an illustrative embodiment. User-interface applications may offer many additional features such as time and date indications, graphical system illustrations, communication services, weather forecasts, generation and load forecasts, service call capabilities and more. Furthermore, some applications may serve several electrical power systems, with a user able to scroll between screens indicating different electrical systems, and view and control each system individually.

Figure 9:
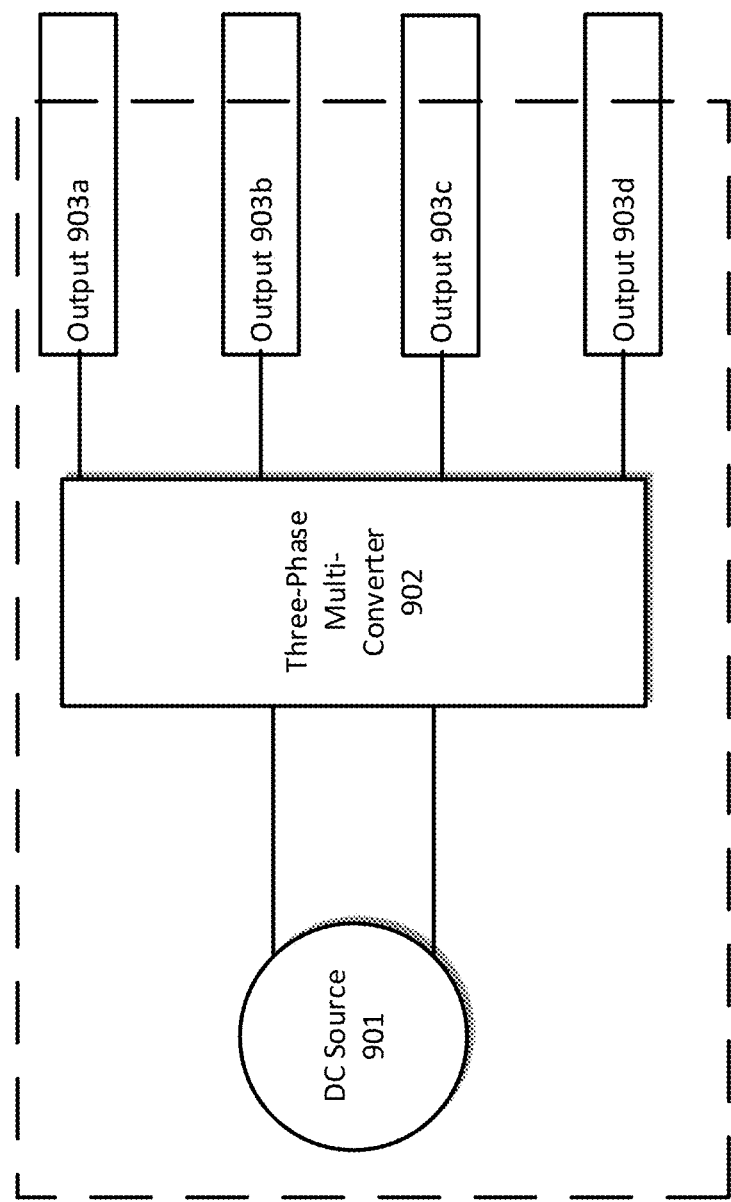
FIG. 9 illustrates a block diagram of a multi-converter according to illustrative embodiments.

Reference is now made to FIG. 9, which illustrates a block diagram of a three-phase multi-converter according to illustrative embodiments. DC source 901 may be coupled to three-phase multi-converter 902. Three-phase multi-converter 902 may comprise outputs 903*a* . . . 903*d*. Outputs 903*a*-903*c* may provide AC voltages with respect to output 903*d* with about the same voltage amplitude and/or RMS value and about the same frequency and about ±120 degrees phase shift with respect to each other. Output 903*d* may provide a DC voltage of about half of the input DC voltage.

Still referring to FIG. 9, the voltage between output 903*a* and 903*b* may be Vab, the voltage between output 903*b* and 903*c* may be Vbc and the voltage between output 903*c* and 903*a* may be Vca. In some embodiments, voltages Vac, Vbc and Vca may be AC voltages with about the same voltage amplitude and/or RMS value and about the same frequency and about ±120 degrees phase shift with respect to each other. The voltage between output 903*a* and output 903*d* may be Vad and the voltage between output 903*d* and output 903*b* may be Vdb. In some embodiments, Vad may be equal to Vdb, and Vcd may have a voltage amplitude and/or RMS value of about √3 of the voltage amplitude and/or RMS value of Vad, and have a phase shift of about π/2 with respect to Vad and Vbd. For example, Vad may be 170 sin(wt) (120V RMS), Vbd may be 170 sin(wt+π) (120V RMS) and Vcd may be 294 sin(wt+π/2) (208V RMS).

Figure 10:
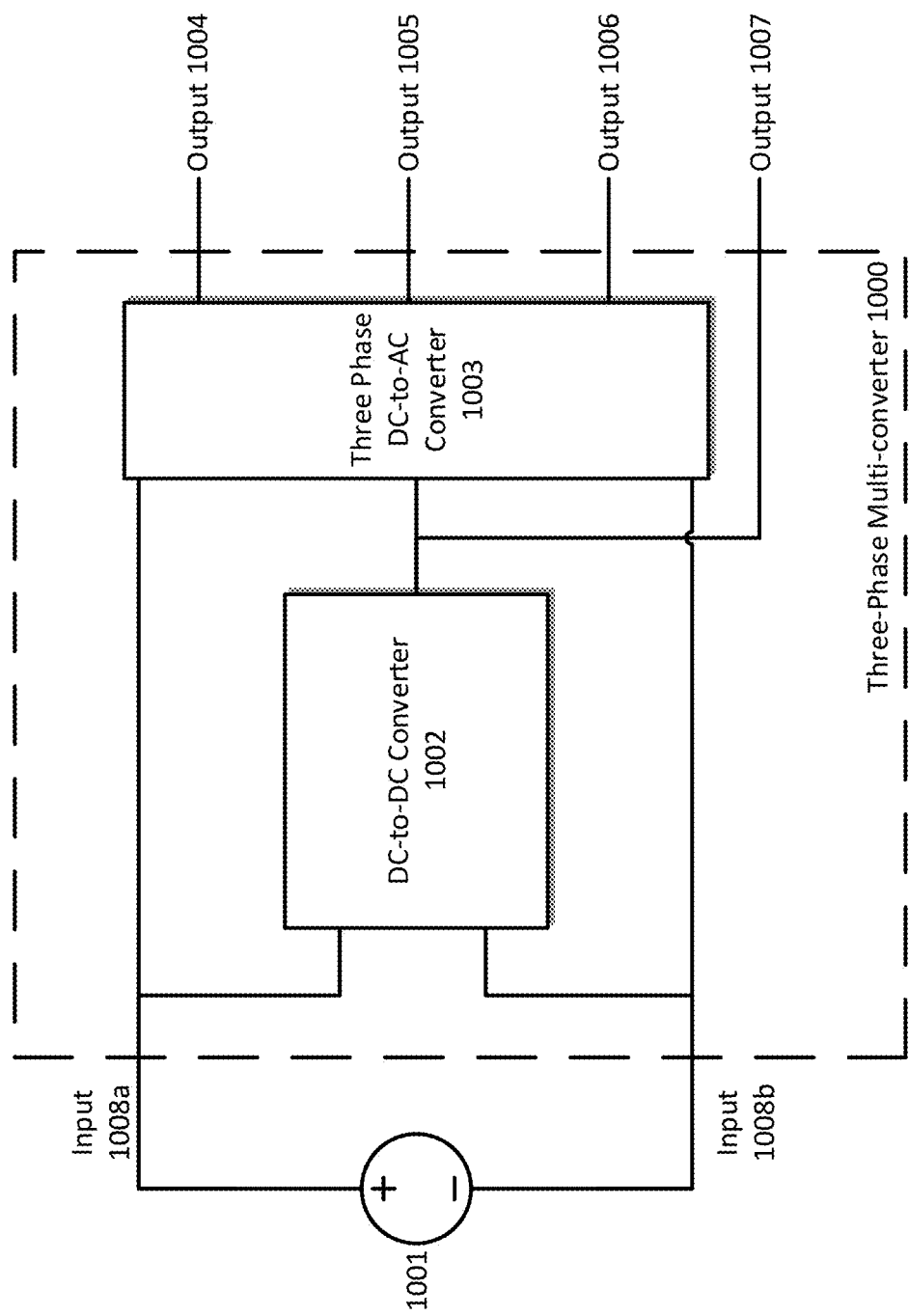
FIG. 10 illustrates a block diagram of a multi-converter according to illustrative embodiments.

Reference is now made to FIG. 10, which illustrates a block diagram of a three-phase multi-converter according to illustrative embodiments. Three-phase multi-converter 1000 may be similar to three-phase multi-converter 902 of FIG. 9. DC source 1001 may be coupled to multi-converter 1000. Multi-converter 1000 may comprise DC-to-DC converter 1002 and three-phase DC-to-AC converter 1003. DC-to-DC converter 1002 may be similar to DC-to-DC converter 302 of FIG. 3. In some embodiments, DC-to-DC converter 1002 may include a resonant switched capacitor circuit. Output 1004, 1005 and 1006 may provide AC voltages with about the same voltage amplitude and/or RMS value and about the same frequency and with a phase shift of ±120 degrees with respect to the other two outputs. For example, the voltage at the second terminal of DC source 1001 may be $V_{DC}$ with respect to the first terminal of DC source 1001. DC source 1001 connects to inputs 1008*a* and 1800*b* of multi-converter 1000. The voltage at outputs 1004, 1005 and 1006 may be $0.5(V_{DC}+V_{DC}*\sin(2\pi ft))$, $0.5(V_{DC}+V_{DC}*\sin(2\pi ft+2\pi/3))$, $0.5(V_{DC}+V_{DC}\sin(2\pi ft+4\pi/3))$ respectively in reference to the first terminal of DC source 1001. The voltage at output 1007 may be a DC voltage of about half of the voltage of DC source 1001 with respect to the first terminal of DC source 1001.

Figure 11A:
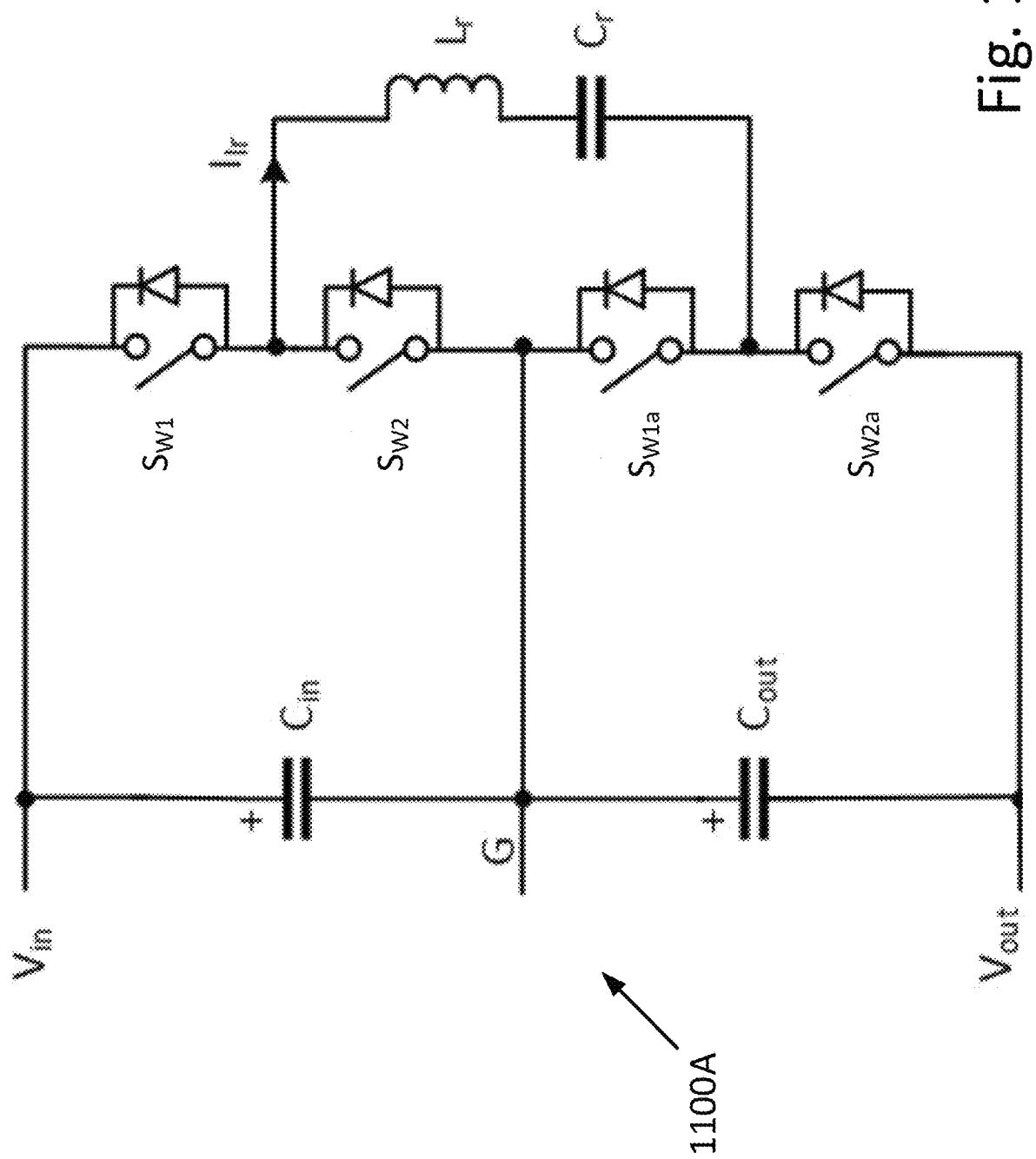
FIG. 11a illustrates a circuit topology of a converter according to illustrative embodiments.

Reference is now made to FIG. 11*a*, which illustrates a circuit topology of a converter 1100A according to illustrative embodiments. Converter 1100A may be described as a circuit for inverting a resonant switched capacitor with unity gain. An input voltage $V_{in}$ may be applied across terminals $V_{in}$ and G. Connected across terminals $V_{in}$ and G may be capacitor $C_{in}$. An output voltage $V_{out}$ may be derived across terminals $V_{out}$ and G, described in greater detail below as a result of converter 1100A converting the input voltage $V_{in}$ on terminals $V_{in}$ and G to an output voltage $V_{out}$ on terminals $V_{out}$ and G. Output capacitor $C_{out}$ connects across terminals $V_{out}$ and G. A load (not shown) may be connected across terminals $V_{out}$ and G. The load may be a DC-to-AC converter such as DC-to-AC converters 202, 204, 303, 410, 703, 704, 803 and 1003 described above. Converter 1100A and other converters described below is a similar to resonant switched capacitor circuit 414 described above.

Terminal G may or may not be connected to ground and/or earth depending on the desired operating functions of the converters. By way of non-limiting example of a desired operating function, input voltage $V_{in}$ on terminals $V_{in}$ and G may not have terminal G connected to ground and/or earth in order that input voltage $V_{in}$ and/or output voltage $V_{out}$ may be floating voltages.

With respect to the discussions that follow, terminal G may be assumed to be connected to ground and/or earth. In general converters described in greater detail below may be with respect to the topologies that can be extended to give step-down converters with conversion ratios of one half and/or one third, step-up converters with conversion ratios two and/or three, and inverting converters with conversion ratios of a half and/or a third. Descriptions that follow mainly refer to converters that convert a direct current (DC) input voltage ($V_{in}$) to a DC output voltage ($V_{out}$). As such by way of non-limiting example with reference to FIG. 11*a*, the term "inverting" converter means that voltage $V_{out}=-V_{in}$, in other words the output voltage ($V_{out}$) is the inverse of the input voltage ($V_{in}$).

Switches $S_{W1}$, $S_{W2}$, $S_{W1a}$ and $S_{W2a}$ are connected in series. The series connection of switches $S_{W1}$, $S_{W2}$, $S_{W1a}$ and $S_{W2a}$ are connected in parallel across terminals $V_{in}$ and $V_{out}$. The point at which switch $S_{W2}$ connects to switch $S_{W1a}$ also connects to terminal G. A series connection of inductor $L_r$ and capacitor $C_r$ connects across switches $S_{W2}$ and $S_{W1a}$ respectively where switch $S_{W1}$ connects to switch $S_{W2}$ and switch $S_{W1a}$ connects to switch $S_{W2a}$.

Each of the switches $S_{W1}$, $S_{W2}$, $S_{W1a}$ and $S_{W2a}$ may have a body diode connected across each switch and/or the body diode of each switch may be an integral part of a switch. Switches $S_{W1}$, $S_{W2}$, $S_{W1a}$ and $S_{W2a}$ and other switches discussed above as well as below in description that follow may be semiconductor switches such as metal oxide semiconductor field effect transistors (MOSFETs), insulated gate FETs (IGFETs), insulated gate bipolar junction transistors (IGBJTs) and/or junction FETs (JFETs). Switches $S_{W1}$, $S_{W2}$, $S_{W1a}$ and $S_{W2a}$ and may be mechanical and/or electromechanical switches such as single pole double throw switches and/or relays.

Figure 11B:
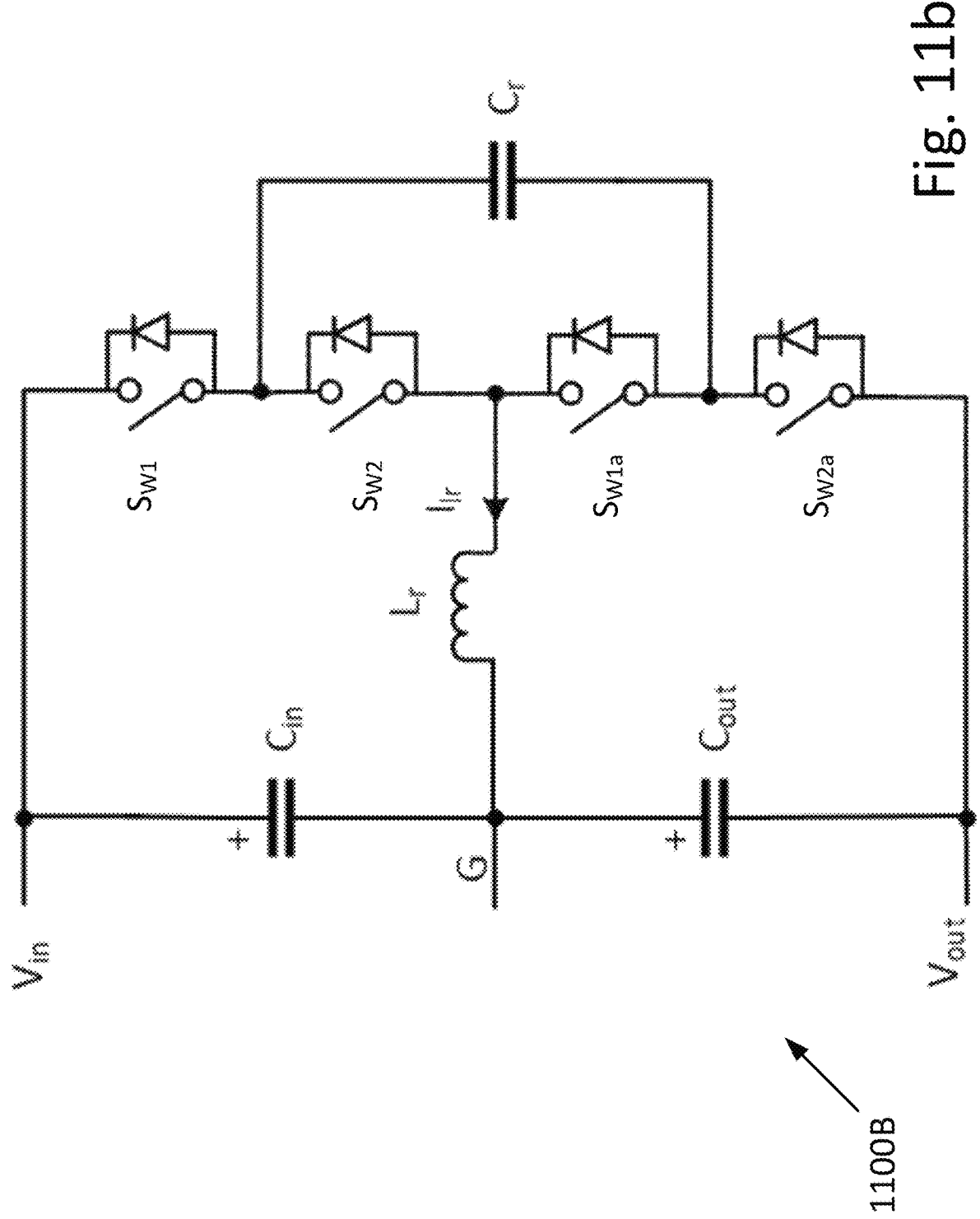
FIG. 11b illustrates a circuit topology of a converter according to illustrative embodiments.

Reference is now made to FIG. 11*b*, which illustrates a circuit topology of a converter 1100B according to illustrative embodiments. Converter 1100B is similar to converter 1100A in that both are unity mode inverting converters where $V_{out}=-V_{in}$, in other words the output voltage ($V_{out}$) is the inverse of the input voltage ($V_{in}$). Converter 1100B is similar to converter 1100A except that now capacitor $C_r$ is connected across switches $S_{W2}$ and $S_{W1a}$ respectively where switch $S_{W1}$ connects to switch $S_{W2}$ and switch $S_{W1a}$ connects to switch $S_{W2a}$. Inductor $L_r$ now connects between the point where switch $S_{W2}$ connect to switch $S_{W1a}$ and terminal G. A (load not shown) may be connected across terminals $V_{out}$ and G. Converter 1100B may be described as a unity mode, resonant switched-capacitor converter with modified inductor position.

Figure 11C:
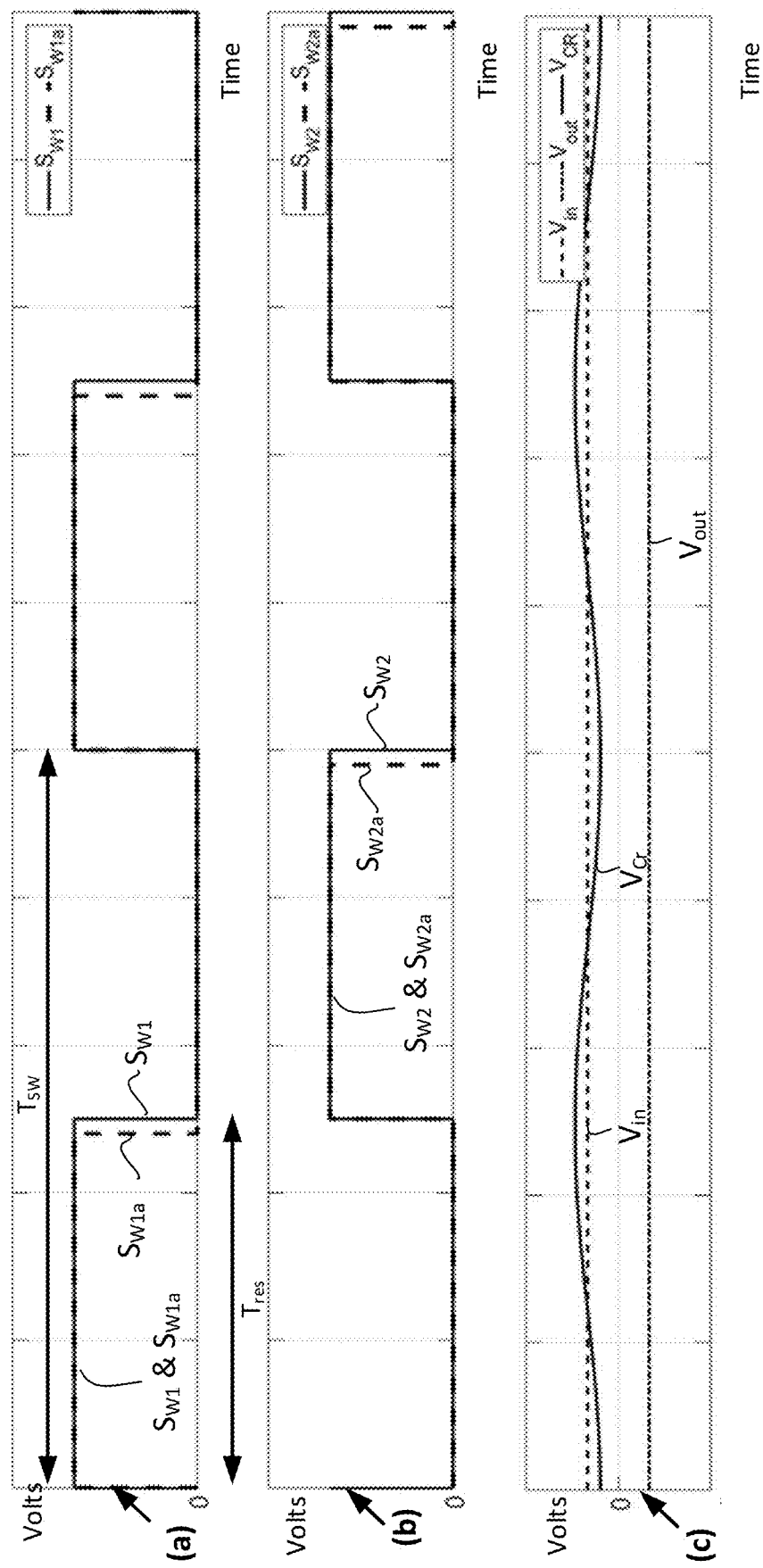
FIG. 11c shows three graphs of voltage versus time according to illustrative embodiments.

Reference is now made to FIG. 11*c*, which show three graphs of voltage versus time according to illustrative embodiments. Operation of converters 1100A and 1100B may be such that when $S_{W1}$ and $S_{W1a}$ are turned "on", in a first interval ($T_{res}$), inductor $L_r$ and capacitor $C_r$ resonate and current $I_{Lr}$ starts to vary sinusoidally. In the graph (a), switch $S_{W1a}$ (shown by dotted line) is turned "off" before half the resonant period and the body diode of $S_{W1a}$ starts to conduct current $I_{Lr}$ and the resonance stops when current $I_{Lr}$ reaches zero. Switch $S_{w1}$ is turned "off" (shown with solid line) with zero current after switch $S_{W1a}$ (shown by dotted line) is turned "off". During the first interval ($T_{res}$), energy is transferred from the input voltage $V_{in}$ to capacitor $C_r$.

In the graph (b), in the second interval ($T_{sw}$-$T_{res}$), the switches $S_{W2}$ and $S_{W2a}$ are turned "on" with zero current. The inductor $L_r$ and capacitor $C_r$ start to resonate and the energy in the capacitor $C_r$ is transferred to the output terminals $V_{out}$. Similar to the previous interval, the switch $S_{W2a}$ (shown by dotted line) is turned "off" before half the resonant period to achieve zero current turn "off" for the switch $S_{W2}$ that is turned "off" after switch $S_{W2a}$ (shown by dotted line) is turned "off". For the circuit topologies of converters 1100A and 1100B, turn-"on" of all the switches and turn-"off" of switches $S_{W1}$ and $S_{W2}$ occurs at zero-current.

Graph (c) shows for both converters 1100A and 1100B, three plots of the input voltage $V_{in}$ (shown by closer dotted line), the output voltage $V_{out}$ and the voltage across capacitor $C_r$. Graph (c) shows that the output voltage ($V_{out}$) is the inverse of the input voltage ($V_{in}$) with unity gain.

Figure 11D:
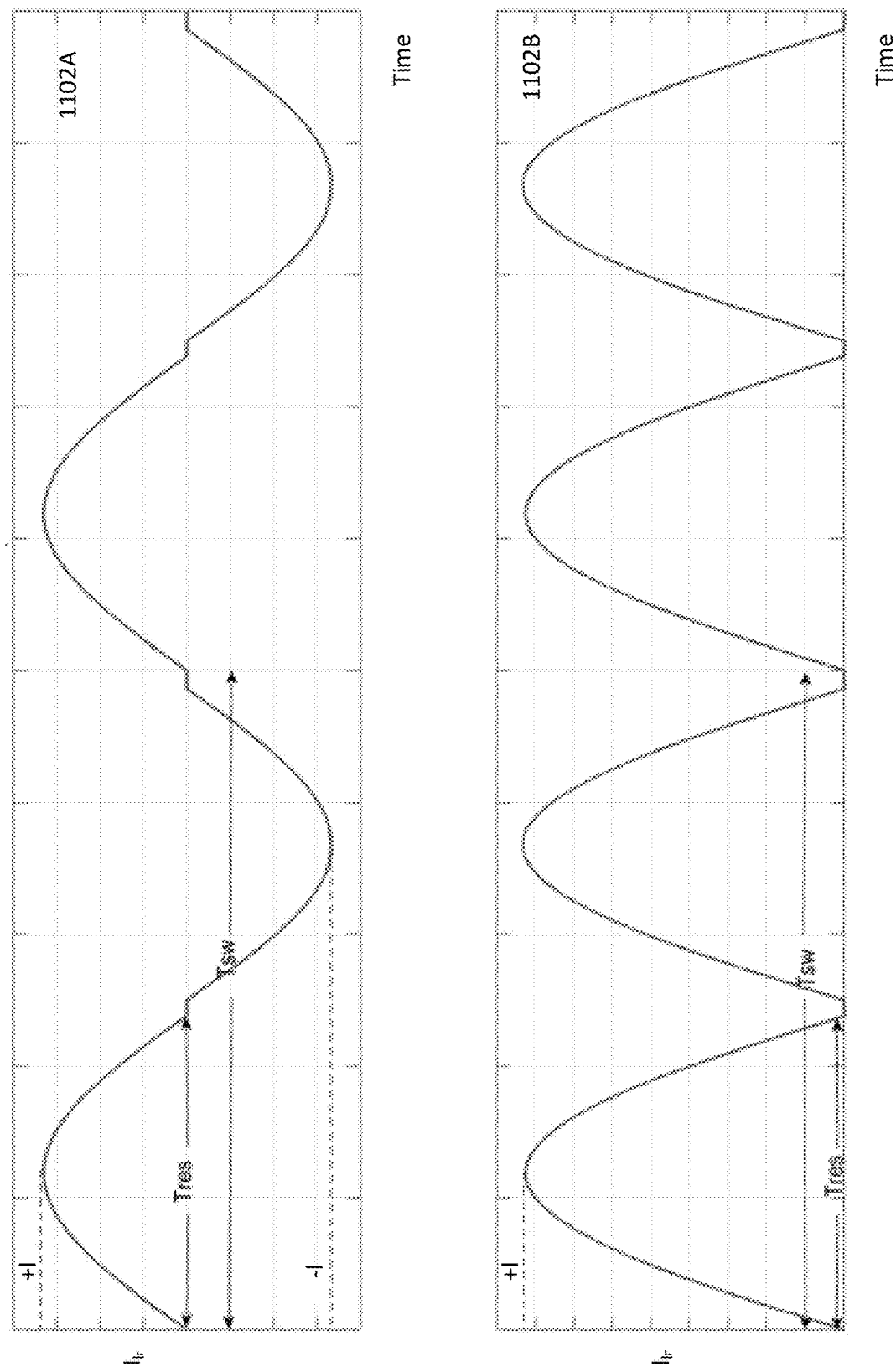
FIG. 11d shows two graphs of current versus time according to illustrative embodiments.

Reference is now made to FIG. 11d, which shows two graphs 1102A and 1102B according to illustrative embodiments. FIG. 11d shows a difference between converters 1100A and 1100B. The difference between converters 1100A and 1100B may be in respect to inductor current $I_{Lr}$. Graphs 1102A and 1102B show a plot of resonant inductor current $I_{Lr}$ versus time respectively for converter 1100A and 1100B. From graph 1102B it can be seen that converter 1100B has lower inductor ($I_{Lr}$) ripple current compared to graph 1102A for converter 1100A. As such an implementation of converter 1100B compared to an implementation of converter 1100A may result in a lower inductor volume for inductor $L_r$.

For converter 1100A, graph 1102A, inductor current $I_{Lr}$ resonates in a positive direction in interval one ($T_{res}$) and resonates in negative direction in interval two ($T_{sw}$-$T_{res}$) and the ripple in inductor current is 2×I. However, for converter 1100B the inductor current $I_{Lr}$ is always in the same direction and hence a reduced magnitude of ripple current of 1×I.

Figure 11E:
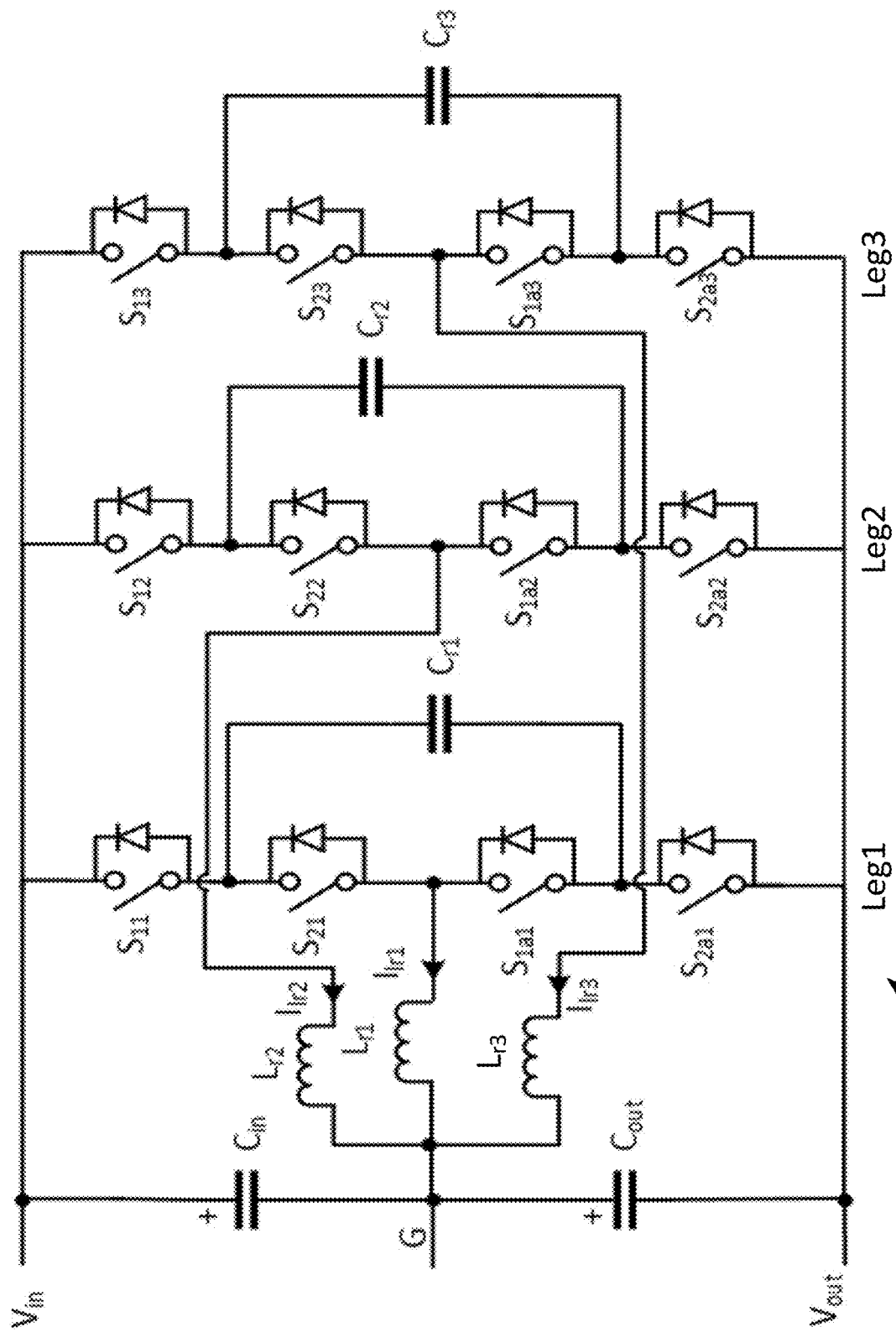
FIG. 11e illustrates a circuit topology of a converter according to illustrative embodiments.

Reference is now made to FIG. 11e, which illustrates a circuit topology of a converter 1100C according to illustrative embodiments. Converter 1100C is a three-leg inverting unity mode resonant switched capacitor converter that includes three inverting resonant switched capacitor converters operating 120 degrees out of phase relative to each other. Leg1 that is similar to Leg2 and Leg3 includes a series connection of switches $S_{11}$, $S_{21}$, $S_{1a1}$ and $S_{2a1}$ that is connected across terminals $V_{in}$ and $V_{out}$. In general, the end subscript numeral "1" of Leg1 includes switches $S_{11}$, $S_{21}$, $S_{1a1}$ and $S_{2a1}$, capacitor $C_{r1}$ and inductor $L_{r1}$. The end numerical subscripts "2" and "3" respectively correspond capacitors ($C_{r2}$ and $C_{r3}$) and inductors ($L_{r2}$ and $L_{r3}$) in respective Leg2 and Leg3. As such Leg2 includes switches $S_{12}$, $S_{22}$, $S_{1a2}$ and $S_{2a2}$, capacitor $C_{r2}$, and inductor $L_{r1}$. Leg3 includes switches $S_{13}$, $S_{23}$, $S_{1a3}$ and $S_{2a3}$, capacitor $C_{r3}$, and inductor $L_{r1}$. Each switch in each of Leg1, Leg2 and Leg3 may have its own body diode connected across each switch. A load (not shown) may be connected across terminals $V_{out}$ and G.

Using Leg1 that adequately explains the connections of the other legs, capacitor $C_{r1}$ connects across switches $S_{21}$ and $S_{1a1}$ at the points where $S_{21}$ connects to switch $S_{11}$ and switch $S_{1a1}$ connects to switch $S_{2a1}$. Inductor $L_{r1}$ of Leg1 connects to terminal G and to the point where switch $S_{21}$ connects to switch $S_{1a1}$. Capacitor $C_{in}$ connects across terminals $V_{in}$ and G. Capacitor $C_{out}$ connects across terminals G and $V_{out}$.

In operation, each leg of converter 1100C handles one third of the power converted from input to output of converter 1100C. The ripple current handled by the input capacitor $C_{in}$ and output capacitor $C_{out}$ is the sum of the currents through three currents $I_{r1}$, $I_{r2}$ and $I_{r3}$ that are 120 degrees out of phase to each other as such the use of three legs may reduce ripple current rating of capacitors $C_{in}$ and $C_{out}$. In sum, converter 1100C may provide lower inductor ripple current by virtue of relocating inductors that may result in inductors with lower inductor volume and utilization of one or more legs that may lower ripple current ratings for capacitors $C_{in}$ and $C_{out}$.

In general, for the descriptions that follow, reference is made to topologies that can be extended to step-down, step-up, and inverting converters with various conversion ratios. More specifically, the topologies can be extended to step-down converters with conversion ratios of one half and/or one third, step-up converters with conversion ratios two and/or three, and inverting converters with conversion ratios of a half and/or a third.

The figures and their descriptions that follow show similar converters. For example, a difference between a converter similar to another converter may be that one converter of a first type may utilize the series connection of inductor $L_r$ and capacitor $C_r$ connected across to serially connected switches ($S_{W2}$ and $S_{W1a}$ for example) in the converter topology. Whereas another converter of a second type may have capacitor $C_r$ connected across serially connected switches ($S_{W2}$ and $S_{W1a}$ for example) and inductor $L_r$ located and/or connected between the serial connected switches (switches $S_{W2}$ and $S_{W1a}$) and capacitors $C_{in}$ and/or $C_{out}$.

In general, for topologies described below for converters of the first and/or second type, multi-legged versions of converters similar to FIG. 11d may be realized. A benefit of multi-legged versions for converters of the first and/or second type may provide lower ripple current ratings for capacitors $C_{in}$ and/or $C_{out}$. In particular for the converters of the second type when compared to the first type, a lower inductor ripple current may be provided by virtue of the relocation of inductors as shown previously in FIGS. 11b and 11e. Consequently, implementation of the type two converter may see an inductor $L_r$ that may be implemented with a lower inductor volume comparted to an inductor volume for the second type of converter for when both types operate under the same conditions. The lower inductor ripple current of the second converter types (converters 1100B and/or 1100C for example) may be by virtue of the inductor current ($I_{Lr}$) being in the same direction. Whereas converters of the first type may have a larger ripple current due to inductor current $I_{Lr}$ that resonates in a positive direction in a first-time interval and resonates in negative direction in a second-time interval as described above with respect to FIG. 11d.

Figure 12A:
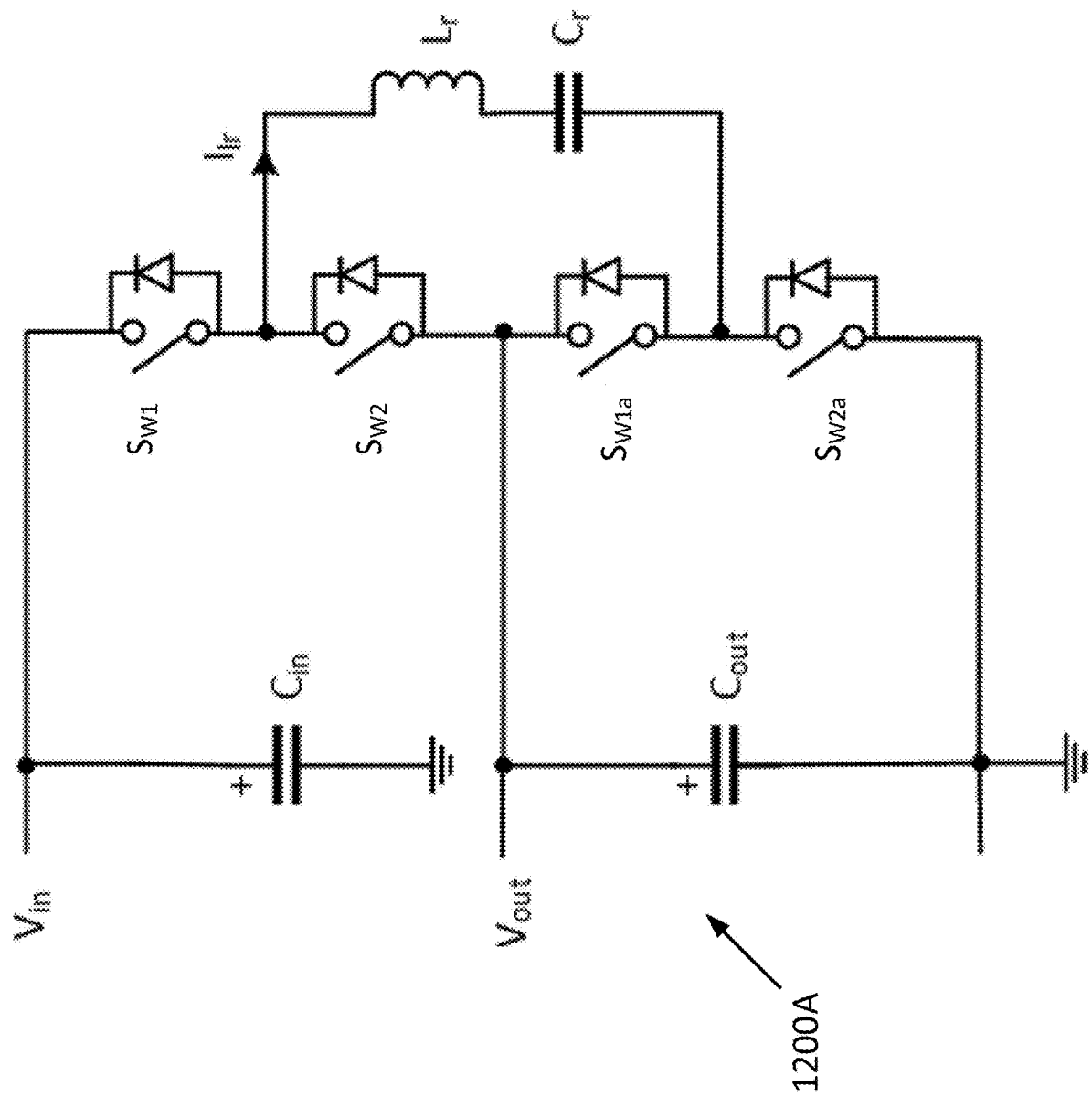
FIGS. 12a and 12b show respective step-down DC buck converters with conversion ratios of a half, according to illustrative embodiments.
Figure 12B:
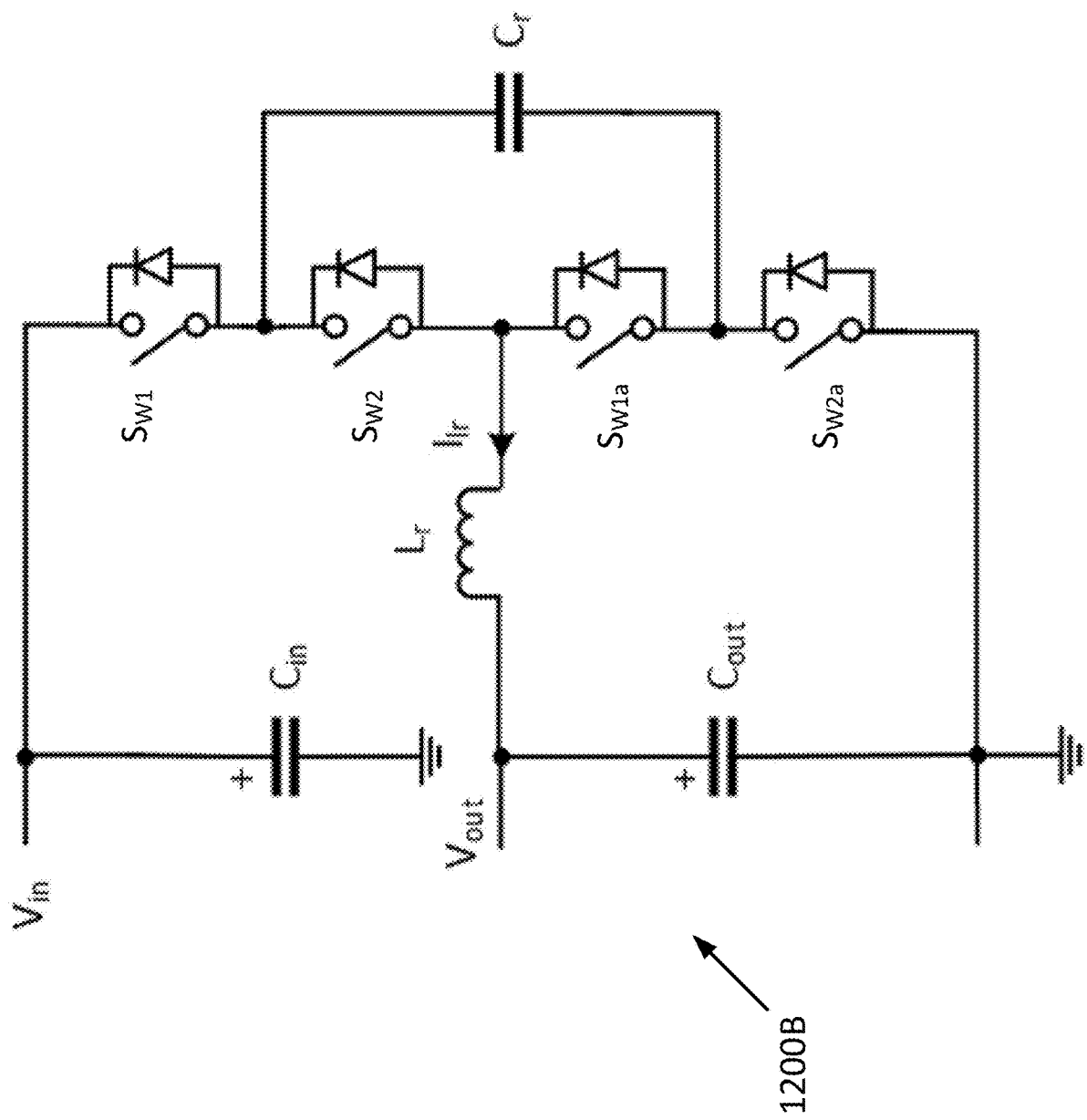

Reference is now made to FIGS. 12a and 12b, which show respective step-down DC buck converters 1200A and 1200B with conversion ratios of a half, according to illustrative embodiments. Common to both FIGS. 12a and 12b is a series connection of switches $S_{W1}$, $S_{W2}$, $S_{W1a}$ and $S_{W2a}$ where each switch may have a body diode connected across the switch and/or the body diode of each switch may be an integral part of each switch. Capacitor $C_{in}$ connects between terminal $V_{in}$ and ground and/or earth. Capacitor $C_{out}$ connects between terminal $V_{out}$ and ground and/or earth. Terminal $V_{out}$ connects to switch $S_{W1}$ and ground and/or earth connects to switch $S_{W2a}$. A load (not shown) may be connected across terminals $V_{out}$ and ground and/or earth.

Specifically, with respect to FIG. 12a, inductor $L_r$ connects in series with capacitor Cr and the series connection of inductor $L_r$ and capacitor $C_r$ connects across the series connection of switches $S_{W2}$ and $S_{W1a}$. The point of connection between switches $S_{W2}$ and $S_{W1a}$ connects to terminal $V_{out}$.

Specifically, with respect to FIG. 12b, capacitor $C_r$ connects across the series connection of switches $S_{W2}$ and $S_{W1a}$. Inductor $L_r$ connects between the point of connection between switches $S_{W2}$ and $S_{W1a}$ and terminal $V_{out}$.

Figure 12C:
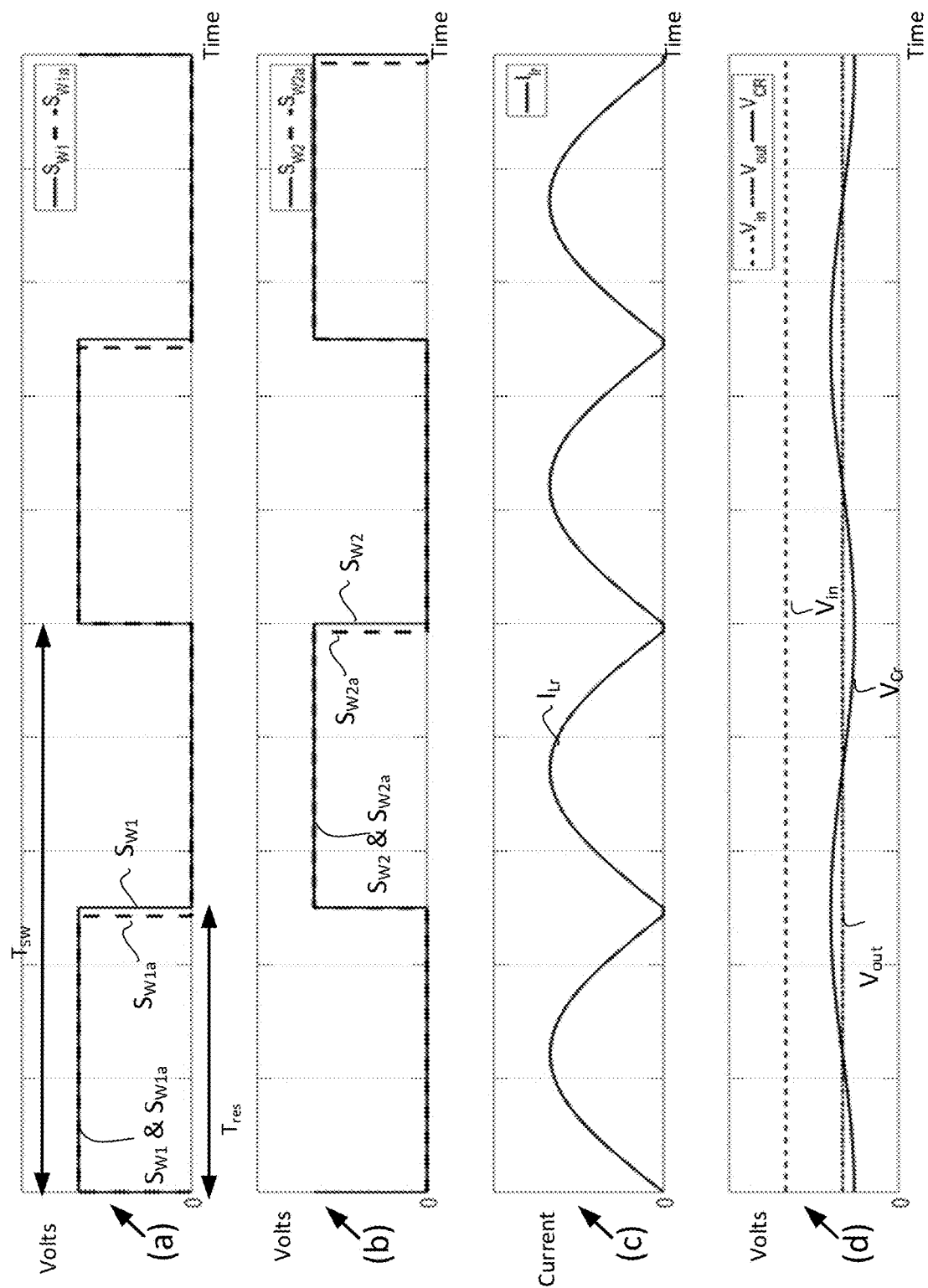
FIG. 12c shows graphs of voltages and current versus time according to illustrative embodiments.

Reference is now made to FIG. 12c, which show four graphs (a), (b), (c) and (d) of voltages and current versus time according to illustrative embodiments. The four graphs (a), (b), (c) and (d) are for step-down (buck) converter 1200B with conversion ratio of a half. When $S_{W1}$ and $S_{W1a}$ are turned "on" in a first interval, inductor $L_r$ and capacitor $C_r$ resonate and the current $I_{Lr}$ starts varying sinusoidally and energy is transferred to resonant capacitor $C_r$ during the first interval ($T_{res}$). In graph (a), switch $S_{W1a}$ (shown by dotted line) is turned "off" before half the resonant period after which switch $S_{W1}$ (shown by solid line) is turned "off". The diode connected in parallel to switch $S_{W1a}$ starts conducting the inductor current $I_{Lr}$ and the resonance stops when the inductor current $I_{Lr}$ reaches zero. The resonant capacitor voltage has a dc component equal to $$\frac{V_{in}}{2}$$

and a small ac component. In the second interval ($T_{sw}$-$T_{res}$), shown in the second graph (b), the switches $S_{W2}$ and $S_{W2a}$ are turned "on" with zero current. The inductor $L_r$ and capacitor $C_r$ are connected to the output terminal $V_{out}$. Inductor $L_r$ and capacitor $C_r$ start resonating and the energy in capacitor $C_r$ is transferred to the output terminal $V_{out}$. Similar to the previous interval, the switch $S_{W2a}$ (shown by dotted line) is turned "off" before half the resonant period and diode connected in parallel across switch $S_{W2a}$ starts conducting.

In graph (c), lower inductor ripple current ($I_{Lr}$) converter 1200B may be by virtue of the inductor current ($I_{Lr}$) being in the same direction compared to what may be a larger bi-directional inductor ripple current ($I_{Lr}$) of converter 1200A for example. Inductor ripple current ($I_{Lr}$) of converter 1200B is positive.

Graph (d) shows for converter 1200B, three plots of the input voltage $V_{in}$ (shown by wider spaced dotted line), the output voltage $V_{out}$ (shown by narrower spaced dotted line) and the voltage across capacitor $C_r$ (shown as solid line). The fourth graph (d) shows the buck operation of converter 1200B such that the output voltage ($V_{out}$) is lower than the input voltage ($V_{in}$) by virtue of a conversion ratio of a half.

Figure 13A:
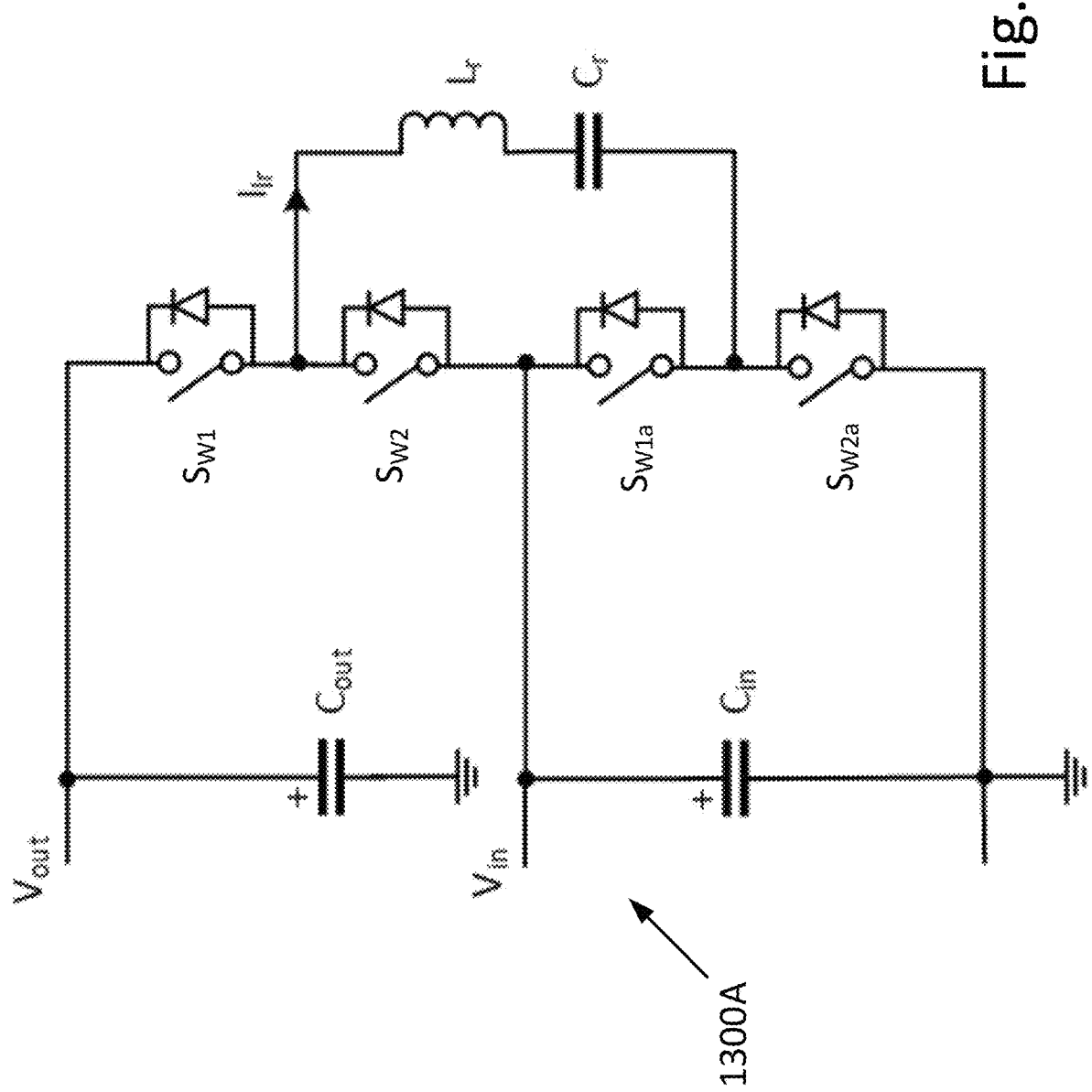
FIGS. 13a and 13b show respective step-down DC buck converters with conversion ratios of a half, according to illustrative embodiments.
Figure 13B:
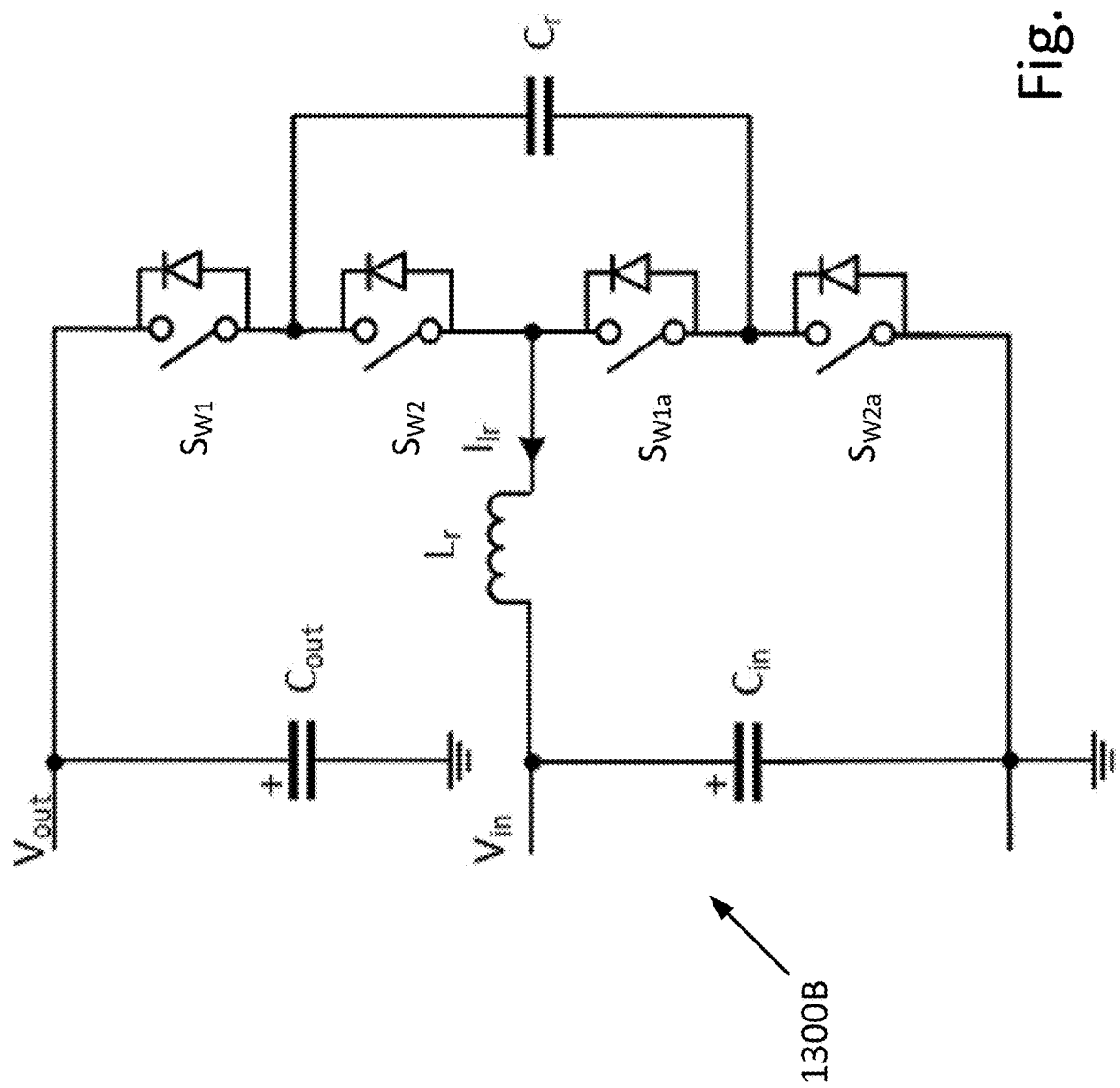

Reference is now made to FIGS. 13a and 13b, which show respective step-up DC boost converters 1300A and 1300B with conversion ratios of two, according to illustrative embodiments. Common to both FIGS. 13a and 13b is a series connection of switches $S_{W1}$, $S_{W2}$, $S_{W1a}$ and $S_{W2a}$. Capacitor $C_{in}$ connects between terminal $V_{in}$ and ground and/or earth. Capacitor $C_{out}$ connects between terminal $V_{out}$ and ground and/or earth. Terminal $V_{in}$ connects to switch $S_{W1}$ and ground and/or earth connects to switch $S_{W2a}$.

Specifically, with respect to FIG. 13a, inductor $L_r$ connects in series with capacitor Cr and the series connection of inductor $L_r$ and capacitor $C_r$ connects across the series connection of switches $S_{W2}$ and $S_{W1a}$. The point of connection between switches $S_{W2}$ and $S_{W1a}$ connects to terminal $V_{in}$.

Specifically, with respect to FIG. 13b, capacitor $C_r$ connects across the series connection of switches $S_{W2}$ and $S_{W1a}$. Inductor $L_r$ connects between the point of connection between switches $S_{W2}$ and $S_{W1a}$ and terminal $V_{in}$. A comparison of the circuit topology of FIG. 12a with FIG. 13a shows that the step-up converter topology of FIG. 13a is achieved by swapping the input and output voltage connections of FIG. 12a. Similarly, a comparison of the circuit topology of FIG. 12b with FIG. 13b shows that the step-up converter topology of FIG. 13b is achieved by swapping the input and output voltage connections of FIG. 12b.

Figure 13C:
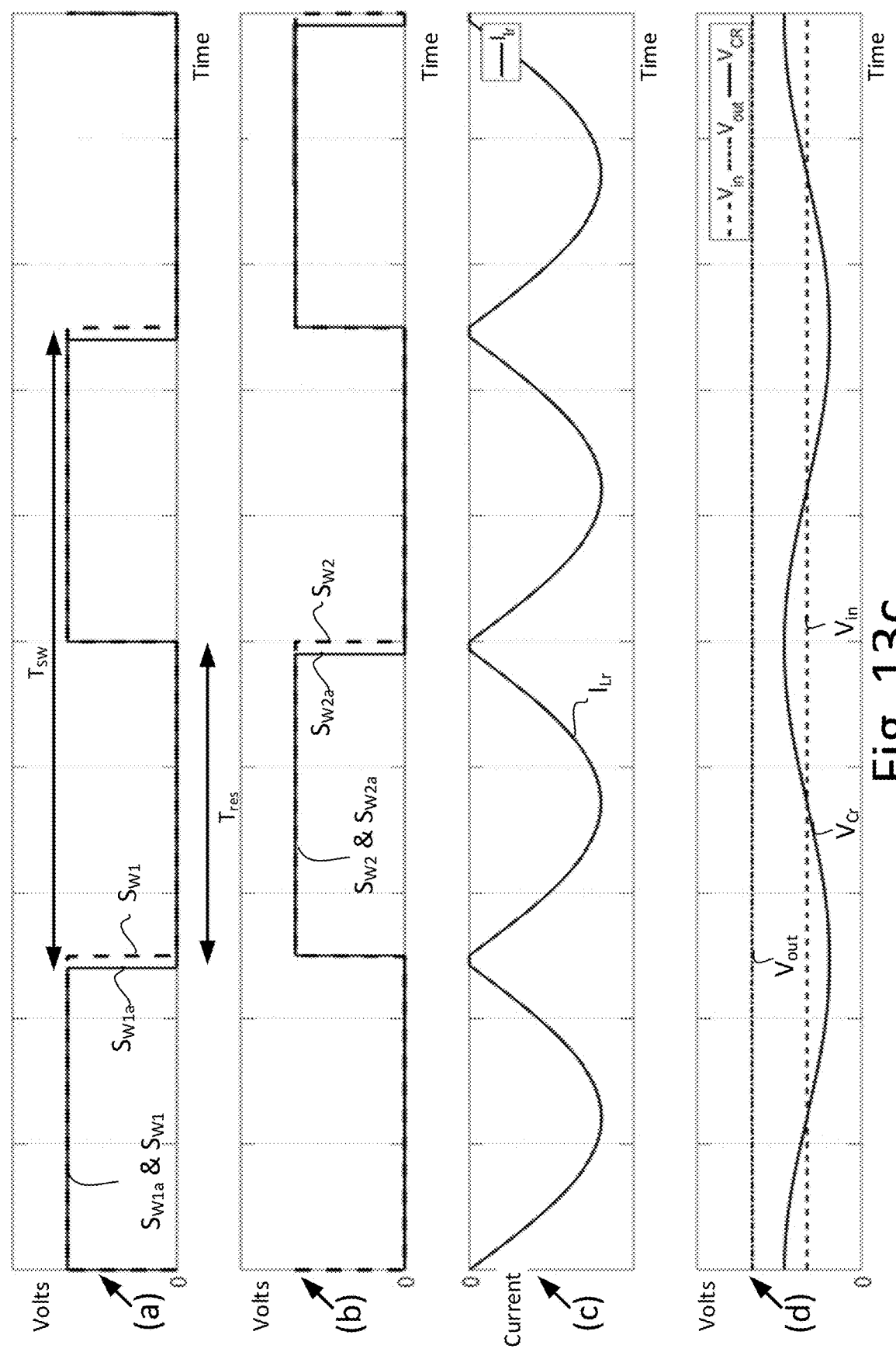
FIG. 13c shows graphs of voltages and current versus time according to illustrative embodiments.

Reference is now made to FIG. 13c, which shows four graphs (a), (b), (c) and (d) of voltages and current versus time according to illustrative embodiments. The four graphs (a), (b), (c) and (d) are for step-up (boost) converter 1300B with conversion ratio of two. In graph (b), in a first interval of $T_{res}$, $S_{W2}$ and $S_{W2a}$ are turned "on", input voltage $V_{in}$ is connected in series with inductor $L_r$, capacitor $C_r$. Inductor $L_r$ and capacitor $C_r$ resonate and the inductor current $I_{Lr}$ starts varying sinusoidally and energy is transferred to resonant capacitor $C_r$. Switch $S_{W2a}$ (shown by dotted line) is turned "off" before half the resonant period ($T_{res}$) after which switch $S_{W2a}$ (shown by solid line) is turned "off". The diode connected in parallel across switch $S_{W2}$ starts to conduct inductor current $I_{Lr}$. The resonance stops when the inductor current $I_{Lr}$ reaches zero. Resonant capacitor $C_r$ voltage has a DC component equal to $V_{in}$ and a small AC component. In the second interval ($T_{SW}$-$T_{res}$) shown in graph (a), the switches $S_{W1}$ and $S_{W1a}$ are turned "on" with zero current. Inductor $L_r$ and capacitor $C_r$ start resonating and the energy is transferred to the output terminal $V_{out}$. Similar to previous interval the switch $S_{W1}$ is turned "off" before half the resonant period and diode connected in parallel across switch $S_{W1}$ starts conducting.

In graph (c), lower inductor ripple current ($I_{Lr}$) converter 1300B may be by virtue of the inductor current ($I_{Lr}$) being in the same direction compared to what may be a larger bi-directional inductor ripple current ($I_{Lr}$) of converter 1300A for example. Inductor ripple current ($I_{Lr}$) of converter 1300B is negative below zero volts.

Graph (d) shows for converter 1300B, three plots of the input voltage $V_{in}$ (shown by wider spaced dotted line), the output voltage $V_{out}$ (shown by narrower spaced dotted line) and the voltage across capacitor $C_r$ (shown as solid line). The fourth graph (d) shows the boost operation of converter 1300B such that the output voltage ($V_{out}$) is higher than the input voltage ($V_{in}$) by virtue of a conversion ratio of two.

Figure 14A:
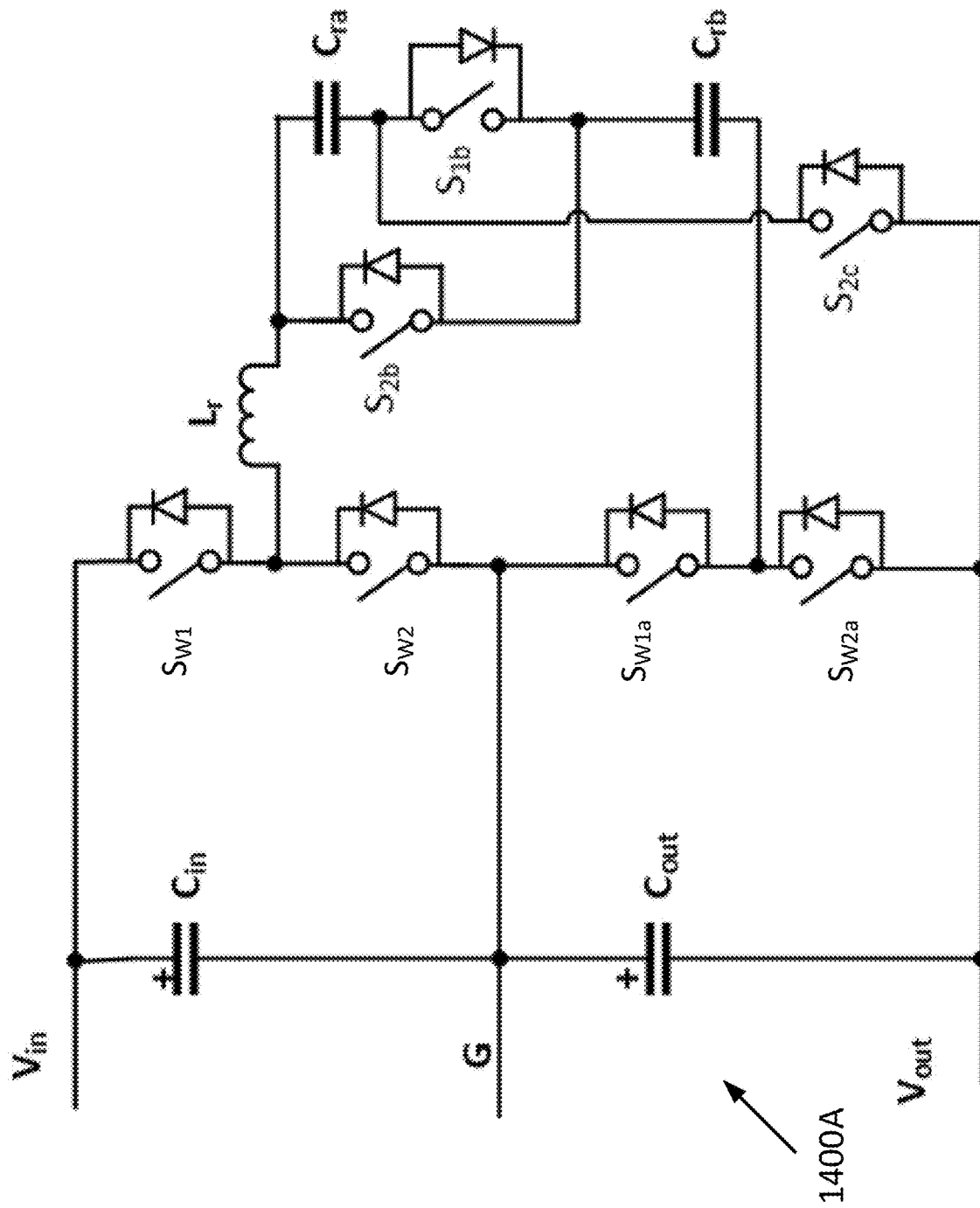
FIGS. 14a and 14b show respective step-down DC buck converters with conversion ratios of a half, according to illustrative embodiments.
Figure 14B:
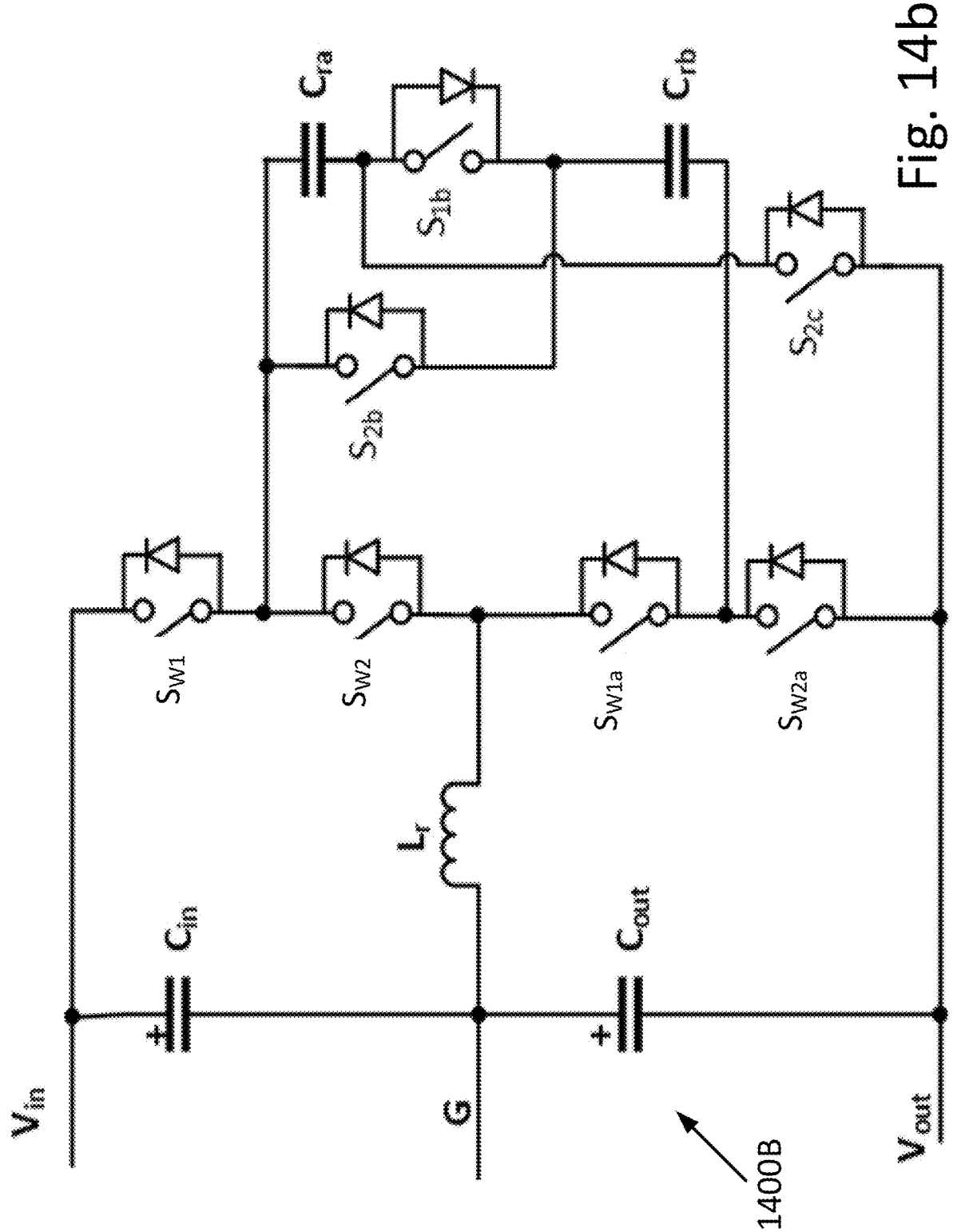

Reference is now made to FIGS. 14a and 14b, which show respective inverting converters 1400A and 1400B with conversion ratios of a half, according to illustrative embodiments. Common to both FIGS. 14a and 14b is a series connection of switches $S_{W1}$, $S_{W2}$, $S_{W1a}$ and $S_{W2a}$. Capacitor $C_{in}$ connects between terminal $V_{in}$ and terminal G. Capacitor $C_{out}$ connects between terminal $V_{out}$ and terminal G. Terminal $V_{in}$ connects to switch $S_{W1}$ and terminals $V_{out}$ connects to switch $S_{W2a}$.

Specifically, with respect to FIG. 14a, the point where switch $S_{W2}$ is connected to switch $S_{W1a}$ is also connected to terminal G. One end of inductor $L_r$ connects to the point where switch $S_{W1}$ is connected to switch $S_{W2}$. The other end of inductor $L_r$ connects to one end off switch $S_{2b}$ and one end of capacitor $C_{ra}$. The other end of capacitor $C_{ra}$ connects to one end of switch $S_{1b}$ and one end of switch $S_{2c}$. The other end of switch $S_{2b}$ connects to the other end of switch $S_{1b}$ and one end of capacitor $C_{rb}$. The other end of capacitor $C_{rb}$ connects to the point where switch $S_{W1a}$ connects to switch $S_{W2a}$. The other end of switch $S_{2c}$ connects to terminal $V_{out}$.

Specifically, with respect to FIG. 14b, inductor $L_r$ is connected between the point where switch $S_{W2}$ is connected to switch $S_{W1a}$ and terminal G. The point where switch $S_{W1}$ is connected to switch $S_{W2}$ connects to one end off switch $S_{2b}$ and one end of capacitor $C_{ra}$. The other end of capacitor $C_{ra}$ connects to one end of switch $S_{1b}$ and one end of switch $S_{2c}$. The other end of switch $S_{2b}$ connects to the other end of switch $S_{1b}$ and one end of capacitor $C_{rb}$. The other end of capacitor $C_{rb}$ connects to the point where switch $S_{W1a}$ connects to switch $S_{W2a}$. The other end of switch $S_{2c}$ connects to terminal $V_{out}$.

Figure 14C:
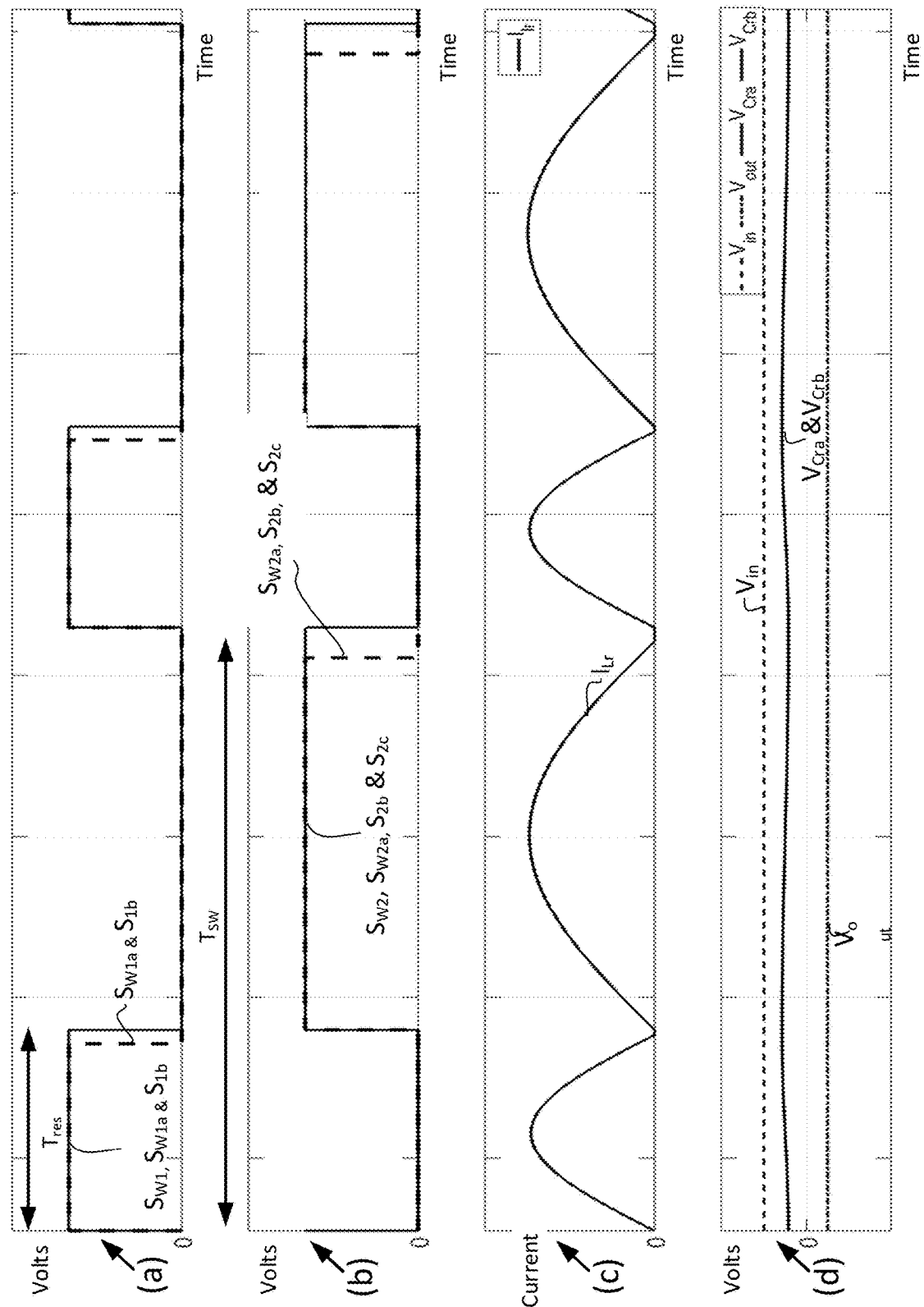
FIG. 14c shows graphs of voltages and current versus time according to illustrative embodiments.

Reference is now made to FIG. 14c, which shows four graphs (a), (b), (c) and (d) of voltages and current versus time according to illustrative embodiments. The four graphs (a), (b), (c) and (d) are for step-down (buck) converter 1400B with conversion ratio of a half.

When $S_{W1}$, $S_{W1a}$ and $S_{1b}$ are turned "on" in a first interval, inductor $L_r$ and capacitors $C_{ra}$ and $C_{rb}$ connected in series by switch $S_{1b}$ resonate. Current $I_{Lr}$ starts varying sinusoidally and energy is transferred to resonant capacitors $C_{ra}$ and $C_{rb}$ during the first interval ($T_{res}$). In graph (a), switch $S_{W1a}$ and $S_{W1b}$ (shown by dotted line) is turned "off" before half the resonant period after which switch $S_{W1}$ (shown by solid line) is turned "off". The diode connected in parallel to switch $S_{W1a}$ starts conducting the inductor current $I_{Lr}$ and the resonance stops when the inductor current $I_{Lr}$ reaches zero. The resonant capacitor voltage has a dc component equal to $$\frac{V_{in}}{2}$$

and a small ac component. In the second interval ($T_{sw}$-$T_{res}$), shown in the second graph (b), the switches $S_{W2}$, $S_{W2a}$, $S_{2b}$ and $S_{2c}$ are turned "on" with zero current. The inductor $L_r$ and capacitor $C_{rb}$ are connected to the output terminal $V_{out}$. Inductor $L_r$ and capacitor $C_{rb}$ start resonating and the energy in capacitor $C_{rb}$ is transferred to the output terminal $V_{out}$. Similar to previous interval, the switch $S_{W2a}$ (shown by dotted line) is turned "off" before half the resonant period and diode connected in parallel across switch $S_{W2a}$ starts conducting.

In graph (c), lower inductor ripple current ($I_{Lr}$) converter 1400B may be by virtue of the inductor current ($I_{Lr}$) being in the same direction compared to what may be a larger bi-directional inductor ripple current ($I_{Lr}$) of converter 1400A for example. Inductor ripple current ($I_{Lr}$) of converter 1400B is positive.

Graph (d) shows for converter 1400B, three plots of the input voltage $V_{in}$ (shown by wider spaced dotted line), the output voltage $V_{out}$ (shown by narrower spaced dotted line) and the voltage across capacitors $C_{ra}$ and $C_{rb}$ (shown as solid line). Graph (d) shows the buck operation of converter 1400B such that the output voltage ($V_{out}$) is lower and negative and/or inverted compared the input voltage ($V_{in}$) by virtue of a conversion ratio of a half.

Figure 15A:
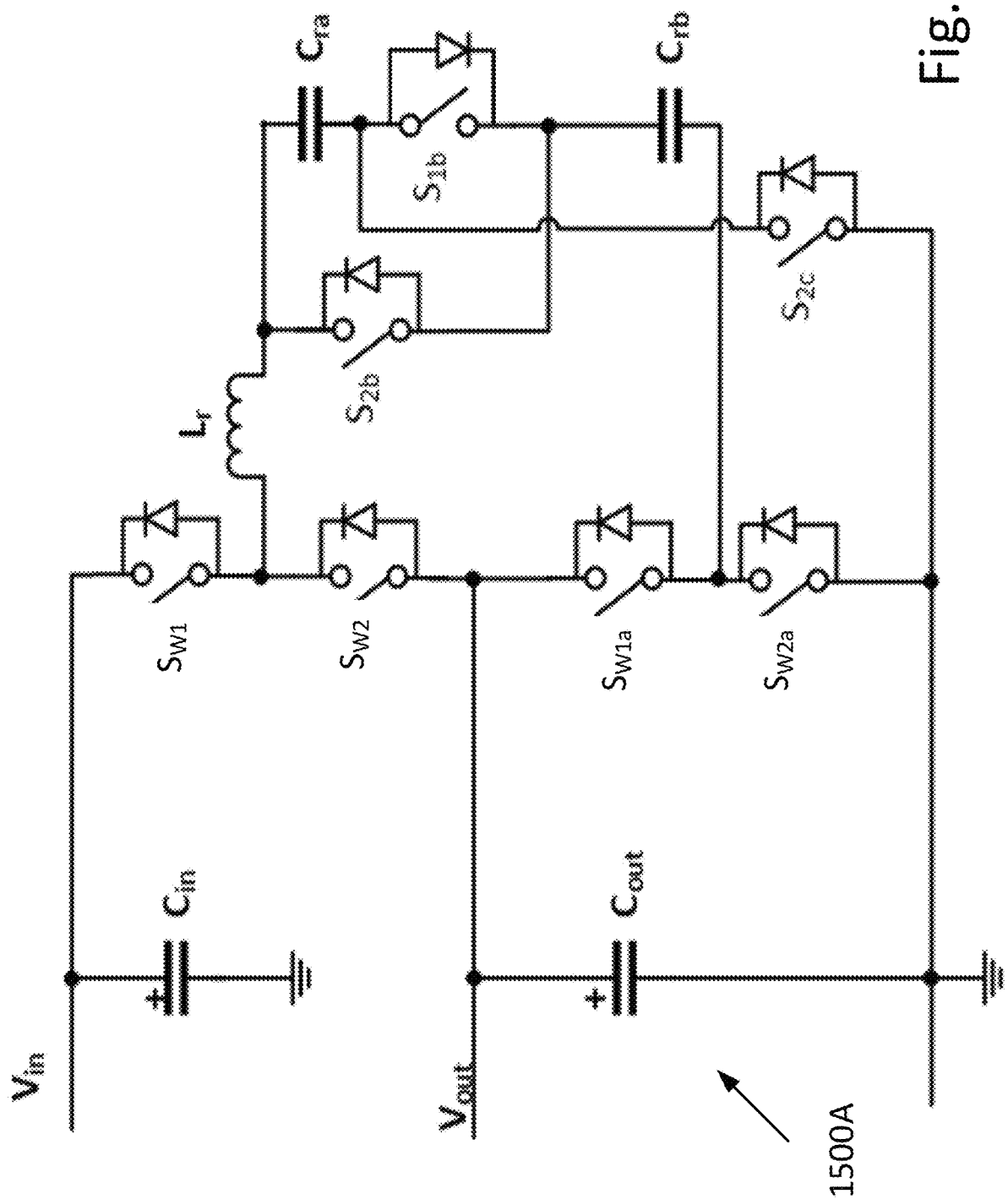
FIGS. 15a and 15b show respective step-down DC buck converters with conversion ratios of a half, according to illustrative embodiments.
Figure 15B:
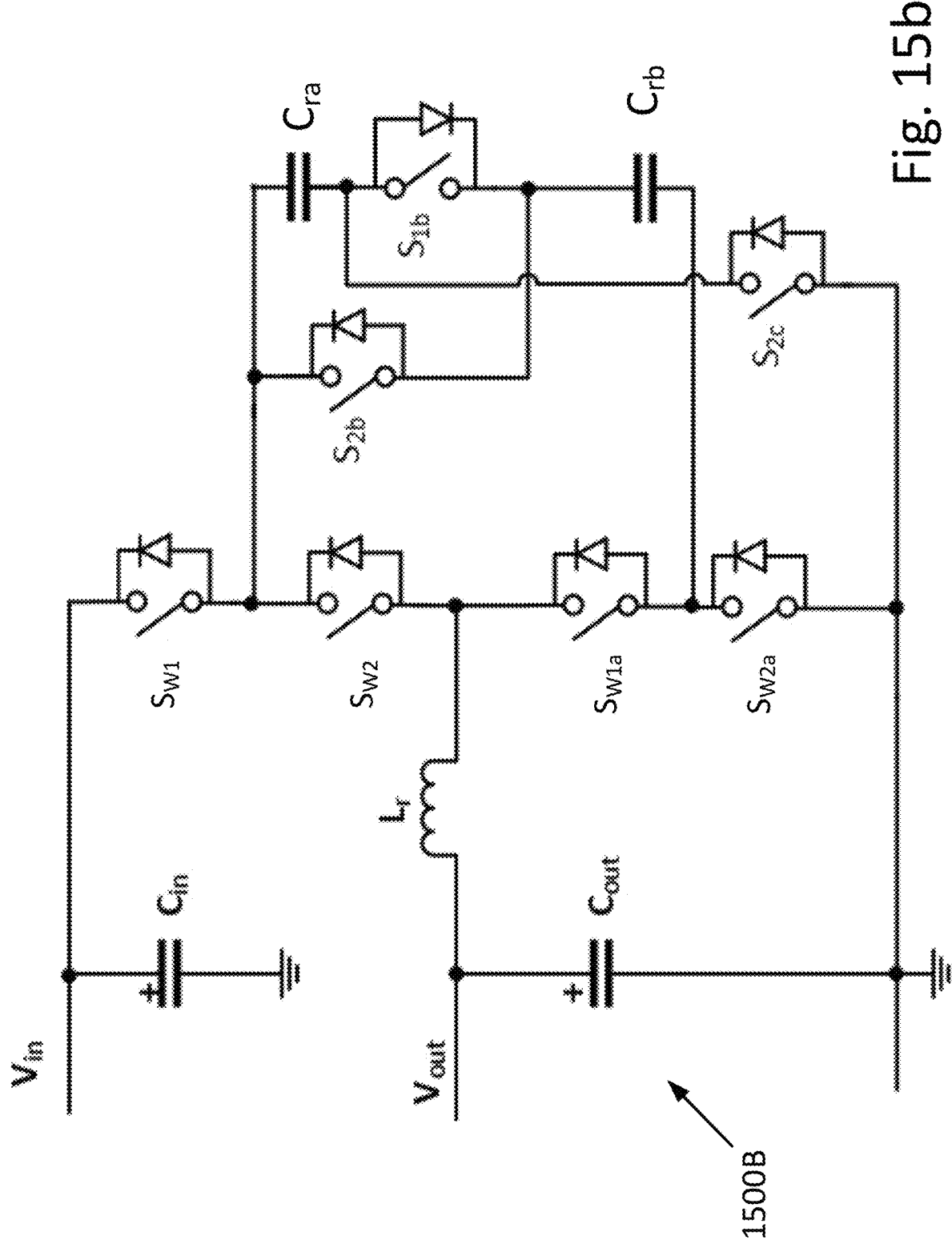

Reference is now made to FIGS. 15a and 15b, which show respective step-down converters 1500A and 1500B with conversion ratios of a third, according to illustrative embodiments. Common to both FIGS. 15a and 15b is a series connection of switches $S_{W1}$, $S_{W2}$, $S_{W1a}$ and $S_{W2a}$. Capacitor $C_{in}$ connects between terminal $V_{in}$ and ground and/or earth. Capacitor $C_{out}$ connects between terminal $V_{out}$ and ground and/or earth. Terminal $V_{in}$ connects to switch $S_{W1}$ and ground and/or earth connects to switch $S_{W2a}$.

Specifically, with respect to FIG. 15a, the point where switch $S_{W2}$ is connected to switch $S_{W1a}$ is also connected to terminal $V_{out}$. One end of inductor $L_r$ connects to the point where switch $S_{W1}$ is connected to switch $S_{W2}$. The other end of inductor $L_r$ connects to one end off switch $S_{2b}$ and one end of capacitor $C_{ra}$. The other end of capacitor $C_{ra}$ connects to one end of switch $S_{1b}$ and one end of switch $S_{2c}$. The other end of switch $S_{2b}$ connects to the other end of switch $S_{1b}$ and one end of capacitor $C_{rb}$. The other end of capacitor $C_{rb}$ connects to the point where switch $S_{W1a}$ connects to switch $S_{W2a}$. The other end of switch $S_{2c}$ connects to and/or earth.

Specifically, with respect to FIG. 15b, inductor $L_r$ is connected between the point where switch $S_{W2}$ is connected to switch $S_{W1a}$ and terminal $V_{out}$. The point where switch $S_{W1}$ is connected to switch $S_{W2}$ connects to one end off switch $S_{2b}$ and one end of capacitor $C_{ra}$. The other end of capacitor $C_{ra}$ connects to one end of switch $S_{1b}$ and one end of switch $S_{2c}$. The other end of switch $S_{2b}$ connects to the other end of switch $S_{1b}$ and one end of capacitor $C_{rb}$. The other end of capacitor $C_{rb}$ connects to the point where switch $S_{W1a}$ connects to switch $S_{W2a}$. The other end of switch $S_{2c}$ connects to and/or earth.

A comparison of the circuit topology of FIG. 14a with FIG. 15a shows the difference in connections of capacitors $C_{in}$ and $C_{out}$ to terminals $V_{in}$ and $V_{out}$ and to terminal G in FIG. 14a and connections of capacitors $C_{in}$ and $C_{out}$ to $V_{in}$ and $V_{out}$ and to ground and/or earth of FIG. 15a. Similarly, with respect to FIGS. 14b and 15b is the difference in connections of capacitors $C_{in}$ and $C_{out}$ to terminals $V_{in}$ and $V_{out}$ and to terminal G in FIG. 14b and connections of capacitors $C_{in}$ and $C_{out}$ to $V_{in}$ and $V_{out}$ and to ground and/or earth of FIG. 15b.

Figure 15C:
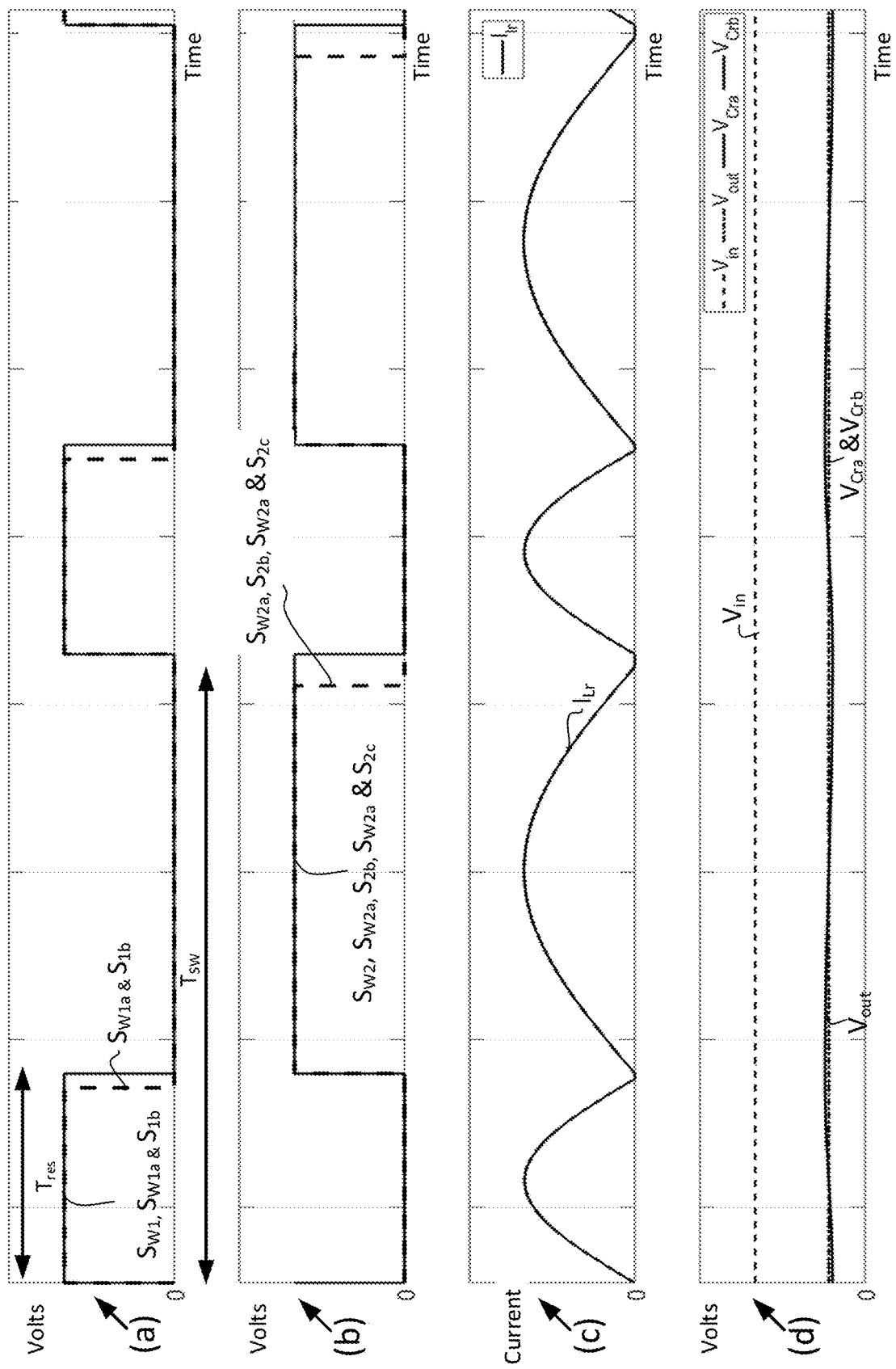
FIG. 15c show graphs of voltages and current versus time according to illustrative embodiments.

Reference is now made to FIG. 15c, which shows four graphs (a), (b), (c) and (d) of voltages and current versus time according to illustrative embodiments. The four graphs (a), (b), (c) and (d) are for step-down (buck) converter 1500B with conversion ratio of a third. When $S_{W1}$, $S_{W1a}$ and $S_{1b}$ are turned "on" in a first interval, inductor $L_r$ and capacitors $C_{ra}$ and $C_{rb}$ connected in series by switch $S_{1b}$ resonate. Current $I_{Lr}$ starts varying sinusoidally and energy is transferred to resonant capacitors $C_{ra}$ and $C_{rb}$ during the first interval ($T_{res}$). In graph (a), switch $S_{W1a}$ and $S_{W1b}$ (shown by dotted line) is turned "off" before half the resonant period after which switch $S_{W1}$ (shown by solid line) is turned "off". The diode connected in parallel to switch $S_{W1a}$ starts conducting the inductor current $I_{Lr}$ and the resonance stops when the inductor current $I_{Lr}$ reaches zero. The resonant capacitor voltage has a dc component equal to $$\frac{V_{in}}{3}$$

and a small ac component. In the second interval ($T_{sw}$-$T_{res}$), shown in the second graph (b), the switches $S_{W2}$, $S_{W2a}$, $S_{2b}$ and $S_{2c}$ are turned "on" with zero current. The inductor $L_r$ and capacitor $C_{rb}$ are connected to the output terminal $V_{out}$. Inductor $L_r$ and capacitor $C_{rb}$ start resonating and the energy in capacitor $C_{rb}$ is transferred to the output terminal $V_{out}$. Similar to previous interval the switches $S_{W2a}$, $S_{2b}$ and $S_{2c}$ (shown by dotted line) are turned "off" before half the resonant period and diode connected in parallel across switch $S_{W2a}$ starts conducting.

In graph (c), lower inductor ripple current ($I_{Lr}$) converter 1500B may be by virtue of the inductor current ($I_{Lr}$) being in the same direction compared to what may be a larger bi-directional inductor ripple current ($I_{Lr}$) of converter 1500A for example. Inductor ripple current ($I_{Lr}$) of converter 1500B is positive.

Graph (d) shows for converter 1500B, three plots of the input voltage $V_{in}$ (shown by wider spaced dotted line), the output voltage $V_{out}$ (shown by narrower spaced dotted line) and the voltage across capacitors $C_{ra}$ and $C_{rb}$ (shown as solid line). Graph (d) shows the buck operation of converter 1500B such that the output voltage ($V_{out}$) is lower and negative and/or inverted compared the input voltage ($V_{in}$) by virtue of a conversion ratio of a third.

Figure 16A:
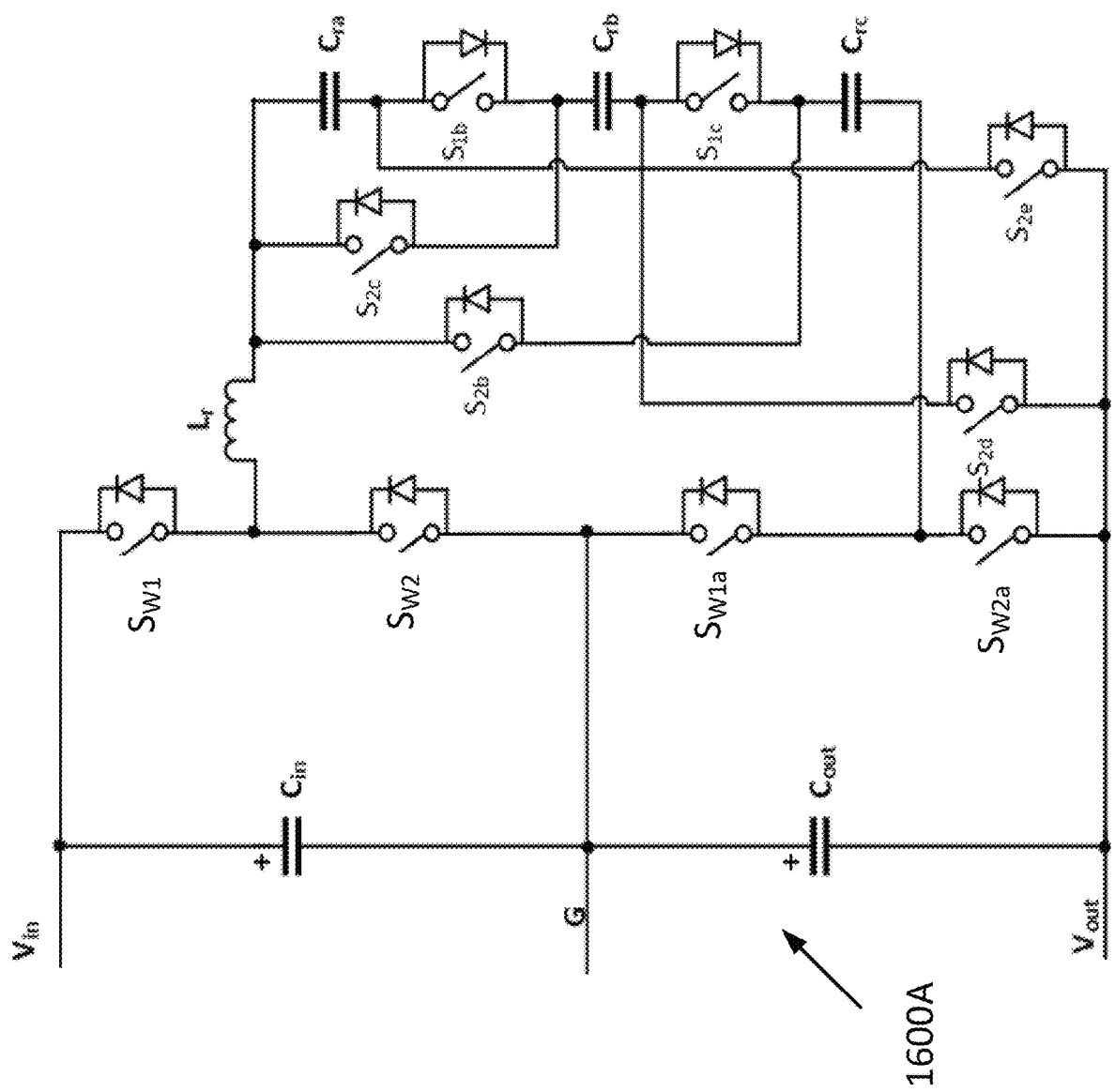
FIGS. 16a and 16b show respective step-down DC buck converters with conversion ratios of a half, according to illustrative embodiments.
Figure 16B:
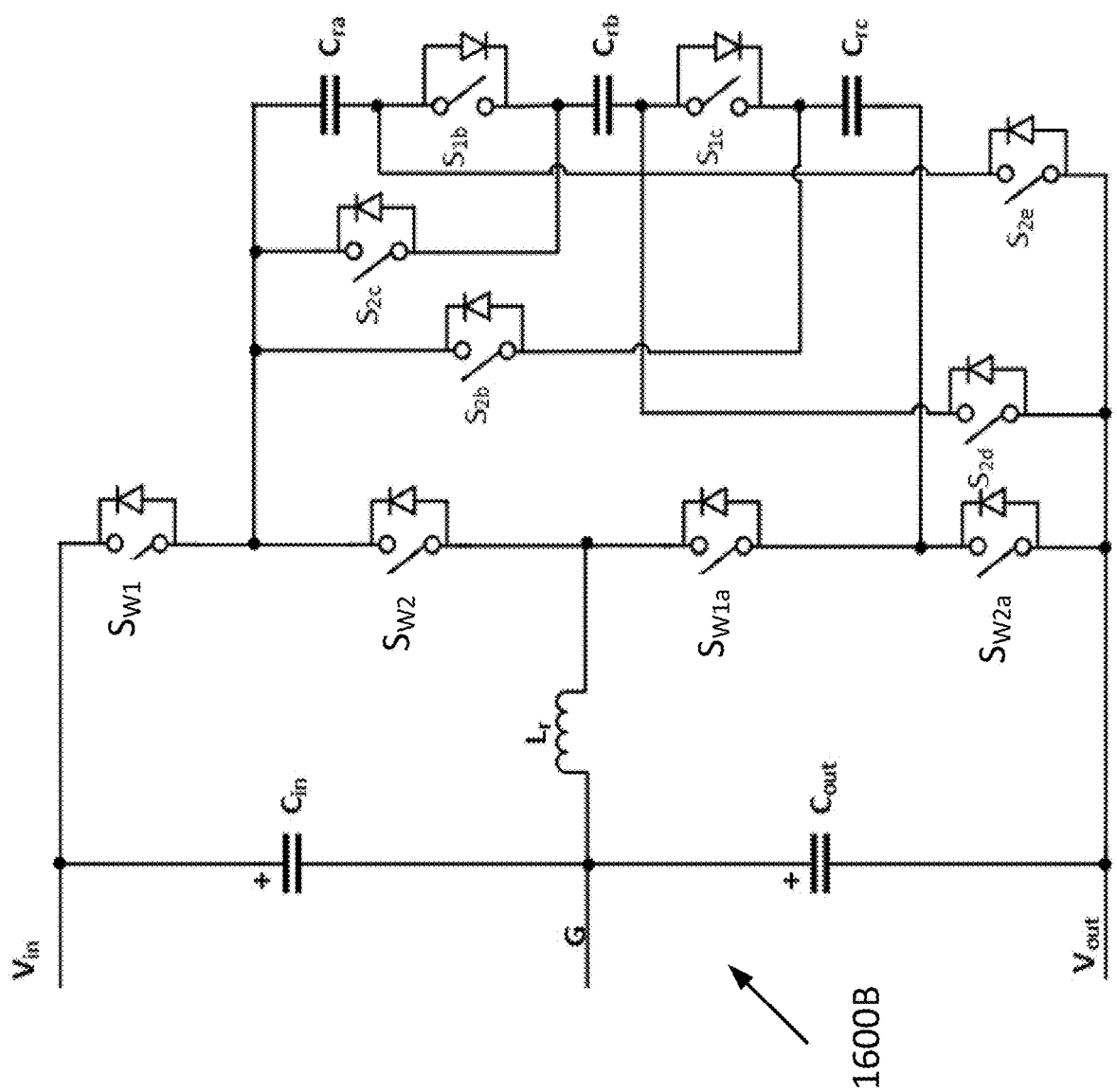

Reference is now made to FIGS. 16a and 16b, which show respective inverting converters 1600A and 1600B with conversion ratios of a third, according to illustrative embodiments. Common to both FIGS. 16a and 16b is a series connection of switches $S_{W1}$, $S_{W2}$, $S_{W1a}$ and $S_{W2a}$. Capacitor $C_{in}$ connects between terminal $V_{in}$ and terminal G. Capacitor $C_{out}$ connects between terminal $V_{out}$ and terminal G. Terminal $V_{in}$ connects to switch $S_{W1}$ and terminal $V_{out}$ connects to switch $S_{W2a}$.

Specifically, for converter 1600A, inductor $L_r$ connects between the point where switch $S_{W1}$ connects to switch $S_{W2}$ and to the ends of switches $S_{2b}$, $S_{3c}$ and capacitor $C_{ra}$. Terminal G also connects to the point where switch $S_{W2}$ is connected to switch $S_{W1a}$.

Specifically, for converter 1600B, the point where switch $S_{W1}$ connects to switch $S_{W2}$ connects to the ends of switches $S_{2b}$, $S_{3c}$ and capacitor $C_{ra}$. Inductor $L_r$ connects between terminal G and to the point where switch $S_{W2}$ is connected to switch $S_{w1a}$.

Common to both converters 1600A and 1600B, the other end of capacitor $C_{ra}$ connects to a series connection of switch $S_{1b}$, capacitor $C_{rb}$, switch $S_{1c}$ and capacitor $C_{rc}$. The body diodes of switches $S_{1b}$ and $S_{1c}$ are in the opposite direction of the other switches included in converters 1600A and 1600B. The other end of switch $S_{2c}$ connects to the point where switch $S_{1b}$ connects to capacitor $C_{rb}$. The other end of switch $S_{2b}$ connects to the point where switch $S_{1c}$ connects to capacitor $C_{rc}$. The other end of capacitor $C_{rc}$ connects to the point where switch $S_{W1a}$ connects to switch $S_{W2a}$. Switch $S_{2d}$ connects between terminal $V_{out}$ and the point where capacitor $C_{rb}$ connects to switch $S_{1c}$. Switch $S_{2e}$ connects between terminal $V_{out}$ and the point where capacitor $C_{ra}$ connects to switch $S_{1b}$.

Figure 16C:
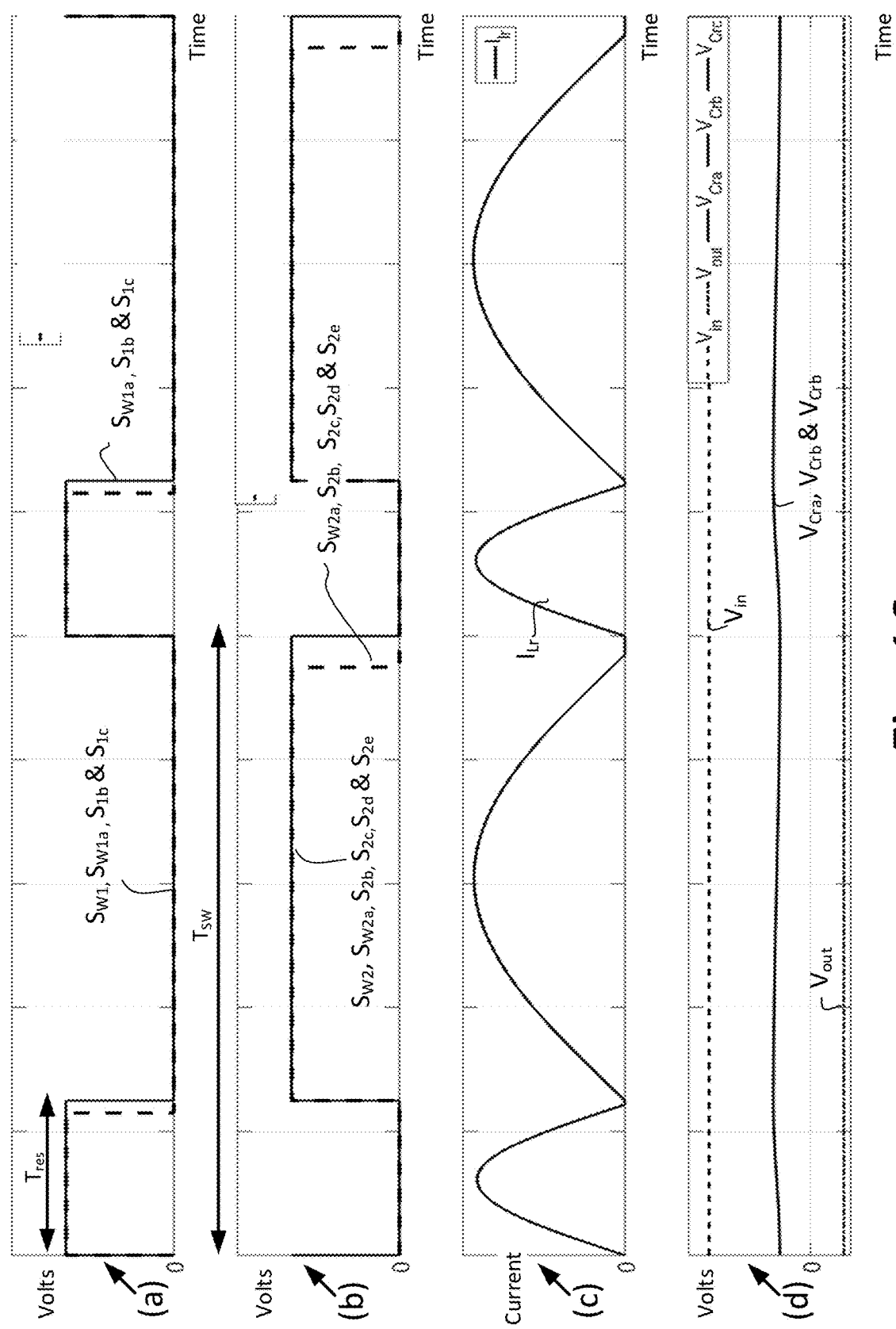
FIG. 16c shows graphs of voltages and current versus time according to illustrative embodiments.

Reference is now made to FIG. 16c, which shows four graphs (a), (b), (c) and (d) of voltages and current versus time according to illustrative embodiments. The four graphs (a), (b), (c) and (d) are for step-down (buck) converter 1600B with conversion ratio of a third. When $S_{W1}$, $S_{W1a}$, $S_{1b}$ and $S_{1c}$ are turned "on" in a first interval, inductor $L_r$ and capacitors $C_{ra}$, $C_{rb}$ and $C_{rc}$ connected in series by switches $S_{1b}$ and $S_{1c}$ resonate. Current $I_{Lr}$ starts varying sinusoidally and energy is transferred to resonant capacitors $C_{ra}$, $C_{rb}$ and $C_{rc}$ during the first interval ($T_{res}$). In graph (a), switches $S_{W1a}$, $S_{1b}$ and $S_{1c}$ (shown by dotted line) are turned "off" before half the resonant period after which switch $S_{W1}$ (shown by solid line) is turned "off". The diode connected in parallel to switch $S_{W1a}$ starts conducting the inductor current $I_{Lr}$ and the resonance stops when the inductor current $I_{Lr}$ reaches zero. The resonant capacitor voltage has a dc component equal to $$\frac{V_{in}}{3}$$

and a smart ac component. In the second interval ($T_{sw}$-$T_{res}$), shown in the second graph (b), the switches $S_{W2}$, $S_{W2a}$, $S_{2b}$, $S_{2c}$, $S_{2d}$ and $S_{2e}$ are turned "on" with zero current. The inductor $L_r$ and capacitor $C_{rc}$ are connected to the output terminal $V_{out}$. Inductor $L_r$ and capacitor $C_{rc}$ start resonating and the energy in capacitor $C_{rc}$ is transferred to the output terminal $V_{out}$. Similar to the previous interval, the switches $S_{W2a}$, $S_{2b}$, $S_{2c}$, $S_{2d}$ and $S_{2e}$ (shown by dotted line) are turned "off" before half the resonant period and diode connected in parallel across switch $S_{W2a}$ starts conducting.

In graph (c), lower inductor ripple current ($I_{Lr}$) converter 1600B may be by virtue of the inductor current ($I_{Lr}$) being in the same direction compared to what may be a larger bi-directional inductor ripple current ($I_{Lr}$) of converter 1600A for example. Inductor ripple current ($I_{Lr}$) of converter 1600B is positive.

Graph (d) shows for converter 1600B, three plots of the input voltage $V_{in}$ (shown by wider spaced dotted line), the output voltage $V_{out}$ (shown by narrower spaced dotted line) and the voltage across capacitors $C_{ra}$ and $C_{rb}$ (shown as solid line). Graph (d) shows the buck operation of converter 1600B such that the output voltage ($V_{out}$) is lower and negative and/or inverted compared the input voltage ($V_{in}$) by virtue of a conversion ratio of a third.

Figure 17:
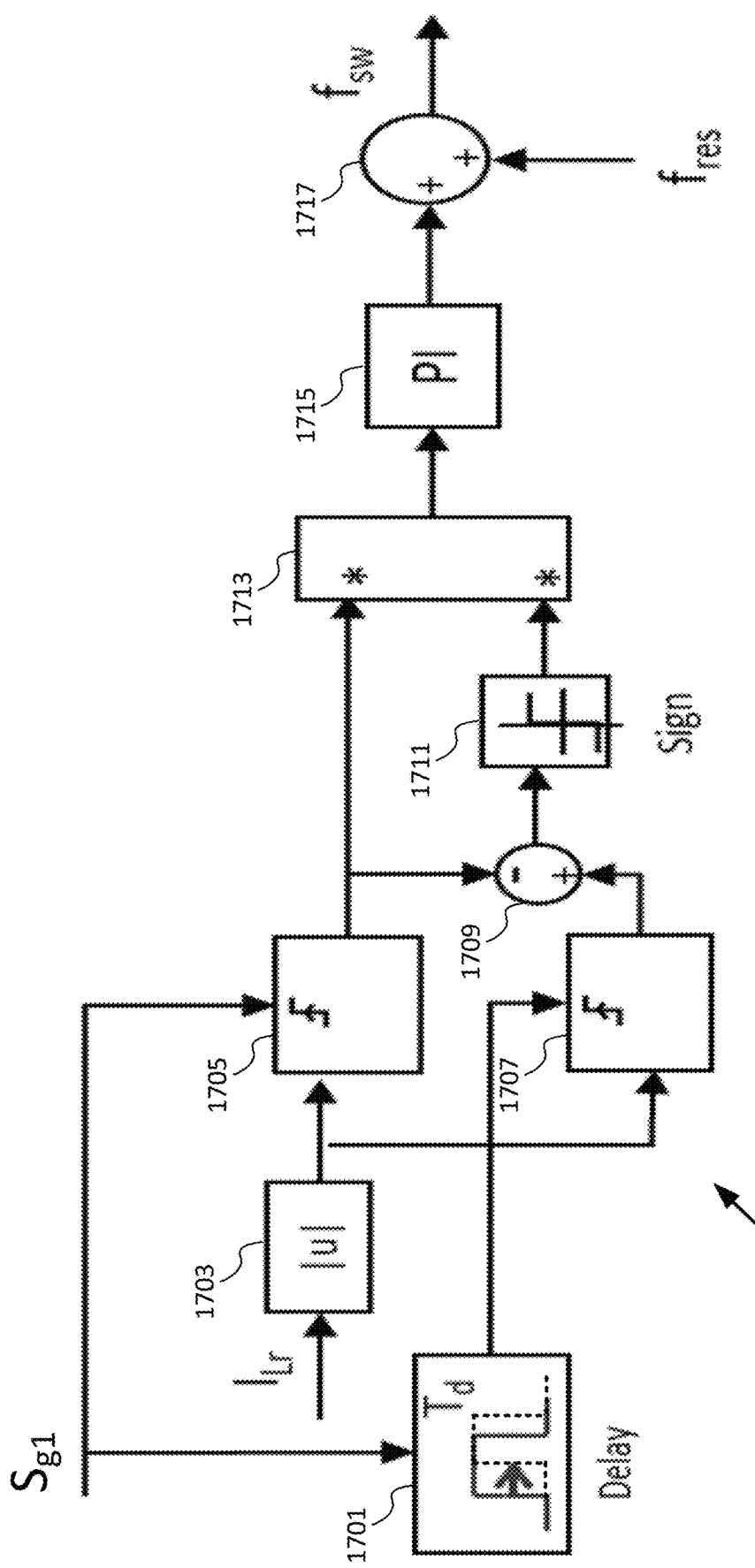
FIG. 17 shows a block diagram of an algorithm to determine a switching frequency for a converter described in the above Figures, according to illustrative embodiments.

Reference is now made to FIG. 17, which shows a block diagram 1700 of an algorithm to determine a switching frequency ($f_{sw}$) for a converter described above, according to illustrative embodiments. The algorithm may be implemented for the converters described above since tolerances of the resonant capacitor(s) ($C_r$, $C_{ra}$, $C_{rc}$, $C_{rd}$ and $C_{re}$) and resonant inductor ($L_r$) may cause the resonant frequency ($f_{res}$) of the converter to be different from the initially designed value. Operating at a higher or lower switching frequency ($f_{sw}$) can cause non-zero current switching and increase the total losses in the converter. To compensate for the tolerances of the components in the converter, the resonant inductor current ($I_{Lr}$) is sampled at rising edge of the switching signal $S_{g1}$ by use of samplers 1705 and sampler 1707 via the unity (|u|) modulus 1703 of the resonant inductor current ($I_{Lr}$). When the switching frequency ($f_{SW}$) is equal to resonant frequency ($f_{res}$) via subtractor 1709, the magnitude of the current is zero. A proportional integral (PI) controller 1715 may be implemented to vary the switching frequency ($f_{SW}$) to make the magnitude of current zero as required. To determine the sign 1711 of the error input from error unit 1713 to PI controller 1715, a second current sample is measured after a delay ($T_d$) (200 ns by way of non-limiting example) from delay 1701. Based on the current samples of samplers 1705/1707, magnitude of the error 1713 is determined in order to obtain the correct switching frequency ($f_{SW}$) out the output of adder unit 1717.

Figure 18A:
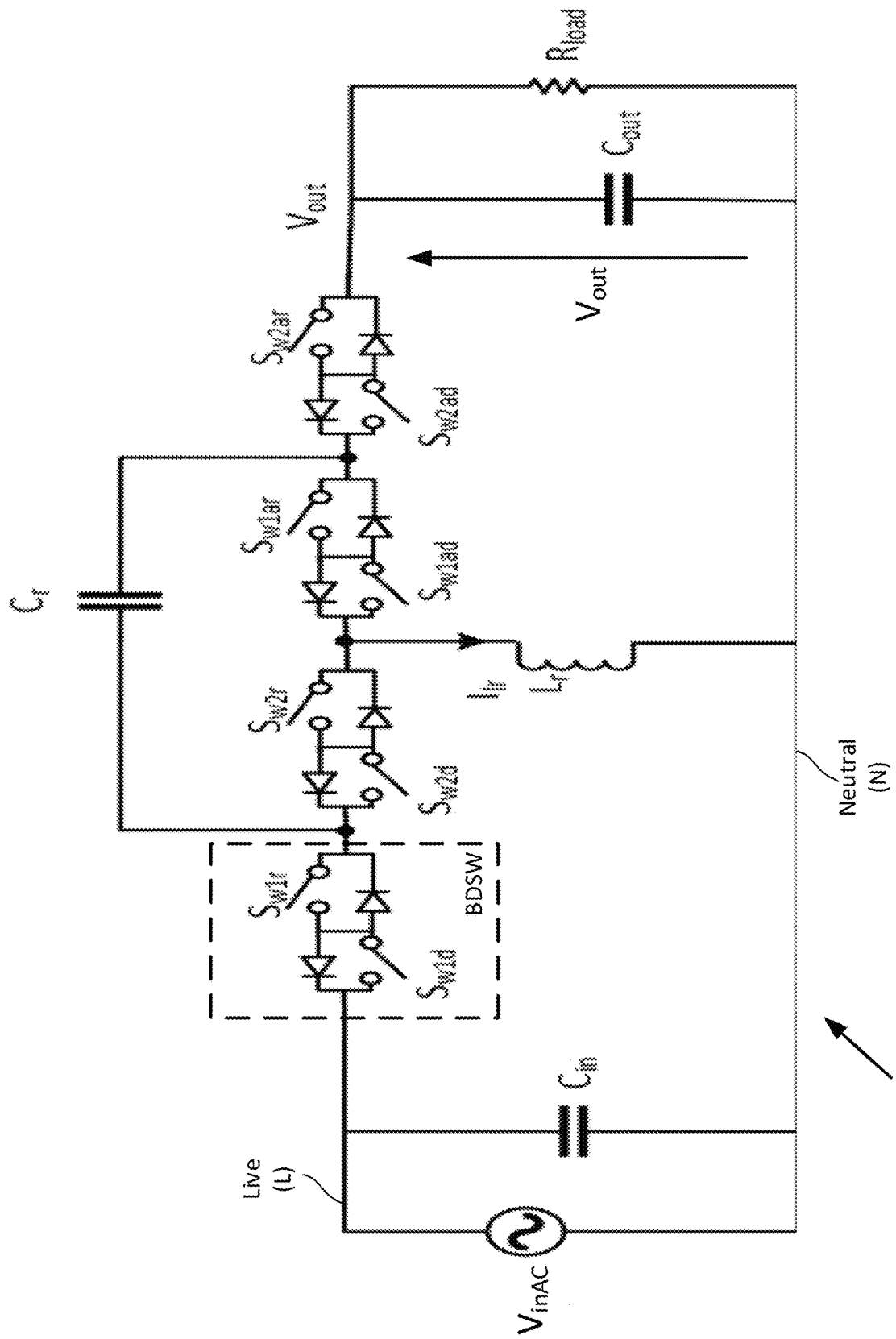
FIG. 18a shows a bidirectional AC to AC converter according to illustrative embodiments.

Reference is now made to FIG. 18a, which shows a bidirectional AC to AC converter 1800, according to illustrative embodiments. Converter 1800 may be similar to the DC-to-DC converters described above and may be extended to facilitate the operation for AC to AC conversion. Capacitor $C_{in}$ connects across single phase AC input voltage $V_{inAC}$ at terminals Live (L) and Neutral (N). A series string of bi-direction switches connects between capacitor Cin at terminal L and output Live (L) terminal Vout. Output capacitor Cout connects across terminal Live (L) terminal Vout and terminal Neutral (N).

The series string of bi-directional switches BDSW includes, for example, switch $S_{W1d}$ with body diode connected in parallel across switch $S_{W1d}$, the cathode of switch $S_{W1d}$ connects one end of switch $S_{W1d}$. The anode of switch $S_{W1d}$ connects to the other end of switch $S_{W1d}$ and to one end of switch $S_{W1r}$ and the anode of the body diode of switch $S_{W1r}$. The other end of switch $S_{W1r}$ connects to the cathode of the body diode of switch $S_{W1r}$. As such, the series string of bi-directional switches BDSW connects the cathode of switch $S_{W1d}$ to the live (L) terminal of AC source $V_{inAC}$, the cathode of switch $S_{W1r}$ connects to the cathode of switch $S_{W2d}$, the cathode of switch $S_{W2r}$ connects to the cathode of switch $S_{W1ad}$, the cathode of switch $S_{W1ar}$ connects to the cathode of switch $S_{W2ad}$ and the cathode of switch $S_{W2ar}$ connects to terminal $V_{out}$. Inductor $L_r$ connects between neutral (N) and the point where the cathode of switch $S_{W2r}$ connects to the cathode of switch $S_{W1ad}$. Capacitor Cr connects to the point where the cathode of switch $S_{W1r}$ connects to the cathode of switch $S_{W2d}$ and the point where the cathode of switch $S_{W1ar}$ connects to the cathode of switch $S_{W2ad}$.

Figure 18B:
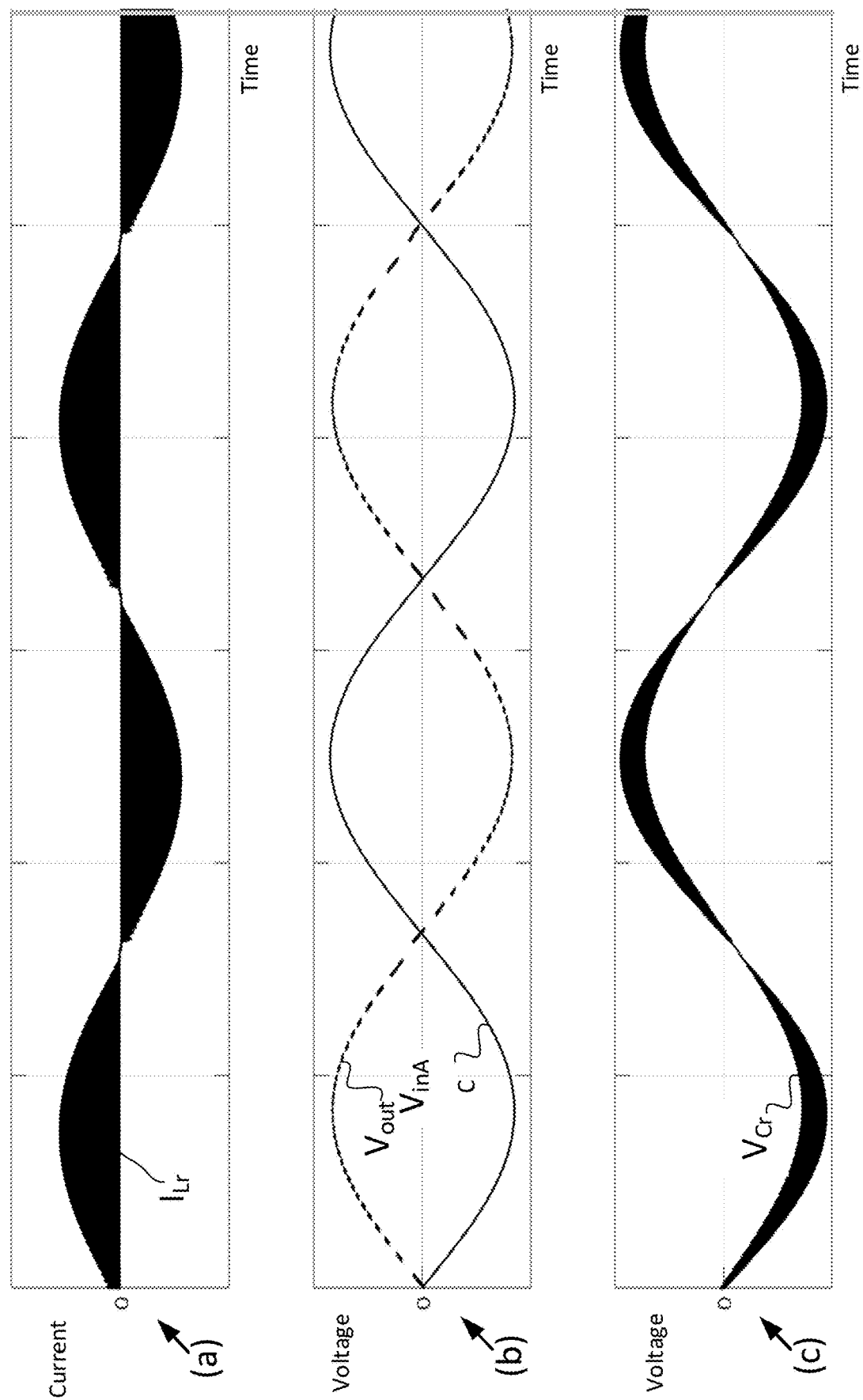
FIG. 18b shows graphs of voltages and current versus time according to illustrative embodiments.

Reference is now made to FIG. 18b, which shows three graphs (a), (b) and (c) of voltages and current versus time according to illustrative embodiments. Converter 1800 may be similar to the DC-to-DC converters described above and may be extended to facilitate the operation for AC to AC conversion. In particular converter 1800 may be most similar to converter 1100b shown in FIG. 11b since the bidirectional switches BDSW provide two directions of switching in a unity mode of inverting conversion for respective positive and negative cycles of AC source $V_{inAC}$ as shown in graph (b). Graph (b) shows the inverted unity output voltage on terminal $V_{out}$. In other words, strings of switches SW1d, SW2d, SW1ad, SW2ad and switches SW1r, SW2r, SW1ar, SW2ar convert in the same way as converter 1100 with its string of switches described above with respect to FIGS. 11c and 11d but instead for respective positive and negative cycles of AC source $V_{inAC}$. As such inductor current $I_{Lr}$ as shown in graph (a) is one positive direction for the negative cycle of AC source $V_{inAC}$ and is one negative direction for the positive cycle of AC source $V_{inAC}$. Voltage across capacitor $C_r$ is shown in graph (c).

Converter 1800 may be similar to the DC-to-DC converters described above in that inductor $L_r$ is located and/or connected between neutral/ground and midpoint of a series connection of serially connected switches. Converter 1800 may be similar to the DC-to-DC converters described above in that inductor $L_r$ is connected in series with capacitor $C_r$ and may be connected across two switches in a string of serially connected switches. Converter 1800 may be similar to the DC-to-DC converters described above in that a multi-leg version similar to converter 1100C in FIG. 11e and/or converters 1100A/B, 1200A/B, 1300A/B, 1400A/B, 1500A/B, and 1600A/B may be constructed. As such the multi-leg version similar to converter 1100C in FIG. 11e may be connected and/or operated to provide a single-phase ($V_{inAC}$) AC buck and/or boost function that minimizes ripple current in capacitors $C_{in}$ and $C_{out}$.

Further, a multi-leg version similar to converter 1100C in FIG. 11e may be connected and/or operated to provide a single phase to three phase output and/or with a phase by phase AC buck and/or boost function that minimizes ripple current in capacitors $C_{in}$ and $C_{out}$. AC to AC converter 1800 may be used to implement DC-to-DC converters and DC-to-AC converters such as DC-to-DC converter 302, DC-to-AC converter 303 and other DC-to-DC and DC-to-AC converters described above. In sum, an AC to AC converter 1800 may be similar to the DC-to-DC converters described above that may include FIGS. 11a-16b so as to provide lower inductor ripple currents ($I_{Lr}$) by virtue of relocating/reconnecting inductors $L_r$ that may result in inductors $L_r$ with lower inductor volume and/or utilization of one or more legs that may lower ripple current ratings for capacitors $C_{in}$ and $C_{out}$.

It is noted that various connections are set forth between elements herein. These connections are described in general and, unless specified otherwise, may be direct or indirect; this specification is not intended to be limiting in this respect. Further, although elements herein are described in terms of either hardware or software, they may be implemented in either hardware and/or software. Additionally, elements of one embodiment may be combined with elements from other embodiments in appropriate combinations or sub-combinations. For example, the switch(s), sensor(s), power source(s), storage element(s), and interconnections of one embodiment may be combined with similar elements of another embodiment and used in any combination or sub-combination. Also, power sources shown in the Figures may be alternating current (AC) sources and multi-converters connected thereto may serve as AC-to-DC converters such as rectifiers and/or switched mode power supply, for example. One skilled in the art will recognize that the various embodiments detailed above may be combined in suitable combinations and that portions of the embodiments may be unitized in various sub-combinations.

According to a first illustrative embodiment, there is provided an apparatus, which includes a DC-to-AC converter comprising a first terminal and a second terminal. The apparatus also includes a DC-to-DC converter comprising a third terminal. The DC-to-AC converter may be configured to receive a DC input voltage from a DC power source, and to produce a first alternating output voltage at the first terminal, and a second alternating output voltage at the second terminal. The DC-to-DC converter may be configured to receive a DC input voltage from the DC power source.

With respect to the first illustrative embodiment, the DC-to-DC converter may be configured to step down the DC input voltage by about half at the third terminal.

With respect to the first illustrative embodiment, the DC-to-DC converter may be a charge-pump circuit.

With respect to the first illustrative embodiment, the DC-to-DC converter may be a resonant switched capacitor circuit.

The apparatus according to the first illustrative embodiment may also include a switching device that is configured to couple the DC-to-AC converter and the DC-to-DC converter to at least one electrical load. With respect to the apparatus that includes the switching device according to the first illustrative embodiment, the switching device may be configured to couple a first group of electrical loads to the first terminal and a second group of electrical loads to the second terminal, wherein a first power demand is associated with the first group of electrical loads and a second power demand is associated with the second group of electrical loads.

With respect to the apparatus that includes the switching device according to the first illustrative embodiment, the switching device may be configured to receive a control signal, and wherein, responsive to the control signal, the switching device may be configured to reduce an imbalance between the first power demand and the second power demand by changing an association of at least one electrical load from the first group of electrical loads to the second group of electrical loads or from the second group of electrical loads to the first group of electrical loads.

According to a second illustrative embodiment, there is provided an apparatus that includes a DC-to-AC converter. The DC-to-AC converter may include a first output, a second output having 120-degree phase difference from the first output, and a third output having 120-degree phase difference from the first output and 120-degree phase difference from the second output. The apparatus further includes a DC-to-DC converter comprising a fourth output. The DC-to-AC converter may be configured to receive a DC input voltage from a DC power source. The first output, the second output and the third output may be configured to output AC voltages having about a same frequency and a same voltage amplitude. The DC-to-DC converter may be configured to receive a DC input voltage from the DC power source.

With respect to the second illustrative embodiment, the DC-to-DC converter may be configured to step down the input voltage by about half at the fourth output.

With respect to the second illustrative embodiment, the three outputs of the DC-to-AC converter may be configured to be coupled to three-phase lines of a three-phase power system, and the fourth output may be configured to be coupled to a neutral line of a three-phase power system.

According to a third illustrative embodiment, there is provided a method that includes receiving, by a DC-to-AC converter comprising a first terminal and a second terminal, a DC input voltage provided by a DC power source. The method also includes receiving, by a DC-to-DC converter comprising a third terminal, the DC input voltage provided by the DC power source. The method further includes producing, by the DC-to-AC converter at the first terminal, a first alternating output voltage. The method still further includes producing, by the DC-to-AC converter at the second terminal, a second alternating output voltage. The method also includes producing, by the DC-to-DC converter at the third terminal, a stepped down DC output voltage with respect to the DC input voltage.

With respect to the third illustrative embodiment, the DC-to-DC converter may be a charge-pump circuit.

With respect to the third illustrative embodiment, the DC-to-DC converter may be a resonant switched capacitor circuit.

The method according to the third illustrative embodiment may further include selectively coupling, via a switch, the DC-to-AC converter and the DC-to-DC converter to at least one electrical load.

According to a fourth illustrative embodiment, there is provided a method that includes receiving, by a DC-to-AC converter comprising a first output, a second output having 120-degree phase difference from the first output, and a third output having 120-degree phase difference from the first output and 120-degree phase difference from the second output, a DC input voltage provided by a DC power source. The method also includes receiving, by a DC-to-DC converter comprising a fourth output, the DC input voltage from the DC power source. The method further includes outputting, by the DC-to-AC converter on the first output, the second output and the third output, AC voltages having about a same frequency and a same voltage amplitude. The method still further includes outputting, by the DC-to-DC converter on the fourth output, a stepped down DC voltage with respect to the DC input voltage.

With respect to the fourth illustrative embodiment, the DC-to-DC converter may be a charge-pump circuit.

With respect to the fourth illustrative embodiment, the DC-to-DC converter may be a resonant switched capacitor circuit.

The method according to the fourth illustrative embodiment may further include selectively coupling, via a switch, the DC-to-AC converter and the DC-to-DC converter to at least one electrical load.

What is claimed is:

1. An apparatus comprising:
    a direct current to alternating current (DC-to-AC) converter comprising a direct current (DC) input terminal, a first alternating current (AC) output terminal and a second AC output terminal; and
    a direct current to direct current (DC-to-DC) converter comprising a DC input terminal, and a DC output terminal,
    wherein the DC-to-DC converter is configured to:
        receive, via the DC input terminal of the DC-to-DC converter, a DC input voltage from a DC power source,
        provide, via the DC output terminal of the DC-to-DC converter, a DC output voltage to a plurality of groups of electrical loads comprising a first group of electrical loads and a second group of electrical loads, and
        regulate the DC output voltage at the DC output terminal of the DC-to-DC converter by supplementing or absorbing a current difference between a current associated with the first group of electrical loads and a current associated with the second group of electrical loads; and
    wherein the DC-to-AC converter is configured to:
        receive, via the DC input terminal of the DC-to-AC converter, the DC input voltage from the DC power source,
        provide, via the first AC output terminal of the DC-to-AC converter, a first AC output voltage to at least the first group of electrical loads from the plurality of groups of electrical loads, and
        provide, via the second AC output terminal of the DC-to-AC converter, a second AC output voltage to at least the second group of electrical loads from the plurality of groups of electrical loads.

2. The apparatus of claim 1, wherein the DC-to-DC converter is configured to step down the DC input voltage by half at the DC output terminal of the DC-to-DC converter.

3. The apparatus of claim 1, wherein the DC-to-DC converter comprises a charge-pump circuit.

4. The apparatus of claim 1, wherein the DC-to-DC converter comprises a resonant switched capacitor circuit.

5. The apparatus of claim 1, further comprising a switching device, wherein the switching device is configured to couple the DC-to-AC converter and the DC-to-DC converter to the plurality of groups of electrical loads.

6. The apparatus of claim 5, wherein the switching device comprises:
    a first output terminal coupled to the first group of electrical loads; and
    a second output terminal coupled to the second group of electrical loads.

7. The apparatus of claim 6, wherein the switching device comprises:
    a user interface configured to provide information and cause change of an amount of power provided to the first group of electrical loads and an amount of power provided to the second group of electrical loads.

8. The apparatus of claim 5, wherein the switching device is configured to receive a control signal, and wherein, responsive to the control signal, the switching device is configured to reduce an imbalance between a first power demand of the first group of electrical loads and a second power demand of the second group of electrical loads by changing an association of at least one electrical load from the first group of electrical loads to the second group of electrical loads or from the second group of electrical loads to the first group of electrical loads.

9. The apparatus of claim 1, wherein the DC-to-AC converter is connected to one of a single phase of a grid, or a single phase of an electrical device.

10. The apparatus of claim 1, wherein the DC-to-DC converter is configured to provide, via a second DC output terminal of the DC-to-DC converter, the DC output voltage to a second DC input terminal of the DC-to-AC converter.

11. An apparatus comprising:
    a direct current to alternating current (DC-to-AC) converter comprising a first alternating current (AC) output, a second AC output and a third AC output; and a direct current to direct current (DC-to-DC) converter comprising a direct current (DC) output,
wherein the DC-to-DC converter is configured to:
receive a DC input voltage from a DC power source;
provide, via the DC output of the DC-to-DC converter, a DC output voltage to a plurality of groups of electrical loads comprising at least a first group of electrical loads and a second group of electrical loads; and
regulate the DC output voltage at the DC output of the DC-to-DC converter by supplementing or absorbing a current difference between a current associated with the first group of electrical loads and a current associated with the second group of electrical loads, wherein the DC-to-AC converter is configured to:
receive the DC input voltage from the DC power source and the DC output voltage from the DC output of the DC-to-DC converter;
provide, via the first AC output of the DC-to-AC converter, a first AC output voltage to at least one of the first group of electrical loads or the second group of electrical loads from the plurality of groups of electrical loads;
provide, via the second AC output of the DC-to-AC converter, a second AC output voltage to at least one of the first group of electrical loads or the second group of electrical loads from the plurality of groups of electrical loads; and
provide, via the third AC output of the DC-to-AC converter, a third AC output voltage to at least one of the first group of electrical loads or the second group of electrical loads from the plurality of groups of electrical loads,
wherein the first AC output voltage, the second AC output voltage and the third AC output voltage have substantially a same frequency and a same voltage amplitude, and
wherein the second AC output voltage have a 120-degree phase difference from the first AC output voltage and the third AC output voltage have a 120-degree phase difference from the first AC output voltage and a 120-degree phase difference from the second AC output voltage.

12. The apparatus of claim 11, wherein the DC-to-DC converter is configured to step down the DC input voltage by half at the DC output of the DC-to-DC converter.

13. The apparatus of claim 11, wherein the first AC output, the second AC output and the third AC output of the DC-to-AC converter are configured to be coupled to three-phase lines of a three-phase power system, and the DC output of the DC-to-DC converter is configured to be coupled to a neutral line of the three-phase power system.

14. A method comprising:
receiving, by a direct current to direct current (DC-to-DC) converter via a direct current (DC) input terminal of the DC-to-DC converter, a DC input voltage provided by a DC power source;
producing, by the DC-to-DC converter at a DC output terminal of the DC-to-DC converter, a stepped down DC output voltage with respect to the DC input voltage;
providing, by the DC-to-DC converter and via the DC output terminal of the DC-to-DC converter, the stepped down DC output voltage to a plurality of groups of electrical loads comprising a first group of electrical loads and a second group of electrical loads;
receiving, by a direct current to alternating current (DC-to-AC) converter via an DC input terminal of the DC-to-AC converter, the DC input voltage provided by the DC power source;
producing, by the DC-to-AC converter at a first alternating current (AC) output terminal of the DC-to-AC converter, a first AC output voltage, wherein the first AC output voltage is provided to at least the first group of electrical loads;
producing, by the DC-to-AC converter at a second AC output terminal of the DC-to-AC converter, a second AC output voltage, wherein the second AC output voltage is provided to at least the second group of electrical loads; and
regulating, by the DC-to-DC converter, the stepped down DC output voltage by supplementing or absorbing a current difference between a current associated with the first group of electrical loads and a current associated with the second group of electrical loads.

15. The method of claim 14, further comprising:
providing, by the DC-to-DC converter and via the DC output terminal of the DC-to-DC converter, a DC output voltage to a second DC input terminal of the DC-to-AC converter.

16. The method of claim 14, wherein the DC-to-DC converter comprises a resonant switched capacitor circuit.

17. The method of claim 14, further comprising:
selectively coupling, via a switch, the DC-to-AC converter and the DC-to-DC converter to the plurality of groups of electrical loads.

18. A method comprising:
receiving, by a direct current to direct current (DC-to-DC) converter via a direct current (DC) input terminal of the DC-to-DC converter, a DC input voltage from a DC power source;
providing, by the DC-to-DC converter via a DC output terminal of the DC-to-DC converter and to a plurality of groups of electrical loads, a stepped down DC voltage with respect to the DC input voltage, the plurality of groups of electrical loads comprising at least a first group of electrical loads and a second group of electrical loads;
regulating, by the DC-to-DC converter, the stepped down DC output voltage by supplementing or absorbing a current difference between a current associated with the first group of electrical loads and a current associated with the second group of electrical loads;
receiving, by a direct current to alternating current (DC-to-AC) converter via a first DC input terminal of the DC-to-AC converter, the DC input voltage provided by the DC power source;
receiving, by the DC-to-AC converter via a second DC input terminal of the DC-to-AC converter, the stepped down DC voltage;
outputting, by the DC-to-AC converter:
via a first alternating current (AC) output terminal of the DC-to-AC converter, a first AC voltage;
via a second AC output terminal of the DC-to-AC converter, a second AC voltage having a 120-degree phase difference from the first AC voltage; and
via a third AC output terminal of the DC-to-AC converter, a third AC voltage having a 120-degree phase difference from the first AC voltage and a 120-degree phase difference from the second AC voltage; and
providing, by the DC-to-AC converter and via the first AC output terminal, the second AC output terminal, and the third AC output terminal of the DC-to-AC converter, the first AC voltage, the second AC voltage and the third AC voltage respectively the first group of electrical loads and the second group of electrical loads.

19. The method of claim 18, wherein the DC-to-DC converter comprises a charge-pump circuit.

20. The method of claim 18, further comprising:
selectively coupling, via a switch, the first AC output terminal, the second AC output terminal, and the third AC output terminal of the DC-to-AC converter to three-phase lines of a three-phase power system; and
selectively coupling the DC first output terminal of the DC-to-DC converter to a neutral line of the three-phase power system.

* * * * *